US012736816B2

(12) United States Patent
Lee et al.

(10) Patent No.: US 12,736,816 B2
(45) Date of Patent: Sep. 15, 2026

(54) AUGMENTED REALITY PROVIDING DEVICE

(71) Applicant: Samsung Display Co., LTD., Yongin-si (KR)

(72) Inventors: Tae Hee Lee, Hwaseong-si (KR); Byung Choon Yang, Seoul (KR); Joo Woan Cho, Seongnam-si (KR); Byeong Hwa Choi, Seoul (KR); Hae Yun Choi, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 553 days.

(21) Appl. No.: 17/942,879

(22) Filed: Sep. 12, 2022

(65) Prior Publication Data

US 2023/0092317 A1 Mar. 23, 2023

(30) Foreign Application Priority Data

Sep. 17, 2021 (KR) ........................ 10-2021-0124945

(51) Int. Cl.
*G02B 27/01* (2006.01)

(52) U.S. Cl.
CPC .. *G02B 27/0172* (2013.01); *G02B 2027/0134* (2013.01); *G02B 2027/0178* (2013.01)

(58) Field of Classification Search
CPC ............ G02B 27/0172; G02B 27/0101; G02B 2027/0178; G02B 2027/0118; G02B 2027/012; G02B 2027/014; G02B 2027/0132; G06F 3/013; G06F 3/011; G06F 1/163; G06T 19/006
USPC ................................. 359/471, 472, 265, 275
See application file for complete search history.

(56) References Cited

U.S. PATENT DOCUMENTS

| | | | | |
|---|---|---|---|---|
| 10,078,236 | B2 | 9/2018 | Hayashi et al. | |
| 10,181,507 | B2 | 1/2019 | Bower et al. | |
| 11,988,834 | B2 | 5/2024 | Ha et al. | |
| 2012/0235883 | A1* | 9/2012 | Border | G06F 3/017 345/8 |
| 2017/0160550 | A1* | 6/2017 | Kobayashi | G02B 27/017 |

(Continued)

FOREIGN PATENT DOCUMENTS

| | | | |
|---|---|---|---|
| JP | 2017-120311 | A | 7/2017 |
| JP | 2018-525662 | A | 9/2018 |

(Continued)

*Primary Examiner* — Marin Pichler
(74) *Attorney, Agent, or Firm* — Womble Bond Dickinson (US) LLP

(57) ABSTRACT

An augmented-reality-providing device includes a right eye lens having a first surface, a left eye lens having a first surface, a right eye filter overlapping the first surface of the right eye lens, and configured to change an illuminance of light passing through the right eye lens, a left eye filter overlapping the first surface of the left eye lens, and configured to change an illuminance of light passing through the left eye lens, a display unit configured to provide a first image to the right eye lens, and configured to provide a second image to the left eye lens, a right eye driver configured to control a transmittance of the right eye filter, and configured to control a transmittance of the first image, and a left eye driver configured to control a transmittance of the left eye filter, and configured to control a transmittance of the second image.

19 Claims, 46 Drawing Sheets

(56) References Cited

U.S. PATENT DOCUMENTS

| | | | | |
|---|---|---|---|---|
| 2018/0322845 | A1* | 11/2018 | Machida | G02B 27/0172 |
| 2020/0074724 | A1 | 3/2020 | Mathur et al. | |
| 2020/0192181 | A1* | 6/2020 | Kwon | G02F 1/31 |
| 2021/0055558 | A1* | 2/2021 | Kim | G02B 27/0172 |

FOREIGN PATENT DOCUMENTS

| | | | |
|---|---|---|---|
| KR | 10-2018-0118488 | A | 10/2018 |
| KR | 10-1932368 | B1 | 3/2019 |
| KR | 10-2153599 | B1 | 9/2020 |
| KR | 2020-0111308 | A | 9/2020 |

* cited by examiner

20: 21, 22, 23, 31, 32
40: 41, 42
50: 51, 52
60: 61, 62, 63
100: 110, 120

FIG. 6
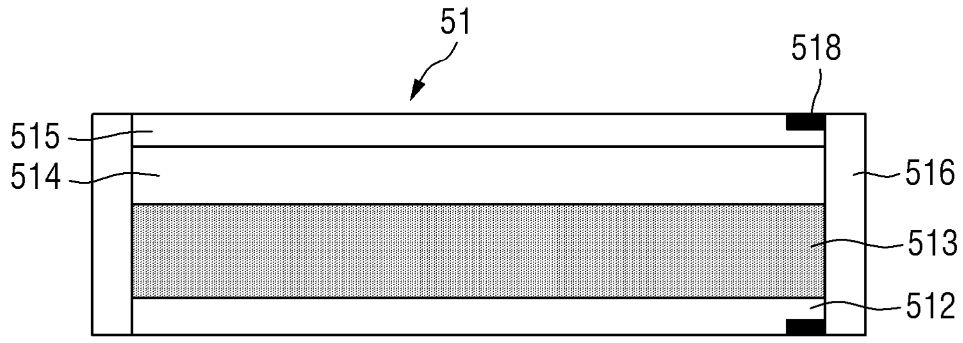
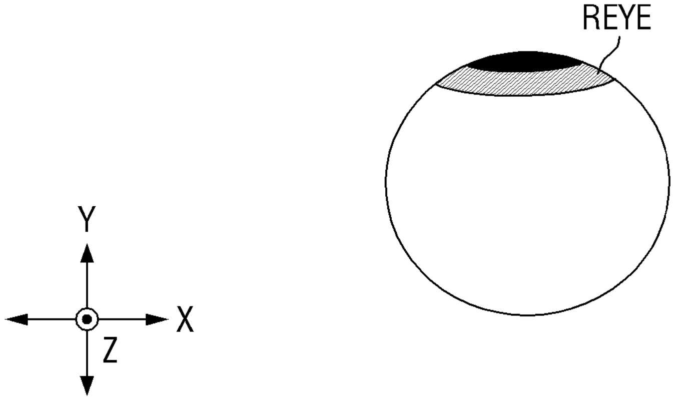

FIG. 24
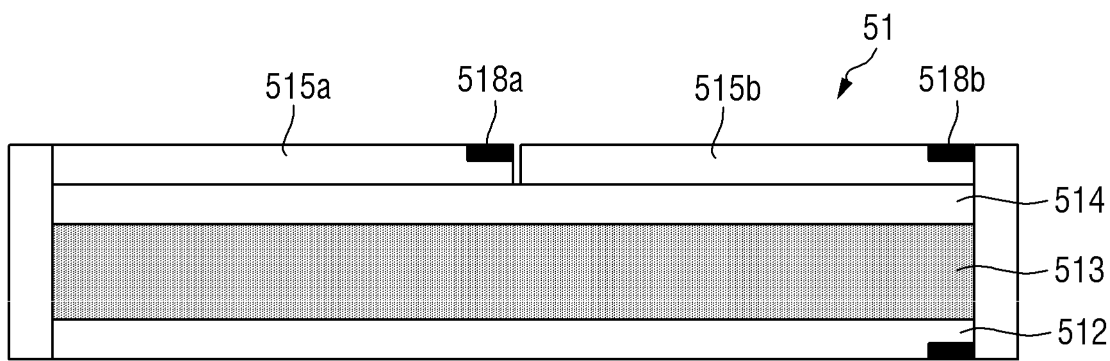
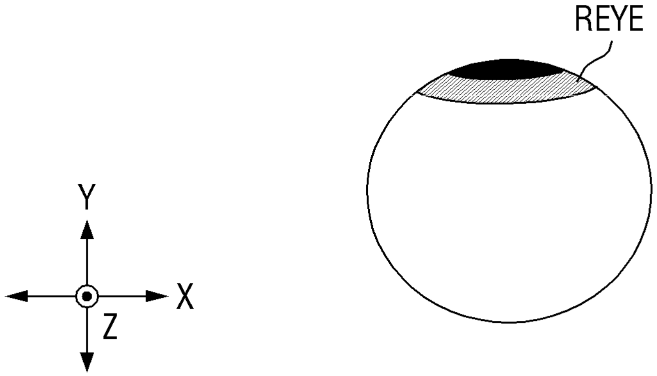
515: 515a, 515b
518: 518a, 518b

FIG. 25
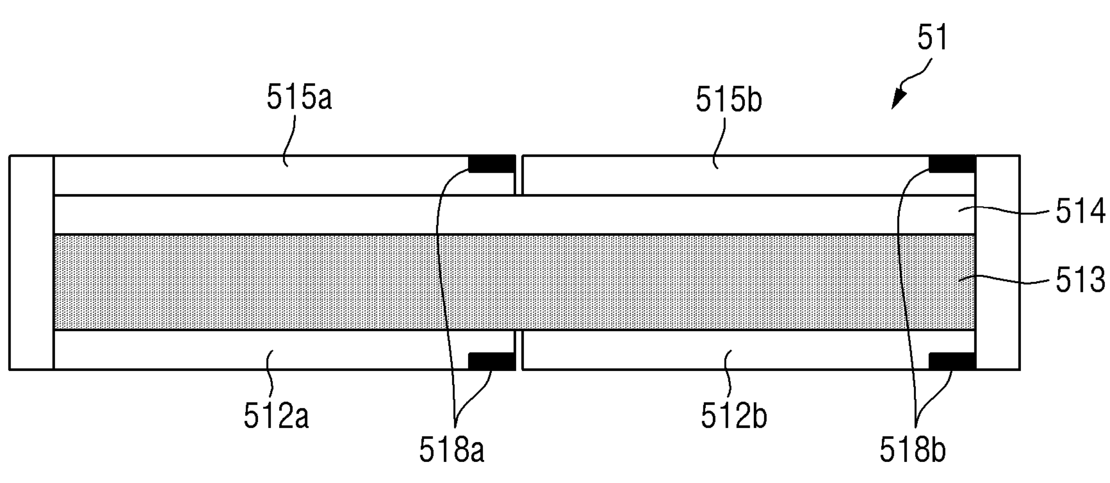
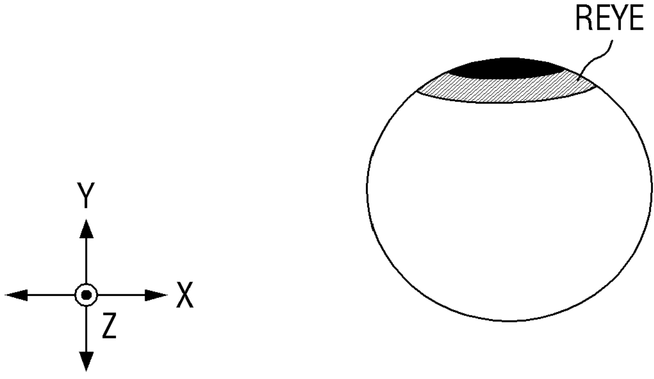

20: 21, 22, 23

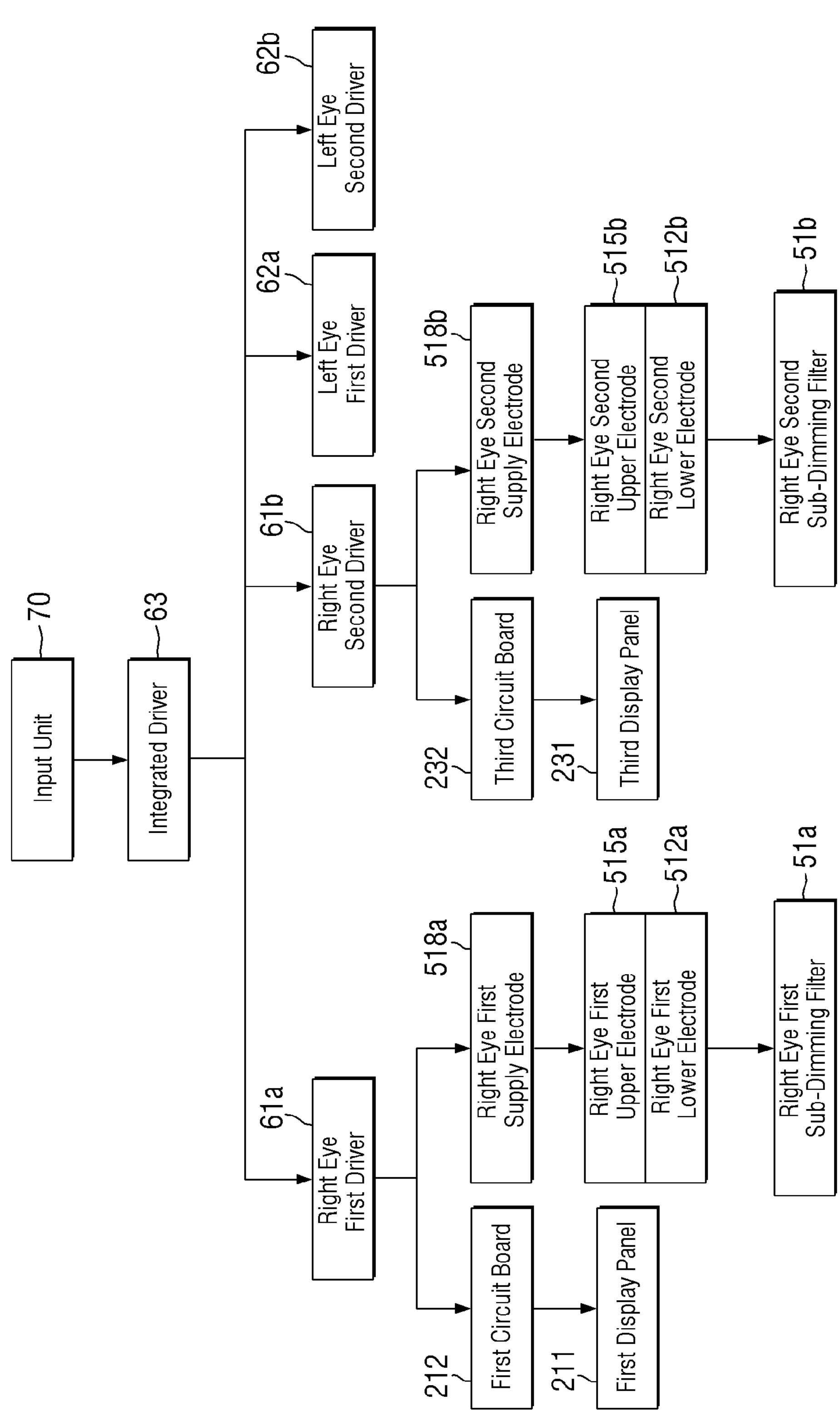
FIG. 33
Input Unit
70
Integrated Driver
63
Right Eye First Driver
61a
Right Eye Second Driver
61b
Left Eye First Driver
62a
Left Eye Second Driver
62b
First Circuit Board
212
First Display Panel
211
Right Eye First Supply Electrode
518a
Right Eye First Upper Electrode
515a
Right Eye First Lower Electrode
512a
Right Eye First Sub-Dimming Filter
51a
Third Circuit Board
232
Third Display Panel
231
Right Eye Second Supply Electrode
518b
Right Eye Second Upper Electrode
515b
Right Eye Second Lower Electrode
512b
Right Eye Second Sub-Dimming Filter
51b

FIG. 35
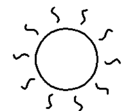
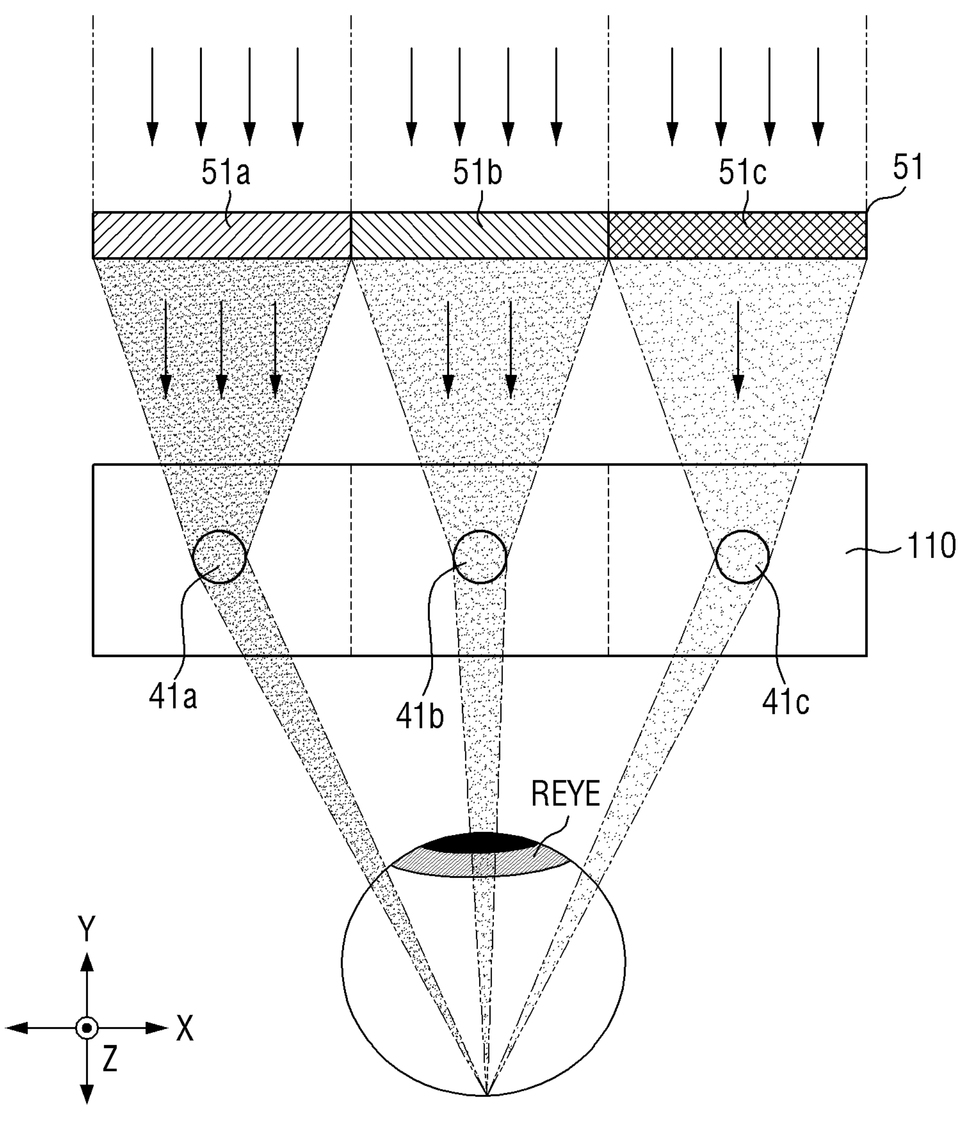

FIG. 37
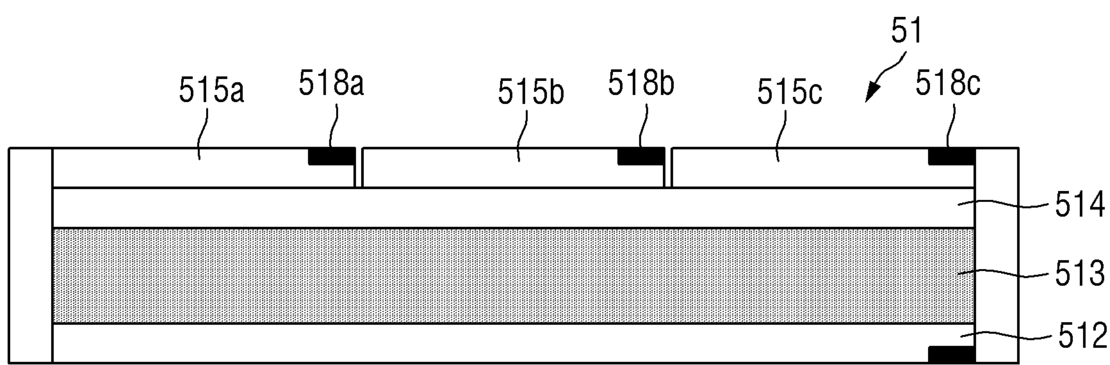
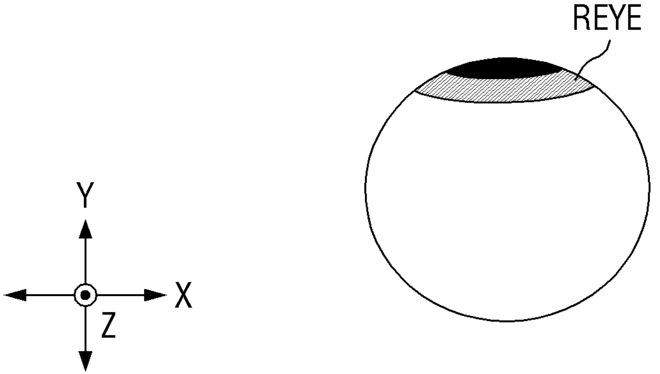

FIG. 39
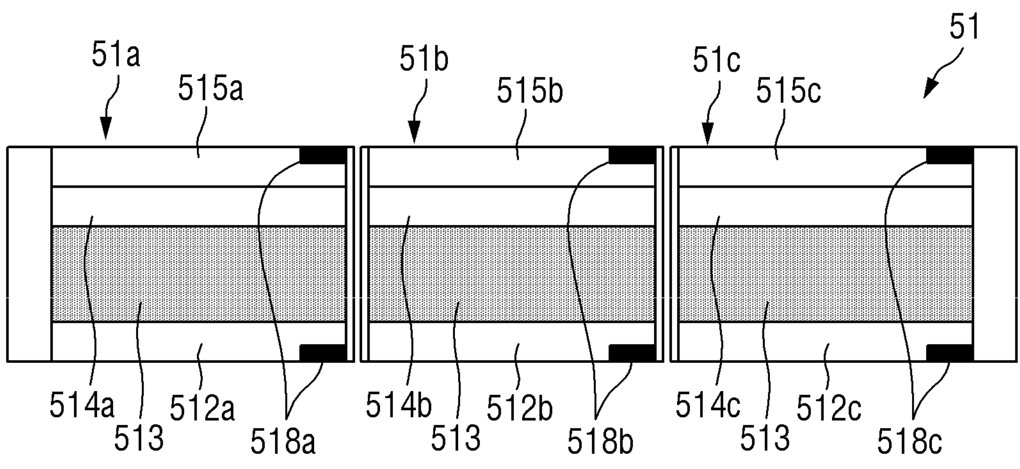
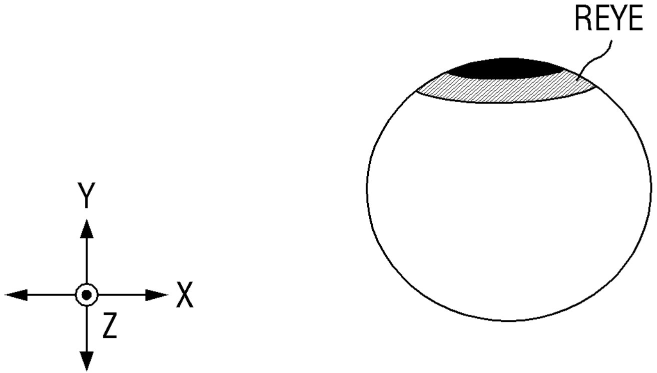

20: 21, 22, 23

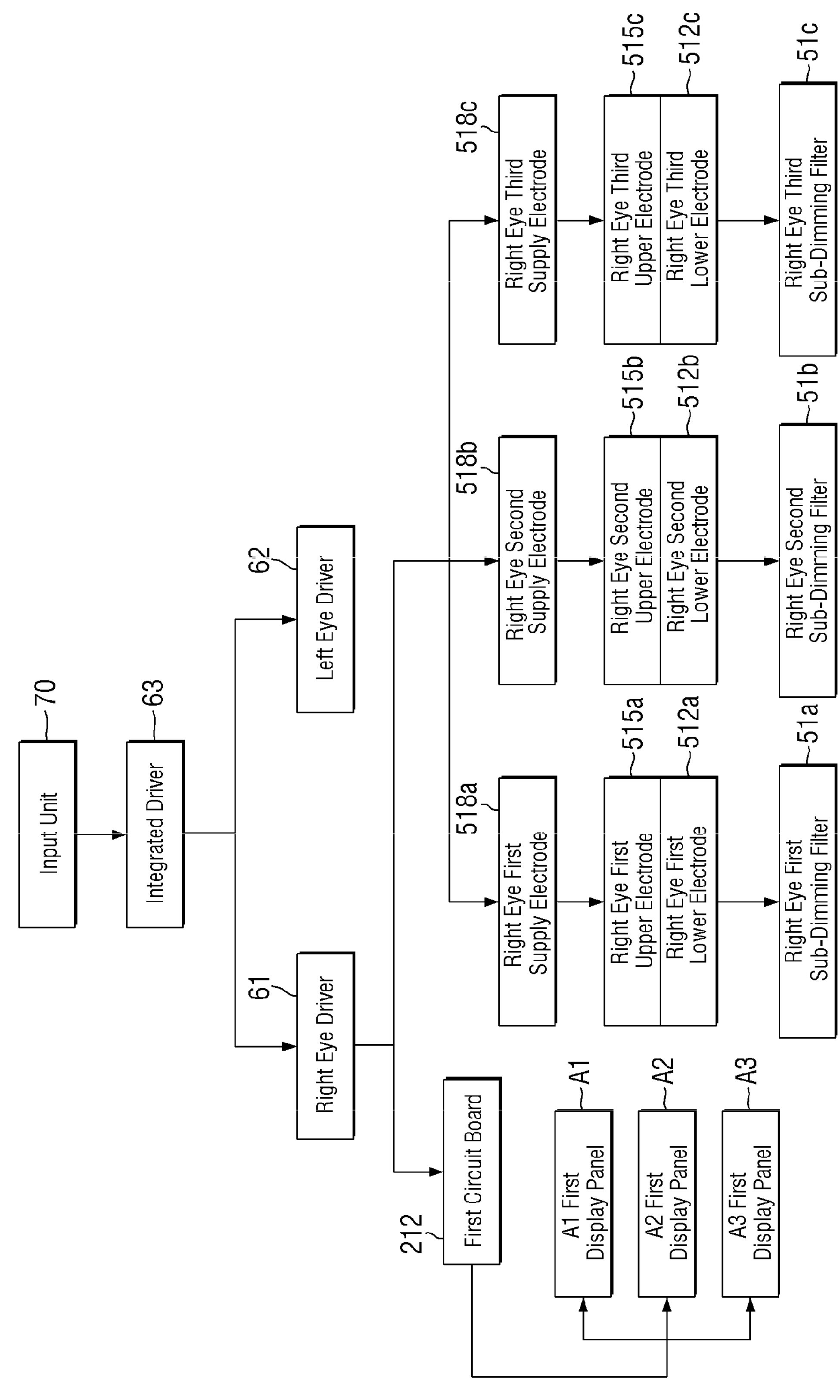
FIG. 43
Input Unit
70
Integrated Driver
63
Left Eye Driver
62
Right Eye Driver
61
First Circuit Board
212
A1 First Display Panel
A1
A2 First Display Panel
A2
A3 First Display Panel
A3
Right Eye First Supply Electrode
518a
Right Eye First Upper Electrode
515a
Right Eye First Lower Electrode
512a
Right Eye First Sub-Dimming Filter
51a
Right Eye Second Supply Electrode
518b
Right Eye Second Upper Electrode
515b
Right Eye Second Lower Electrode
512b
Right Eye Second Sub-Dimming Filter
51b
Right Eye Third Supply Electrode
518c
Right Eye Third Upper Electrode
515c
Right Eye Third Lower Electrode
512c
Right Eye Third Sub-Dimming Filter
51c

20: 21, 22, 23

AUGMENTED REALITY PROVIDING DEVICE

CROSS-REFERENCE TO RELATED APPLICATION

This application claims priority to, and the benefit of, Korean Patent Application No. 10-2021-0124945 filed on Sep. 17, 2021 in the Korean Intellectual Property Office, the contents of which in its entirety are herein incorporated by reference.

BACKGROUND

1. Field

The disclosure relates to an AR-providing device.

2. Description of the Related Art

Recently, an augmented reality (AR)-providing device including a light-emitting display device has been developed. The AR-providing device is a glasses-type monitor device of virtual reality (VR) or augmented reality (AR) that is worn in the form of glasses or a helmet to form a focus at a distance close to the user's eyes.

The AR-providing device may include a display device that is mounted on an individual user's head. For example, the AR-providing device is designed to guide light from a displayed image, and light from the external world, to the eyes of an individual user to provide the user with an image and a view of the external world.

An example of such an AR-providing device is configured to allow the user to view a surrounding landscape optically superimposed on an image displayed on a pair of small displays through an optical system including a pair of reflective mirrors, a pair of eyepieces, and a polarizing beam splitter.

SUMMARY

Aspects of the disclosure provide an augmented reality (AR)-providing device capable of improving clarity and visibility of real information, and improving visibility of image information even under various circumstances.

However, aspects of the disclosure are not restricted to the one set forth herein. The above and other aspects of the disclosure will become more apparent to one of ordinary skill in the art to which the disclosure pertains by referencing the detailed description of the disclosure given below.

According to some embodiments of the disclosure, an AR-providing device including a right eye lens having a first surface, a left eye lens having a first surface, a right eye filter overlapping the first surface of the right eye lens, and configured to change an illuminance of light passing through the right eye lens, a left eye filter overlapping the first surface of the left eye lens, and configured to change an illuminance of light passing through the left eye lens, a display unit configured to provide a first image to the right eye lens, and configured to provide a second image to the left eye lens, a right eye driver configured to control a transmittance of the right eye filter, and configured to control a transmittance of the first image, and a left eye driver configured to control a transmittance of the left eye filter, and configured to control a transmittance of the second image.

The AR-providing device may further include a first temple adjacent to the right eye lens, and with the right eye driver thereon, and a second temple adjacent to the left eye lens, and with the left eye driver thereon.

The right eye driver may be configured to be independently driven, wherein the left eye driver is configured to be independently driven.

The AR-providing device may further include a right eye reflector between the first surface of the right eye lens, and a second surface of the right eye lens that is opposite to the first surface of the right eye lens, and a left eye reflector between the first surface of the left eye lens, and a second surface of the left eye lens that is opposite to the first surface of the left eye lens.

The display unit may be configured to provide the first image to the right eye reflector, and configured to provide the second image to the left eye reflector.

The display unit may include a first display panel for providing the first image, and a second display panel for providing the second image.

The first display panel and the second display panel may be respectively on a first side surface of the right eye lens and a first side surface of the left eye lens.

The AR-providing device may further include a support unit configured to support the right eye lens and the left eye lens, and an illuminance sensor on the support unit, and configured to detect an illuminance of external light.

The AR-providing device may further include an integrated driver configured to control transmittances of the right eye filter and the left eye filter based on an illuminance value sensed by the illuminance sensor.

The right eye filter and the left eye filter may include a plurality of regions configured to individually adjust transmittances.

The right eye filter and the left eye filter may include at least one lower electrode, at least one upper electrode, and an electrochromic layer interposed therebetween, wherein the regions respectively include one of the at least one lower electrode or one of the at least on upper electrode.

The right eye lens and the left eye lens may include transmittance control regions, wherein the right eye filter and the left eye filter are separated, and include sub-filters respectively in the transmittance control regions.

The right eye filter and the left eye filter may include a film respectively attached to the first surface of the right eye lens and the first surface of the left eye lens.

The AR-providing device may further include an integrated drive configured to adjust the right eye filter or the left eye filter to have a first transmittance so that an external world view is transmitted in an augmented mode, and configured to adjust the right eye filter or the left eye filter to have a second transmittance so that the external world view is blocked in a virtual mode.

According to other embodiments of the disclosure, an AR-providing device includes a right eye lens having a first surface, a left eye lens having a first surface, a display unit configured to provide a first image to the right eye lens, and configured to provide a second image to the left eye lens, a support unit configured to support the right eye lens, the left eye lens, and the display unit, a right eye filter overlapping the first surface of the right eye lens, and configured to change an illuminance of light passing through the right eye lens, a left eye filter overlapping the first surface of the left eye lens, and configured to change an illuminance of light passing through the left eye lens, a first driver coupled to the support unit, and configured to adjust a transmittance of the right eye filter, and a second driver separated from the first driver, coupled to the support unit, and configured to adjust a transmittance of the left eye filter independently of the transmittance of the right eye filter.

The AR-providing device may further include an integrated driver coupled to the support unit, and configured to control the first driver and the second driver.

The integrated driver may be configured to adjust the right eye filter or the left eye filter to have a first transmittance so that an external world view is transmitted in an augmented mode, and configured to adjust the right eye filter or the left eye filter to have a second transmittance so that the external world view is blocked in a virtual mode.

The AR-providing device may further include an illuminance sensor on the support unit, and configured to detect an illuminance of external light.

The integrated driver may be configured to control transmittances of the right eye filter and the left eye filter based on an illuminance value sensed by the illuminance sensor.

The right eye filter and the left eye filter respectively include regions configured to individually adjust transmittances.

According to the AR-providing device and the driving method thereof of some embodiments, clarity and visibility of real information and visibility of image information may be improved even under various circumstances. For example, the transmittance of a plurality of regions may be adjusted by the plurality of filters according to the intensity of external light. Accordingly, the user may clearly recognize an object by adjusting the intensity of external light of each region respectively, thereby improving the visibility of the real information.

Also, when the display panel includes a plurality of regions, or includes a plurality of display panels, the luminance of the display panel may be adjusted according to the transmittances of the plurality of filters and the intensity of external light. Accordingly, the user's visibility of image information may be improved.

Moreover, according to an AR-providing device of some embodiments, images displayed on the plurality of regions of the display panel or on a plurality of display panels are respectively displayed with external light adjusted by the plurality of filters, thereby improving the user's visibility of image information. Accordingly, the display luminance may be maintained at a low level to have the same level of visibility of image information. Thus, it is possible to reduce the luminance loss of the image.

However, the aspects of the disclosure are not limited to the aforementioned aspects, and various other aspects are included in the specification.

BRIEF DESCRIPTION OF THE DRAWINGS

The above and other aspects of the disclosure will become more apparent by describing in detail embodiments thereof with reference to the attached drawings, in which:

FIGS. 4 to 5 are cross-sectional views illustrating an arrangement of the filters and FIG. 6 is a cross-sectional view illustrating a structure of the filter.

FIGS. 24 to 26 are cross-sectional views illustrating the structure of the right eye filter of FIG. 21.

FIGS. 32 to 33 are perspective views of a method of changing a light transmittance of an AR-providing device according to still other embodiments.

The first

Figure 34:
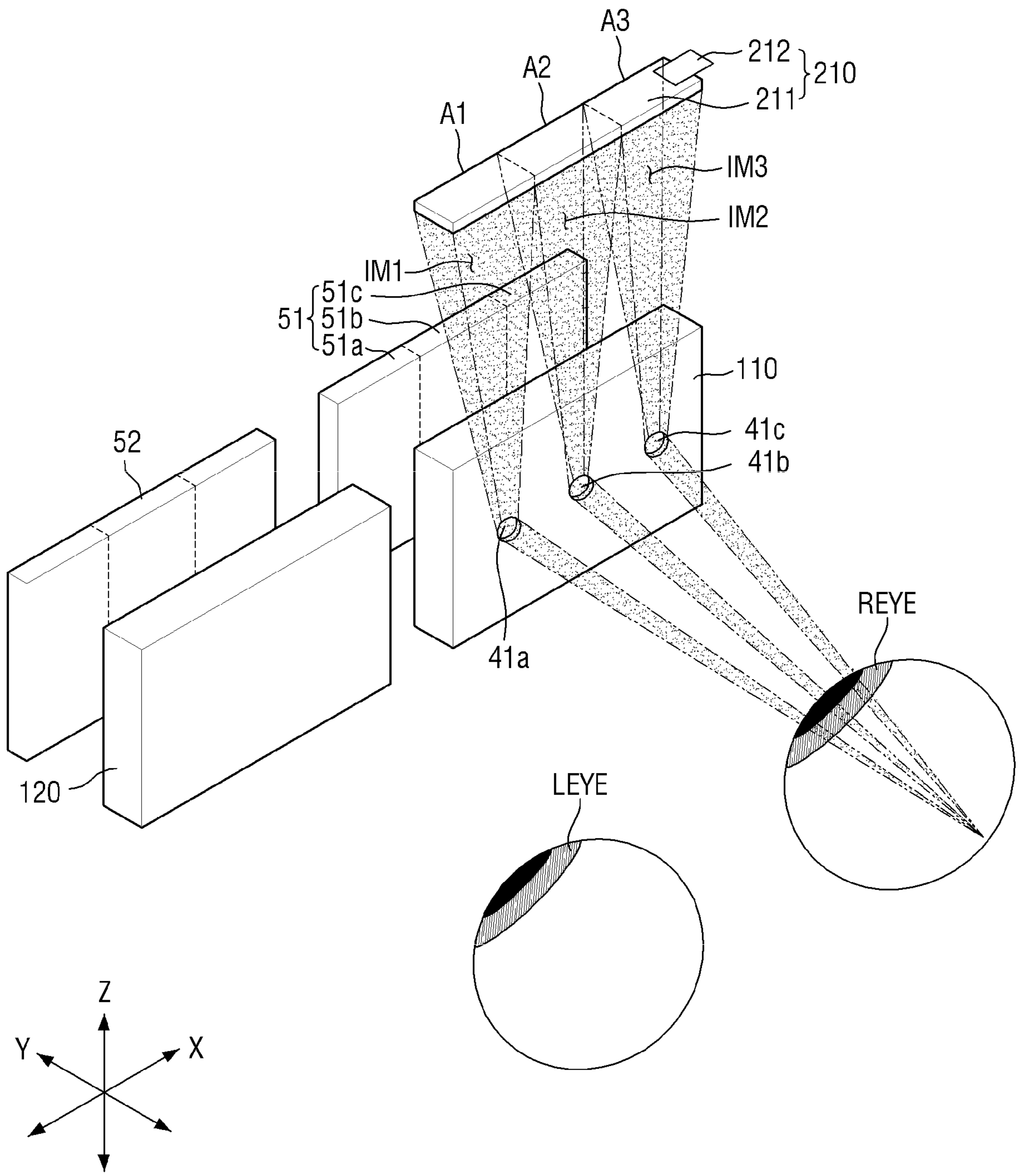

FIG. 34 is a perspective view illustrating a right eye lens, a first display device, and a filter unit according to still other embodiments.

FIG. 35 is a cross-sectional view illustrating a method of changing a light transmittance of FIG. 34.

Figure 36:
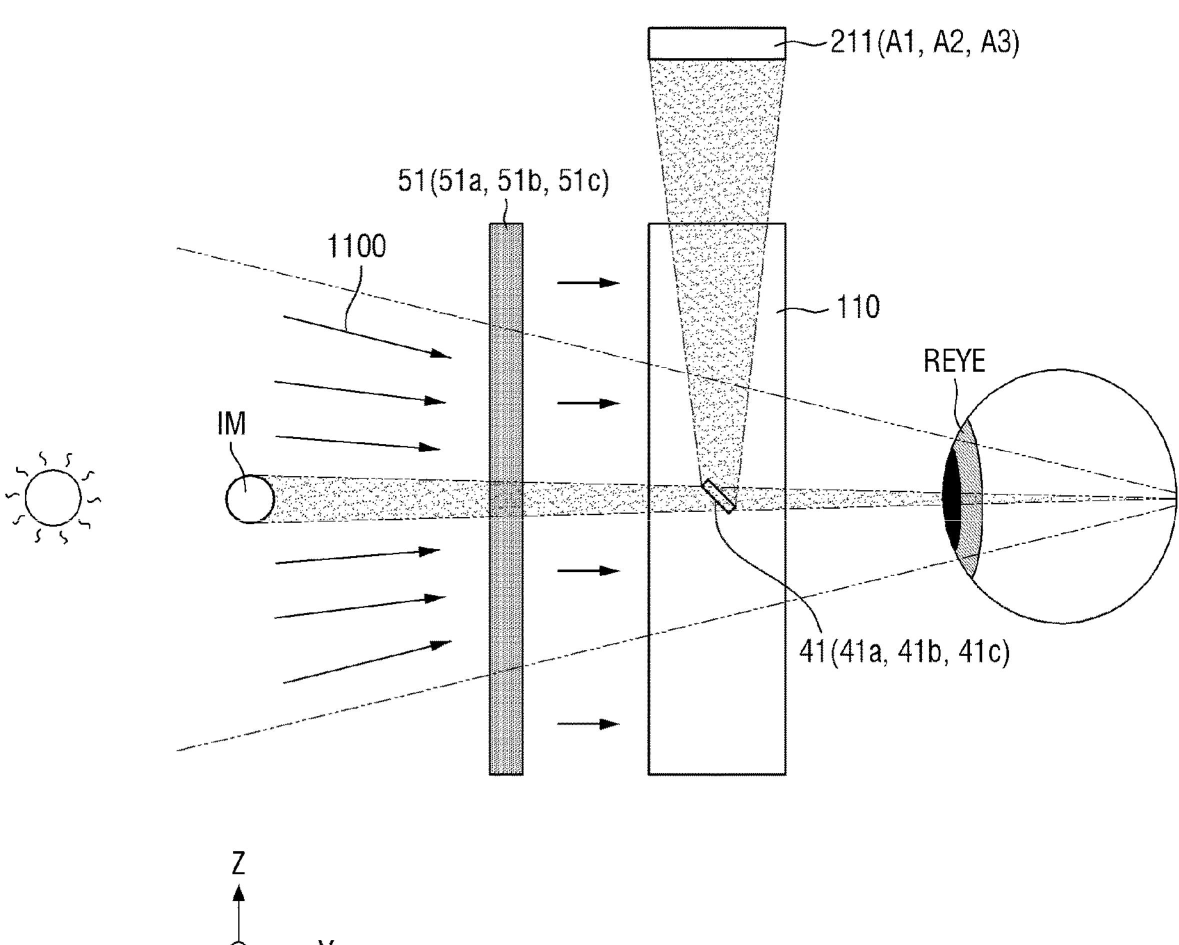

FIG. 36 is a side view illustrating a method of changing a light transmittance of FIG. 34.

Figure 38:
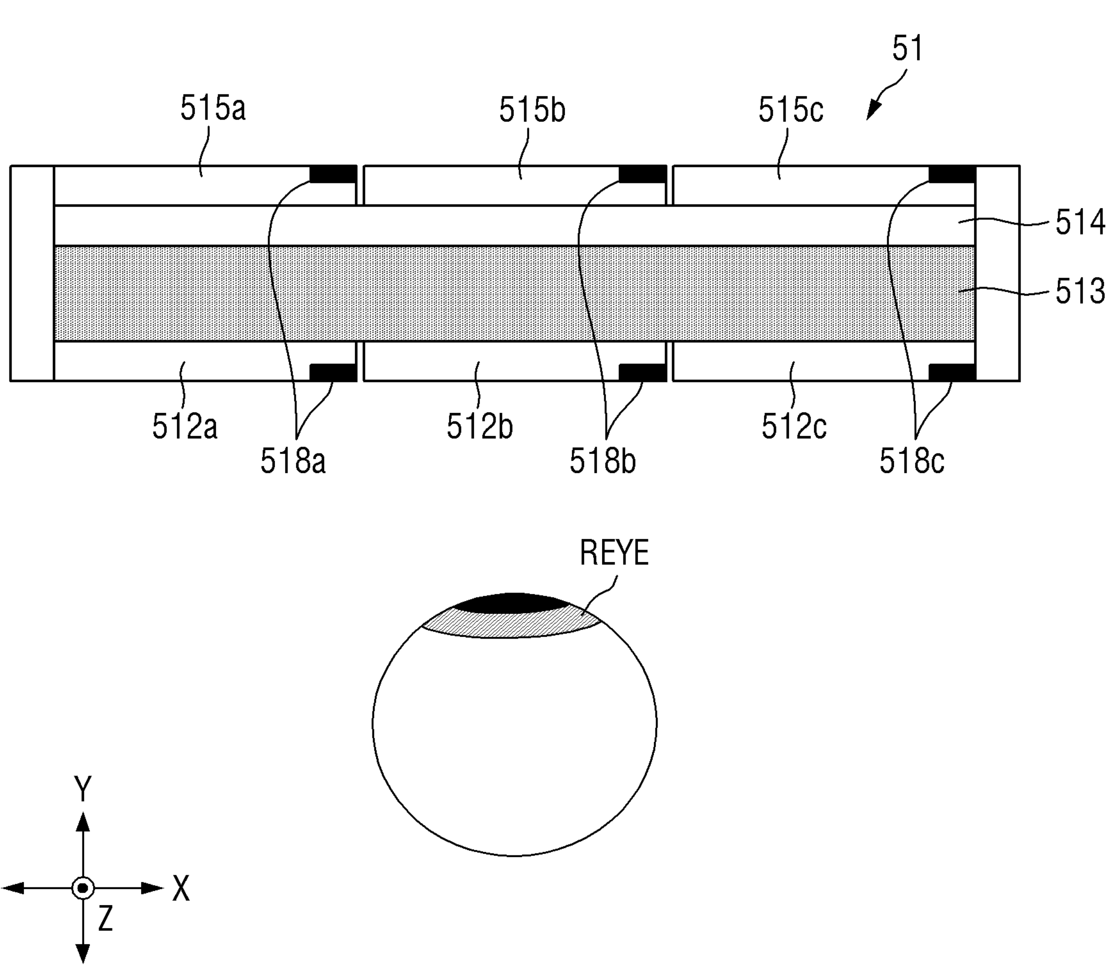

FIGS. 37 to 39 are cross-sectional views illustrating a structure of the filter of FIG. 34.

Figure 40:
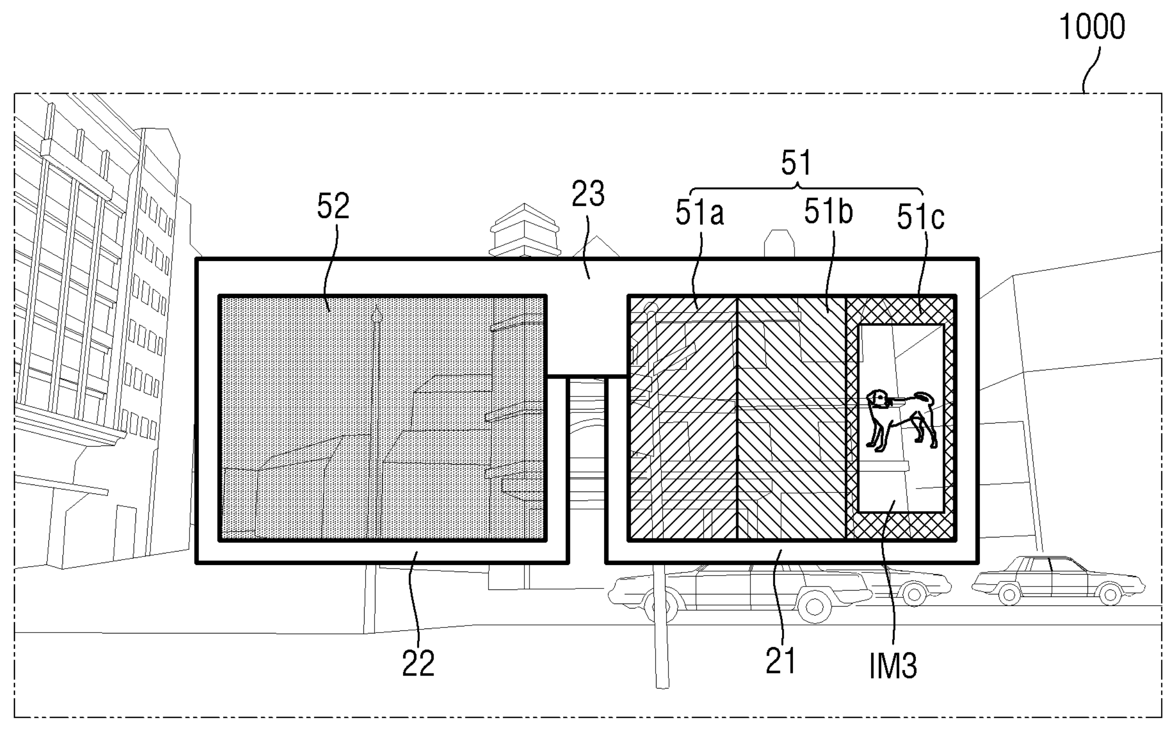

FIG. 40 is a schematic diagram illustrating a method of changing a light transmittance of an AR-providing device.

Figure 41:
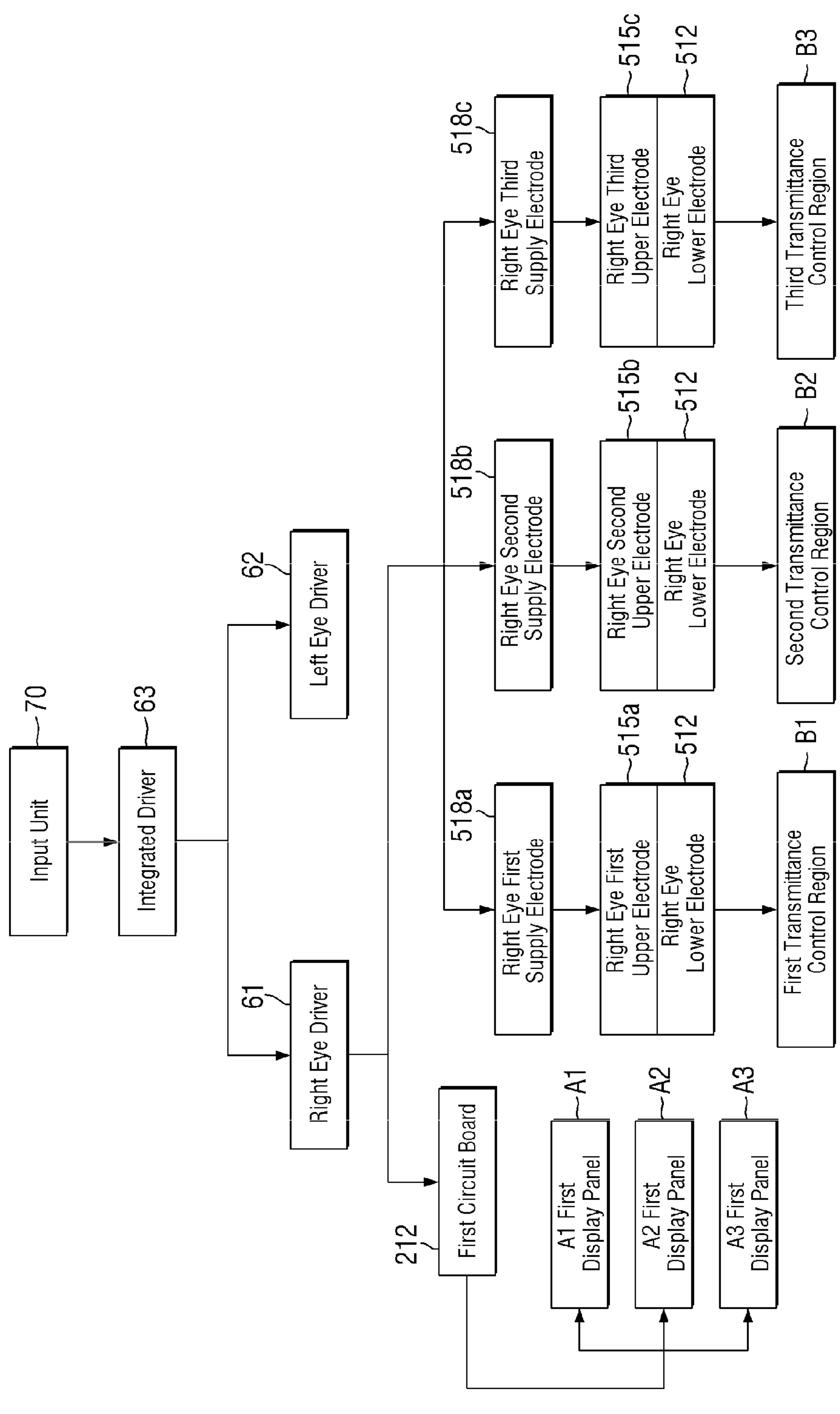
Figure 42:
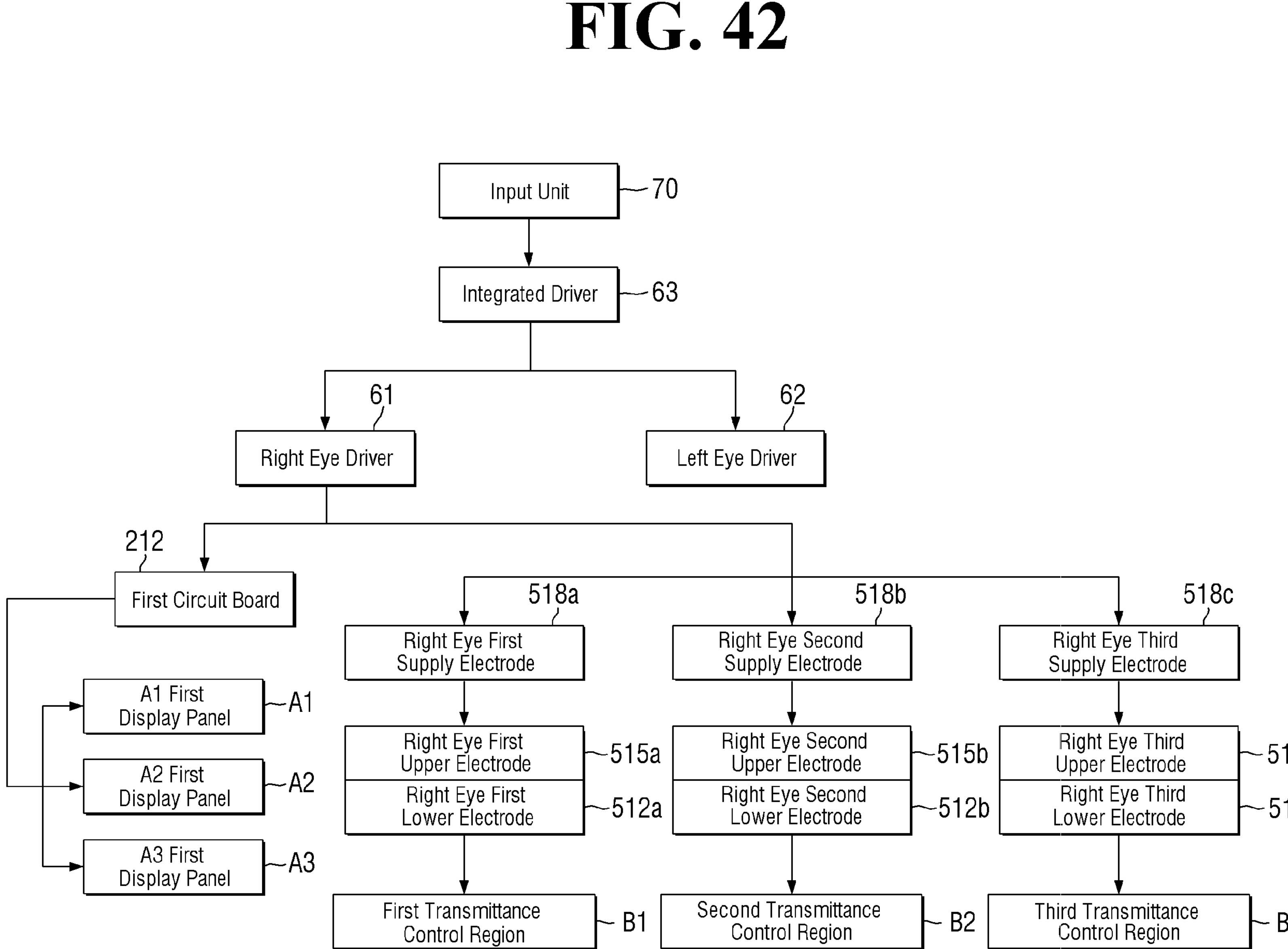

FIGS. 41 to 43 are flowcharts illustrating a driving method of an integrated driver.

Figure 44:
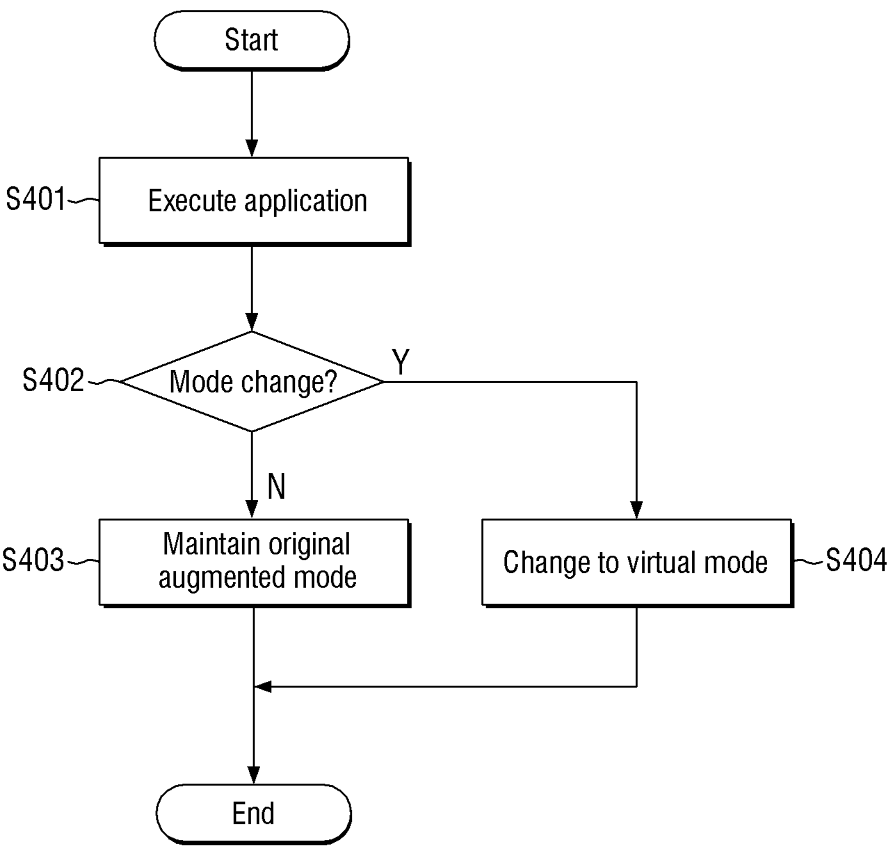

FIG. 44 is a flowchart illustrating a virtual mode change of an AR-providing device according to still other embodiments.

Figure 45:
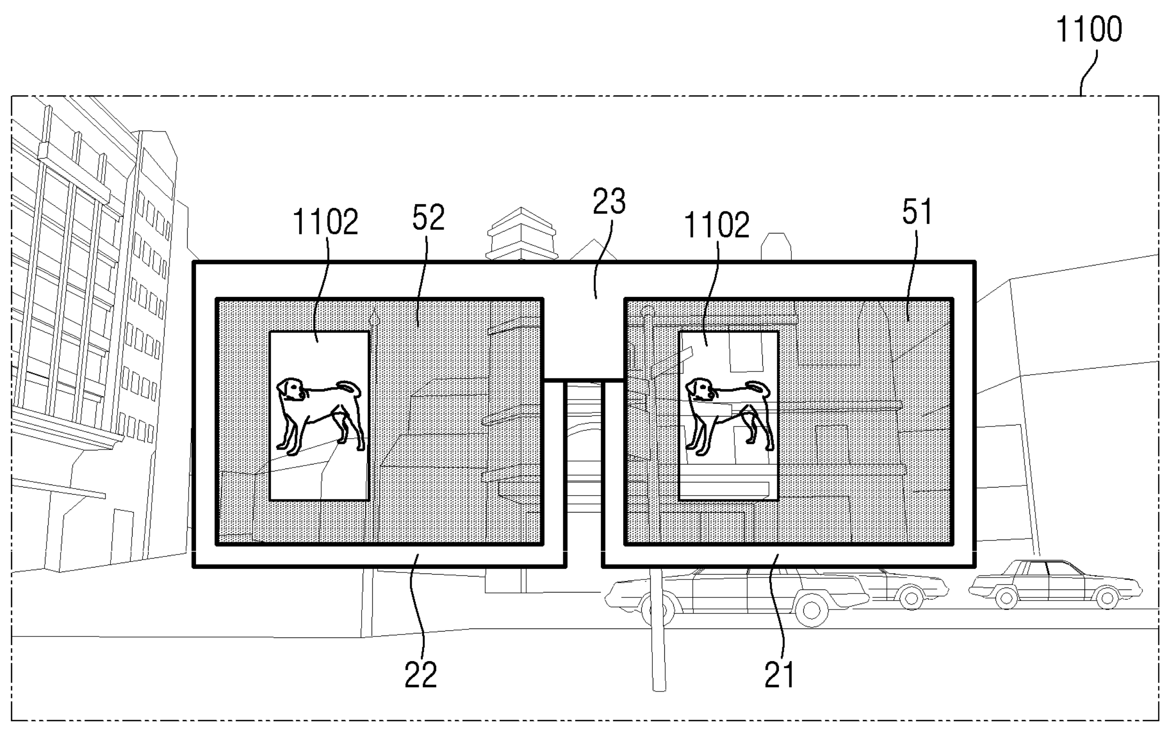
Figure 46:
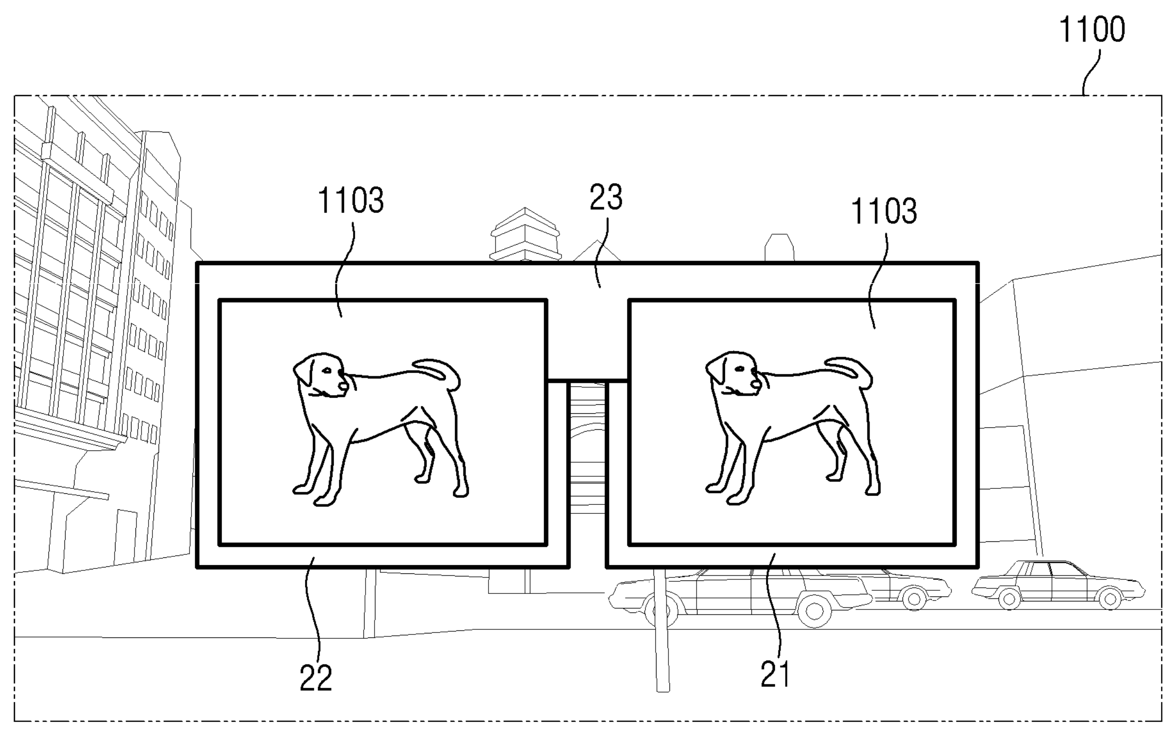

FIGS. 45 and 46 illustrate a method of changing a virtual mode of an AR-providing device according to still other embodiments.

DETAILED DESCRIPTION

Aspects of some embodiments of the present disclosure and methods of accomplishing the same may be understood more readily by reference to the detailed description of embodiments and the accompanying drawings. Hereinafter, embodiments will be described in more detail with reference to the accompanying drawings. The described embodiments, however, may have various modifications and may be embodied in various different forms, and should not be construed as being limited to only the illustrated embodiments herein. Rather, these embodiments are provided as examples so that this disclosure will be thorough and complete, and will fully convey the aspects of the present disclosure to those skilled in the art, and it should be understood that the present disclosure covers all the modifications, equivalents, and replacements within the idea and technical scope of the present disclosure. Accordingly, processes, elements, and techniques that are not necessary to those having ordinary skill in the art for a complete understanding of the aspects of the present disclosure may not be described.

Unless otherwise noted, like reference numerals, characters, or combinations thereof denote like elements throughout the attached drawings and the written description, and thus, descriptions thereof will not be repeated. Further, parts that are not related to, or that are irrelevant to, the description of the embodiments might not be shown to make the description clear.

In the drawings, the relative sizes of elements, layers, and regions may be exaggerated for clarity. Additionally, the use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place.

Thus, the regions illustrated in the drawings are schematic in nature and their shapes are not intended to illustrate the actual shape of a region of a device and are not intended to be limiting. Additionally, as those skilled in the art would realize, the described embodiments may be modified in various different ways, all without departing from the spirit or scope of the present disclosure.

In the detailed description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form to avoid unnecessarily obscuring various embodiments.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

Further, in this specification, the phrase "on a plane," or "plan view," means viewing a target portion from the top, and the phrase "on a cross-section" means viewing a cross-section formed by vertically cutting a target portion from the side.

It will be understood that when an element, layer, region, or component is referred to as being "formed on," "on," "connected to," or "coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection. For example, when a layer, region, or component is referred to as being "electrically connected" or "electrically coupled" to another layer, region, or component, it can be directly electrically connected or coupled to the other layer, region, and/or component or intervening layers, regions, or components may be present. However, "directly connected/directly coupled," or "directly on," refers to one component directly connecting or coupling another component, or being on another component, without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

For the purposes of this disclosure, expressions such as "at least one of," when preceding a list of elements, modify the entire list of elements and do not modify the individual elements of the list. For example, "at least one of X, Y, and Z," "at least one of X, Y, or Z," and "at least one selected from the group consisting of X, Y, and Z" may be construed as X only, Y only, Z only, any combination of two or more of X, Y, and Z, such as, for instance, XYZ, XYY, YZ, and ZZ, or any variation thereof. Similarly, the expression such as "at least one of A and B" may include A, B, or A and B. As used herein, "or" generally means "and/or," and the term "and/or" includes any and all combinations of one or more of the associated listed items. For example, the expression such as "A and/or B" may include A, B, or A and B.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure. The description of an element as a "first" element may not require or imply the presence of a second element or other elements. The terms "first," "second," etc. may also be used herein to differentiate different categories or sets of elements. For conciseness, the terms "first," "second," etc. may represent "first-category (or first-set)," "second-category (or second-set)," etc., respectively.

In the examples, the x-axis, the y-axis, and/or the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. The same applies for first, second, and/or third directions.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

When one or more embodiments may be implemented differently, a specific process order may be performed differently from the described order. For example, two consecutively described processes may be performed substantially at the same time or performed in an order opposite to the described order.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112(a) and 35 U.S.C. § 132(a).

The electronic or electric devices and/or any other relevant devices or components according to embodiments of the present disclosure described herein may be implemented utilizing any suitable hardware, firmware (e.g., an application-specific integrated circuit), software, or a combination of software, firmware, and hardware, to process data or digital signals. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Circuit hardware may include, for example, application specific integrated circuits (ASICs), general purpose or special purpose central processing units (CPUs) that is configured to execute instructions stored in a non-transitory storage medium, digital signal processors (DSPs), graphics processing units (GPUs), and programmable logic devices such as field programmable gate arrays (FPGAs).

Further, the various components of these devices may be a process or thread, running on one or more processors, in one or more computing devices, executing computer program instructions and interacting with other system components for performing the various functionalities described herein. The computer program instructions are stored in a memory that may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 1:
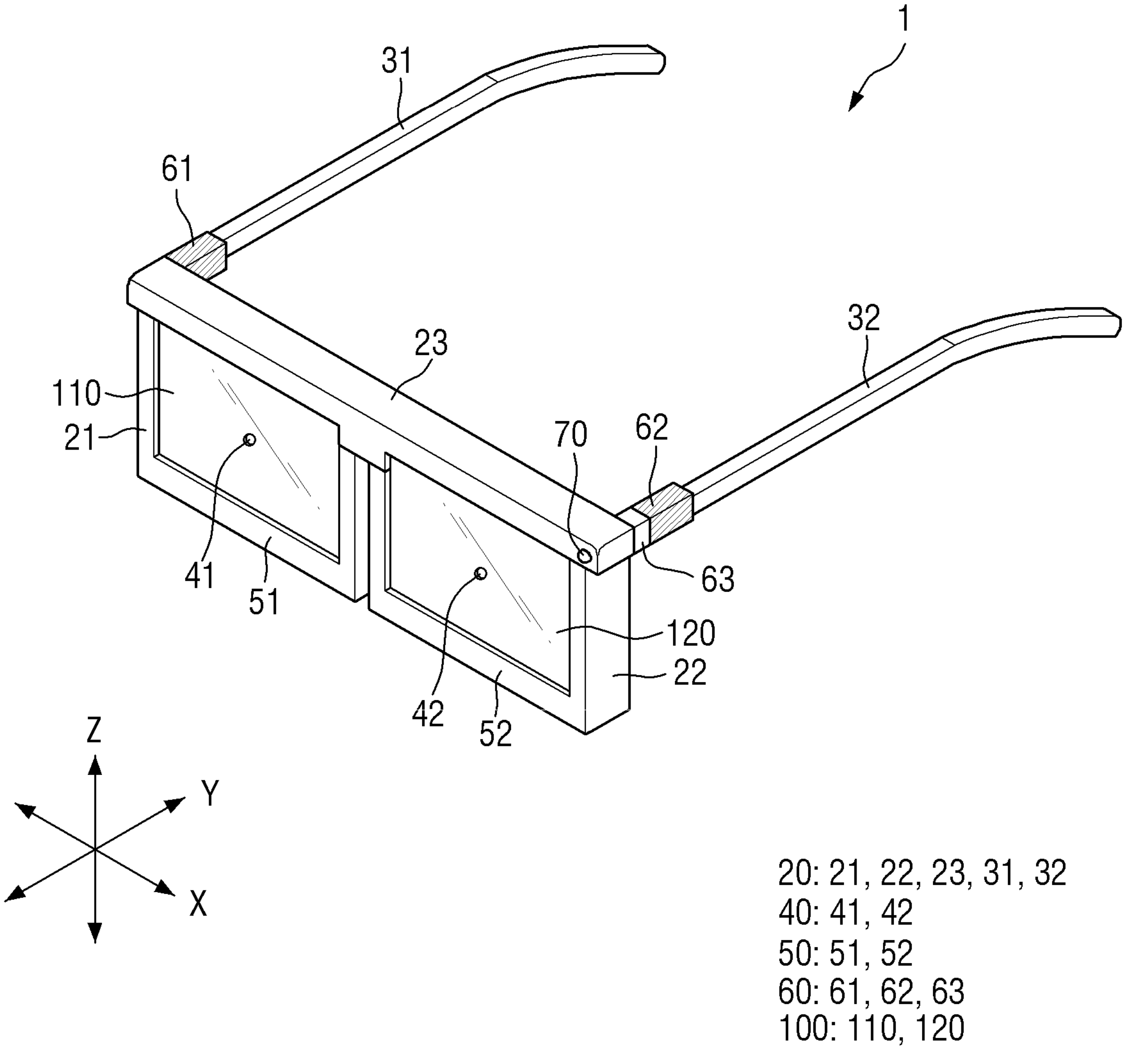
FIG. 1 is a perspective view showing an augmented reality (AR)-providing device according to some embodiments.
Figure 2:
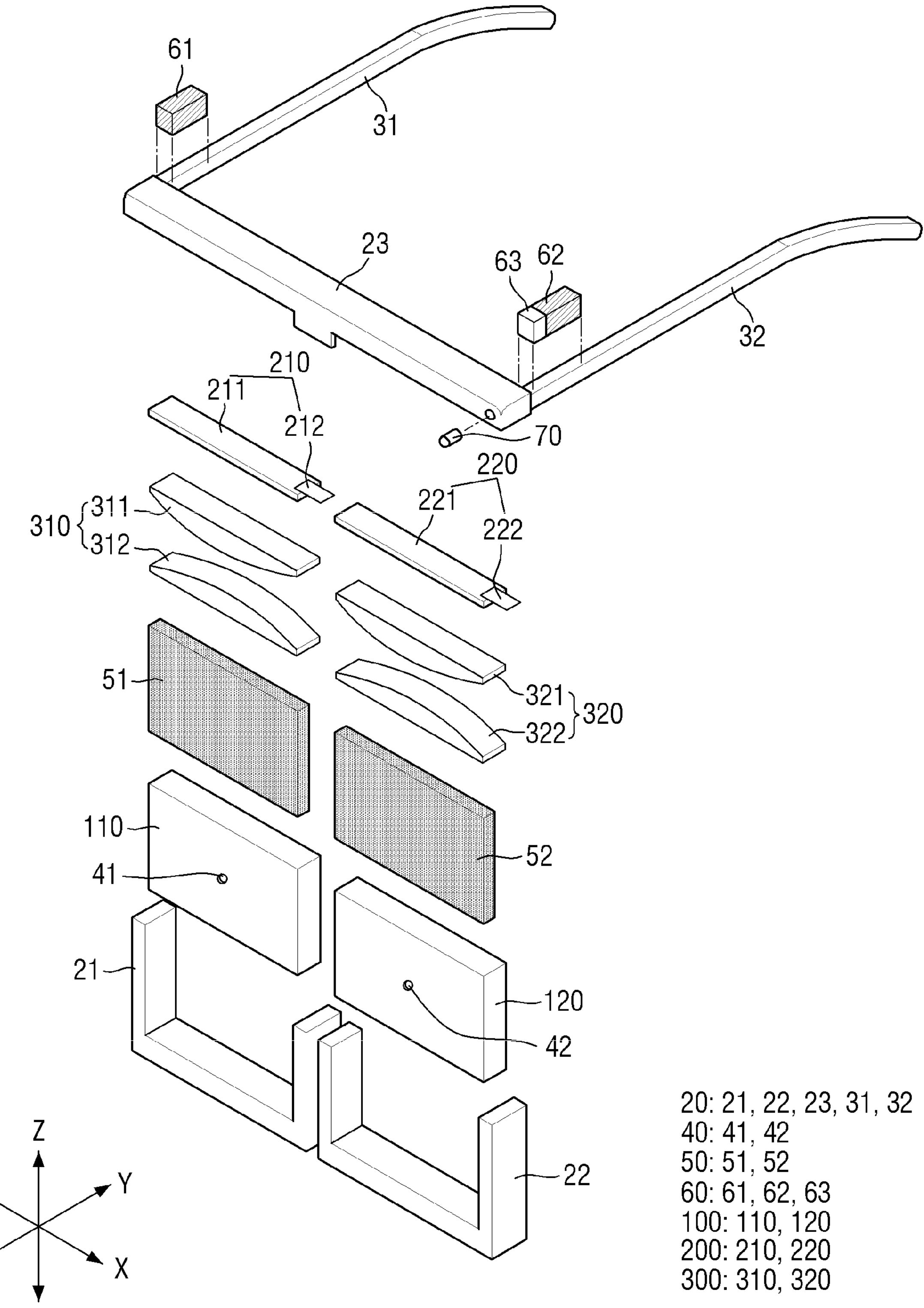
FIG. 2 is an exploded perspective view showing an AR-providing device according to some embodiments.

FIG. 1 is a perspective view showing an augmented reality (AR)-providing device according to some embodiments. FIG. 2 is an exploded perspective view showing an AR-providing device according to some embodiments.

Referring to FIGS. 1 and 2, the AR-providing device 1 according to some embodiments includes a support unit 20, a lens unit 100, a display unit 200, a condenser 300, a reflector 40, a filter unit 50, a driver 60, and a sensor 70.

In the specification, a first direction x refers to a width direction of each of a right eye lens 110 and a left eye lens 120, a second direction y refers to a thickness direction of each of the right eye lens 110 and the left eye lens 120, and a third direction z refers to a height direction of each of the right eye lens 110 and the left eye lens 120.

The lens unit 100 may include a right eye lens 110 and a left eye lens 120.

Figure 3:
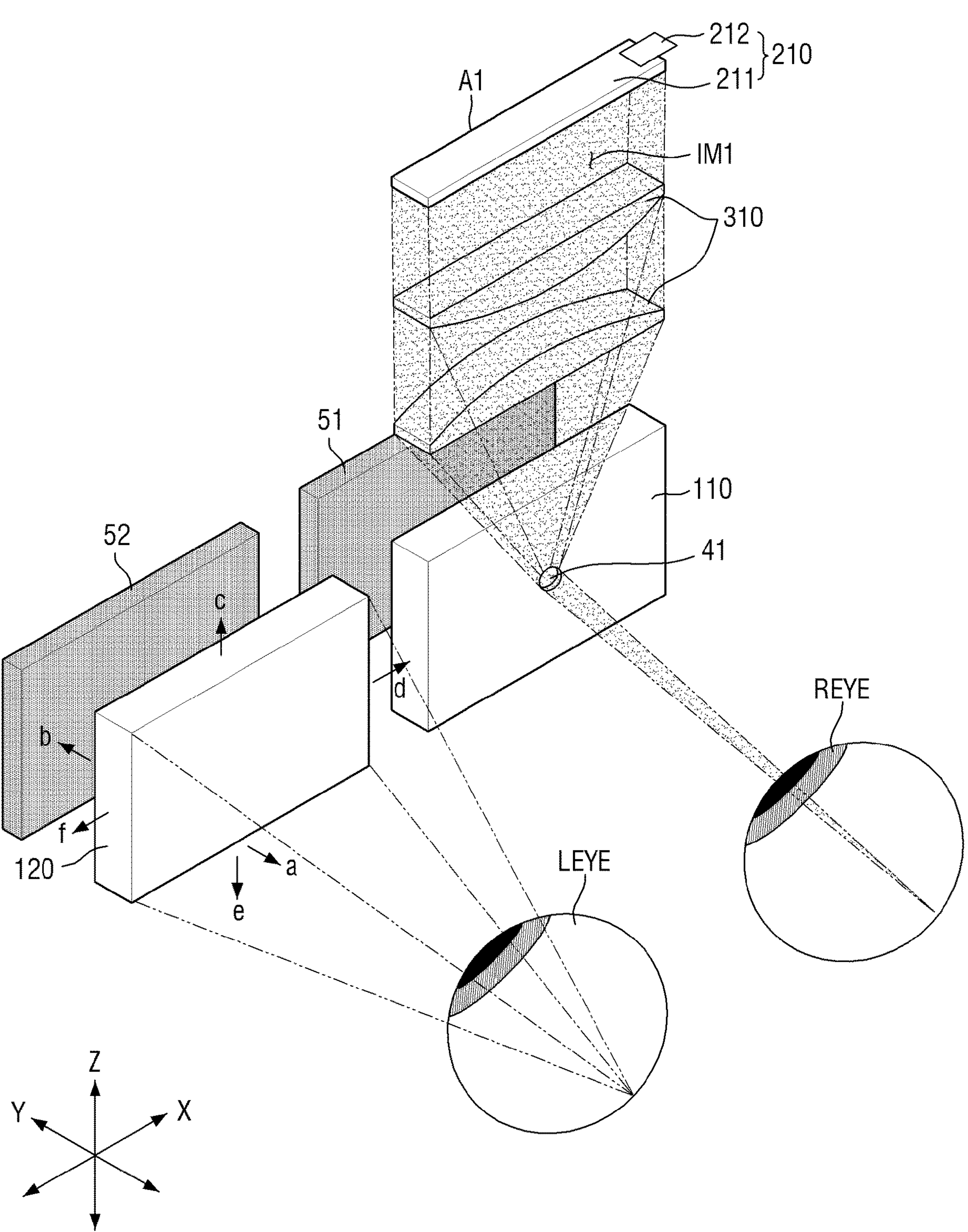
FIG. 3 is a perspective view showing a display method of an AR-providing device according to some embodiments.

As can be seen in FIG. 3, each of the right eye lens 110 and the left eye lens 120 may have a shape of a rectangular parallelepiped including a first surface "a," a second surface "b," and first to fourth side surfaces "c to f" having a quadrilateral shape, although the lenses 110 and 120 are not limited thereto. Unless specifically defined otherwise in the specification, the first surface "a" of the right eye lens 110 and the first surface "a" of the left eye lens 120 may refer to surfaces facing the right eye REYE and the left eye LEYE of the user, respectively, and the second surfaces "b" thereof may refer to outer surfaces of the right eye REYE and the left eye LEYE, respectively. Furthermore, the first side surfaces "c" may refer to side surfaces facing the support unit 20 among the side surfaces of the lenses 110 and 120, the second side surfaces "d" may refer to side surfaces facing each other as the lenses 110 and 120 are adjacent to each other, the third side surface "e" of each of the lenses 110 and 120 may refer to a side surface opposite to the first side surface "c," and the fourth side surface "f" may refer to a side surface opposite to the second side surface "d" of the corresponding one of the lenses 110 and 120.

In other embodiments, each of the right eye lens 110 and the left eye lens 120 may have a polyhedral shape including a first surface "a," a second surface "b" and side surfaces of a polygon other than a quadrangle. Alternatively, each of the right eye lens 110 and the left eye lens 120 may have a shape other than a polyhedron, such as a cylinder, an elliptical cylinder, a semicircular cylinder, a semielliptical cylinder, a distorted cylinder, or a distorted semicircular cylinder. Here, the distorted cylinder and semicircular cylinder refer to a cylinder and a semicircular cylinder having a non-constant diameter.

The user may view the outer world through the right eye lens 110 and the left eye lens 120. The right eye lens 110 and the left eye lens 120 may also be prescribed for vision correction according to the user's eyesight (e.g., may also be corrective lenses).

The first surface "a" of the right eye lens 110, which is the surface facing the user's right eye REYE, may be an exit surface from which light of a first display device 210 is emitted by a right eye reflector 41. The second surface "b" of the right eye lens 110 may be an outer surface of the right eye lens 110.

The first surface "a" of the left eye lens 120, which is the surface facing the user's left eye LEYE, may be an exit surface from which light of a second display device 220 is emitted by a left eye reflector 42. The second surface "b" of the left eye lens 120 may be an outer surface of the left eye lens 120.

The support unit 20 may include a support frame 23, a right eye lens frame 21, a left eye lens frame 22, a first temple 31, and a second temple 32.

The right eye lens frame 21 may be located on the second side surface "d," on the third side surface "e," and on the fourth side surface "f" of the right eye lens 110. The right eye lens frame 21 may be integrally coupled to the support frame 23. The left eye lens frame 22 may be located on the second side surface "d," on the third side surface "e," and on the fourth side surface "f" of the left eye lens 120. The left eye lens frame 22 may be integrally coupled to the support frame 23. In some embodiments, each of the right eye lens frame 21 and the left eye lens frame 22 may include a nose pad. The right eye lens frame 21 and the left eye lens frame 22 may be formed integrally.

The support frame 23 may support the right eye lens 110 and the left eye lens 120 in addition to the right eye lens frame 21 and the left eye lens frame 22.

The support frame 23 may be located on the first side surface "c" of the right eye lens 110 and the first side surface "c" of the left eye lens 120. The support frame 23 may extend in the first direction x. For example, the support frame 23 may be elongated in the first direction x, which is a width direction of the AR-providing device 1, to fix the first temple 31 and the second temple 32, respectively.

The type of the support frame 23 is not limited to a glasses type, and may be a goggles type including a transparent lens or a head mounted type.

The right eye lens 110 may be surrounded by the support frame 23 and the right eye lens frame 21, and the left eye lens 120 may be surrounded by the support frame 23 and the left eye lens frame 22. The right eye lens 110 and the left eye lens 120 may be located integrally on the left and right sides, and may be provided separately.

Although it is illustrated in FIG. 2 that the support frame 23, the right eye lens frame 21, and the left eye lens frame 22 are provided as separate parts and respectively coupled, the disclosure is not limited thereto. The support frame 23, the right eye lens frame 21 and the left eye lens frame 22 may be formed integrally with each other.

The first temple 31 may be located on the support frame 23 to support the right eye lens frame 21, the right eye lens 110, the left eye lens frame 22, and the left eye lens 120. For example, the first temple 31 may be located on the right end of the lower side surface of the support frame 23 to be fixed to the support frame 23, and may support the AR-providing device 1 on the user's body.

The second temple 32 may be located on the support frame 23 to support the right eye lens frame 21, the right eye lens 110, the left eye lens frame 22, and the left eye lens 120. For example, the second temple 32 may be located on the left end of the lower side surface of the support frame 23 to be fixed to the support frame 23, and may support the AR-providing device 1 on the user's body.

Each of the support frame 23, the right eye lens frame 21, the left eye lens frame 22, the first temple 31, and the second temple 32 may include plastic, metal, or both plastic and metal. The right eye lens frame 21 and the left eye lens frame 22 may be omitted in other embodiments.

The reflector 40 may include the right eye reflector 41 and the left eye reflector 42.

The right eye reflector 41 may be located at or near the center of the right eye lens (e.g., with respect to the first surface "a") and between the first surface "a" of the right eye lens 110 and the second surface "b" of the right eye lens 110. The left eye reflector 42 may be located at or near the center of the left eye lens (e.g., with respect to the first surface "a")

and between the first surface "a" of the left eye lens 120 and the second surface "b" of the left eye lens 120. However, although each of the right eye reflector 41 and the left eye reflector 42 may be located in the center of the first surface "a," as shown in FIGS. 1 and 2, the disclosure is not limited thereto.

Each of the right eye reflector 41 and the left eye reflector 42 may be a small mirror, such as a pin mirror. Each of the right eye reflector 41 and the left eye reflector 42 may be formed to be smaller in size than a pupil of the right eye REYE or of the left eye LEYE. For example, the maximum width of each of the right eye reflector 41 and the left eye reflector 42 may be about several tens to several hundreds of μm.

Although each of the right eye reflector 41 and the left eye reflector 42 is illustrated to have a circular planar shape in FIGS. 1 and 2, the disclosure is not limited thereto. Each of the right eye reflector 41 and the left eye reflector 42 may have an elliptical or polygonal planar shape other than a circular shape. In addition, although it is illustrated in FIGS. 1 and 2 that one right eye reflector 41 is located in the right eye lens 110 and one left eye reflector 42 is located in the left eye lens 120, the number of the right eye reflectors 41 located in the right eye lens 110 and the number of the left eye reflectors 42 located in the left eye lens 120 are not limited thereto.

The display unit 200 may include the first display device 210 and the second display device 220.

The first display device 210 may be located on the first side surface "c" of the right eye lens 110, and the second display device 220 may be located on the first side surface "c" of the left eye lens 120. Each of the first display device 210 and the second display device 220 displays a virtual image for realizing an augmented reality. The first display device 210 may include a first display panel 211 and a first circuit board 212. The second display device 220 may include a second display panel 221 and a second circuit board 222.

However, the arrangement position of the first display device 210 and the arrangement position of the second display device 220 are not limited to those illustrated in FIG. 2. For example, the first display device 210 may be located on any one of the first side surface "c" to the fourth side surface "f" of the right eye lens 110, and the second display device 220 may be located on any one of the first side surface "c" to the fourth side surface "f" of the left eye lens 120.

The first display panel 211 and the second display panel 221 may be classified according to a display method, and examples thereof may include an organic light-emitting display (OLED) device, an inorganic light-emitting display (inorganic EL) device, a quantum dot light-emitting display (QED) device, a micro-LED display device, a nano-LED display device, a plasma display device (PDP), a field emission display (FED) device and a cathode ray tube (CRT) display device, a liquid crystal display (LCD) device, an electrophoretic display (EPD) device, and the like. Hereinafter, a micro LED display device will be described as an example of the display device, the micro LED display panel applied to some embodiments will be simply referred to as the display panel unless special distinction is required. A detailed description of the first display panel 211 will be made later with reference to FIGS. 9 to 13.

A first circuit board 212 may be attached to one end of the first display panel 211. The first display panel 211 may receive externally supplied digital video data (e.g., from the outside) through the first circuit board 212, and may receive power from an external power supply unit. The second circuit board 222 may be attached to one end of the second display panel 221. The second display panel 221 may receive externally supplied digital video data through the second circuit board 222, and may receive power from the external power supply unit. The first circuit board 212 and the second circuit board 222 may be flexible printed circuit boards, which may be curved or bent.

The condenser 300 may include a right eye condenser 310 and a left eye condenser 320.

The right eye condenser 310 may be located between the first display device 210 and the first side surface "c" of the right eye lens 110, and the left eye condenser 320 may be located between the second display device 220 and the first side surface "c" of the left eye lens 120. Each of the right eye condenser 310 and the left eye condenser 320 may include at least one convex lens. As the number of convex lenses of each of the right eye condenser 310 and the left eye condenser 320 increases, the refractive index increases and the condensing effect increases, although the length of each of the right eye condenser 310 and the left eye condenser 320 in the third direction z may increase.

The right eye condenser 310 may include a first right eye convex lens 311 and a second right eye convex lens 312. The second right eye convex lens 312 may be located between the first right eye convex lens 311 and the first side surface "c" of the right eye lens 110.

The first right eye convex lens 311 may be convex toward the side on which the second right eye convex lens 312 is located. That is, the first right eye convex lens 311 may be convex in a downward direction. The second right eye convex lens 312 may be convex toward the side on which the first right eye convex lens 311 is located. That is, the second right eye convex lens 312 may be convex in an upward direction. However, the convex shape of the first right eye convex lens 311 and the convex shape of the second right eye convex lens 312 are not limited to those illustrated in FIG. 2.

The left eye condenser 320 may include a first left eye convex lens 321 and a second left eye convex lens 322. The second left eye convex lens 322 may be located between the first left eye convex lens 321 and the first side surface "c" of the left eye lens 120. The first left eye convex lens 321 may be convex toward the side on which the second left eye convex lens 322 is located. That is, the first left eye convex lens 321 may be convex in a downward direction. The second left eye convex lens 322 may be convex toward the side on which the first left eye convex lens 321 is located. That is, the second left eye convex lens 322 may be convex in an upward direction. However, the convex shape of the first left eye convex lens 321 and the convex shape of the second left eye convex lens 322 are not limited to those illustrated in FIG. 2.

FIG. 3 is a perspective view showing a display method of an AR-providing device according to some embodiments.

The first display panel 211 of the first display device 210 may be located on (e.g., above) the first side surface "c" of the right eye lens 110 as shown in FIG. 3. The first display panel 211 may include a first region A1 located on the first side surface "c" of the right eye lens 110.

A first image IM1 is displayed in the first region A1 of the first display panel 211. The first image IM1 displayed by the first region A1 of the first display panel 211 may be condensed through the first right eye convex lens 311 and the second right eye convex lens 312 of the right eye condenser 310.

The right eye reflector 41 may be tilted so that the first image IM1 is reflected and provided to the user's right eye REYE thereafter. The right eye reflector 41 may be located closest to the upper side surface of the right eye lens 110 arranged in the first region A1. For example, the right eye reflector 41 may reflect the first image IM1 condensed through the right eye condenser 310, and may reflect the first image IM1 toward the user's right eye REYE.

The first image IM1 reflected by the right eye reflector 41 may be emitted to the second surface "b" of the right eye lens 110 to be focused on or near the retina of the user's right eye REYE.

Accordingly, the user may view the first image IM1 through the right eye REYE.

In addition, because the user may view the first image IM1 together with the view of the external world seen through the right eye filter 51, an augmented reality may be provided to the user's right eye REYE.

Meanwhile, because the second display device 220 may be implemented in substantially the same manner as the first display device 210 described with reference to FIG. 3, description of the second display device 220 will be omitted.

The filter unit 50 is configured to adjust the luminous intensity of the external light reaching the user's eye by electrically changing the transmittance of light (external light) incident on the AR-providing device 1 from the outside. The filter unit 50 may include a right eye filter 51 and a left eye filter 52.

Figure 4:
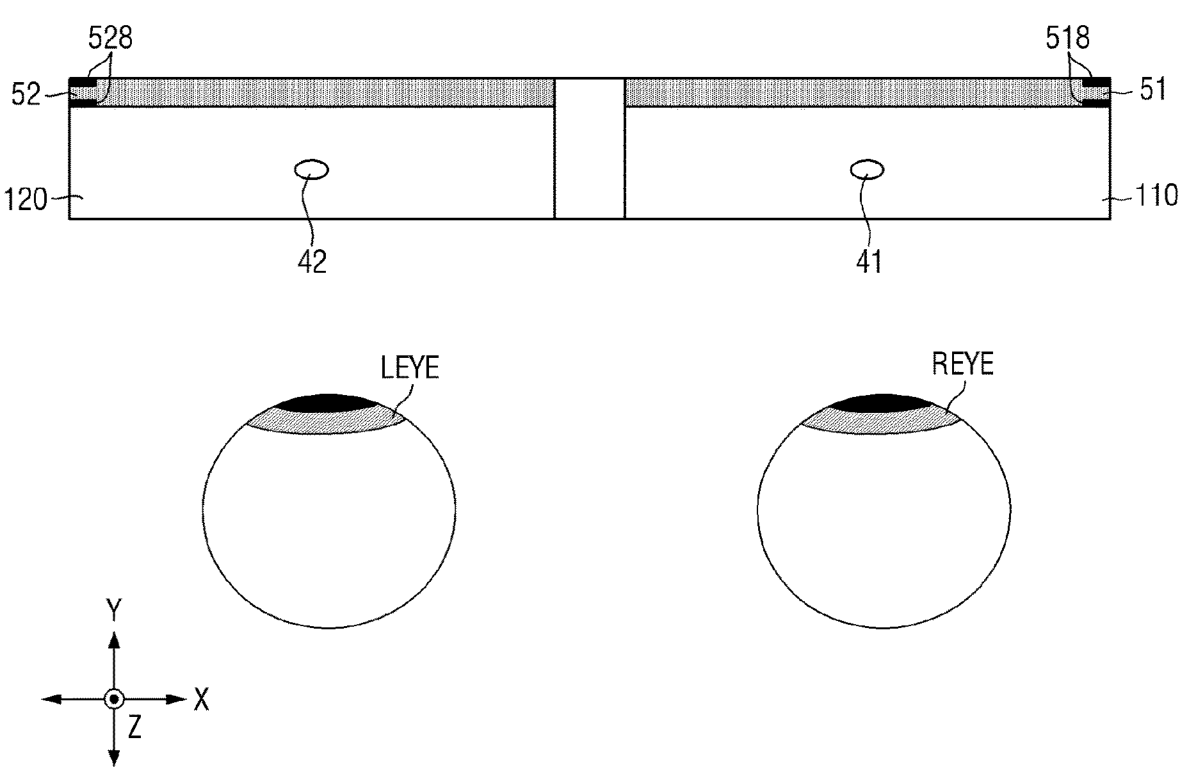
Figure 5:
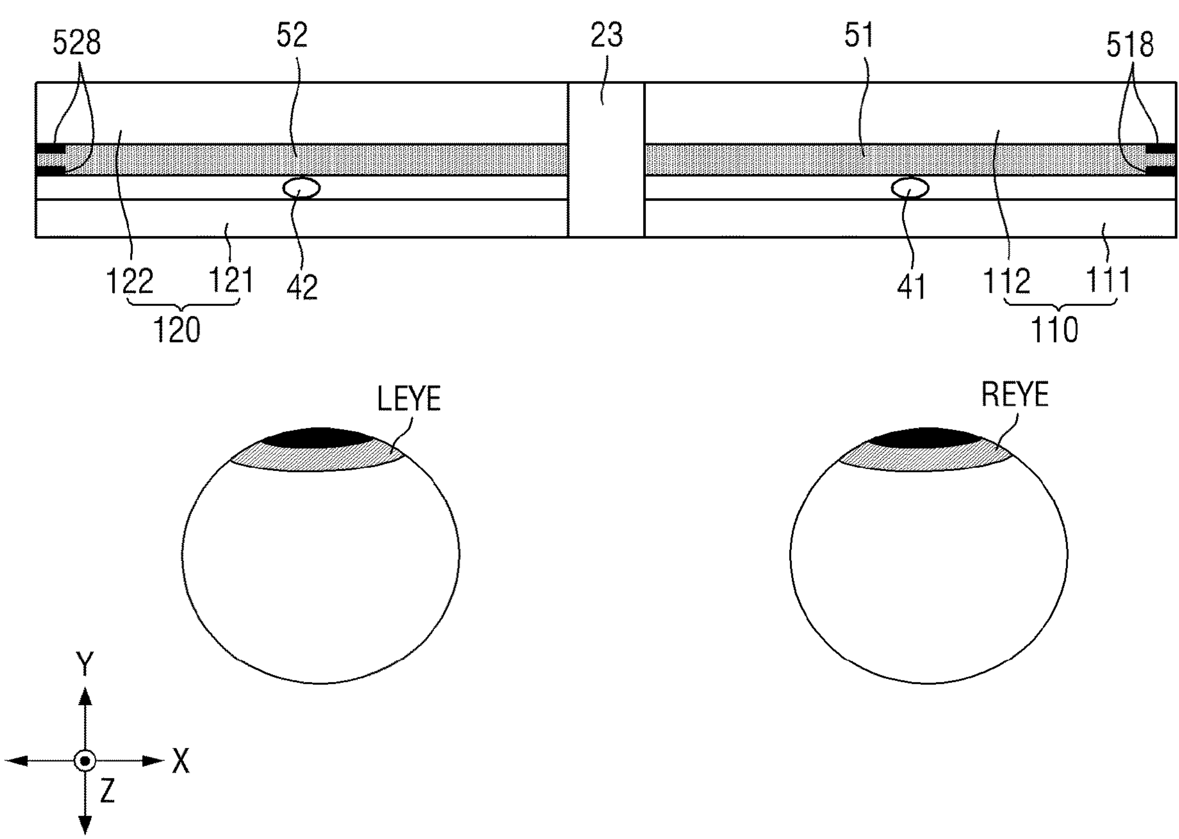

FIGS. 4 to 5 are cross-sectional views illustrating an arrangement of the filters and FIG. 6 is a cross-sectional view illustrating a structure of the filter.

The right eye filter 51 may be located on the second surface "b" of the right eye lens 110. In addition, the right eye filter 51 may be located on the first surface "a" of the right eye lens 110, may be located internally between the first surface "a" of the right eye lens 110 and the second surface "b" of the right eye lens 110, or may be located substantially parallel to the first surface "a" of the right eye lens 110.

The left eye filter 52 may be located on the second surface "b" of the left eye lens 120. In addition, the left eye filter 52 may be located on the first surface "a" of the left eye lens 120, may be located internally between the first surface "a" of the left eye lens 120 and the second surface "b" of the left eye lens 120, or may be located substantially parallel to the first surface "a" of the left eye lens 120.

Each of the right eye filter 51 and the left eye filter 52 may include an electrochromic element. In a case where the electrochromic element is used, the transmittance of the filter may be adjusted according to the magnitude of the voltage supplied to each of the right eye filter 51 and the left eye filter 52, so that it is possible to maintain constant clarity and visibility for the user. A detailed description of the filter unit 50 will be made later with reference to FIGS. 4 to 6.

Referring again to FIG. 2, the driver 60 may include a right eye driver 61, a left eye driver 62, and an integrated driver 63.

The integrated driver 63 may be formed as an integrated circuit (IC) to be located on the second temple 32. The integrated driver 63 may be located on the second temple 32 adjacent to the left eye driver 62. The integrated driver 63 may be located adjacent to the support frame 23 in the second direction y. For example, the integrated driver 63 may be located on the second temple 32 at a distance from the support frame 23 in the second direction y, which may be obtained by internally dividing the second temple 32 in a ratio of 1:5 (e.g., may be ⅕$^{th}$ of a length of the second temple 32 from the support frame 23).

However, the present disclosure is not limited thereto, and the integrated driver 63 may be located adjacent to the right eye driver 61 and/or the left eye driver 62, or may be located independently of the right eye driver 61 and/or the left eye driver 62. In addition, the integrated driver 63 may be spaced apart from the first temple 31, the second temple 32, or the support frame 23 along the second direction y, or may be assembled to at least one side thereof, or may be formed integrally with the support frame 23.

The right eye driver 61 and the left eye driver 62 may be located as integrated circuits (IC) on the first temple 31 and the second temple 32, respectively. The right eye driver 61 may be located adjacent to the support frame 23 in the second direction y, and the left eye driver 62 may be located adjacent to the support frame 23 in the second direction y while being adjacent to the integrated driver 63. For example, the right eye driver 61 may be located on the first temple 31 at a distance from the support frame 23 in the second direction y, which may obtained by internally dividing the first temple 31 in a ratio of 1:5. The left eye driver 62 may be located on the second temple 32 at a distance from the support frame 23 in the second direction y, which may be obtained by internally dividing the second temple 32 in a ratio of 1:5.

However, the present disclosure is not limited thereto, and each of the right eye driver 61 and the left eye driver 62 may be located adjacent to the integrated driver 63, or the right eye driver 61 and the left eye driver 62 may be located adjacent to each other in the second direction y. In addition, the right eye driver 61 and the left eye driver 62 may be spaced apart (e.g., along the second direction y) on the first temple 31, on the second temple 32, or on the support frame 23, or may be assembled to at least one side thereof, and may be formed integrally with the support frame 23. A detailed description of the driver 60 will be made later with reference to FIG. 8.

Referring to FIGS. 1 and 2, the sensor 70 may be configured to detect the luminous intensity of external light (ambient brightness or ambient luminance of the AR-providing device 1). The sensor 70 is assembled or integrally formed on the support frame 23 to detect luminous intensity, illuminance, and the like. The sensor 70 may detect the intensity of external light.

The sensor 70 may be located on the support frame 23 on or near the side of the second surface "b" of the right eye lens 110 and the left eye lens 120, which is the outer side of the user's eyes. In addition, the sensor 70 may be located on the support frame 23 on the lateral side of the right eye lens 110 and/or the left eye lens 120.

An example of the sensor 70 may be a photodiode or the like. The sensor 70 is a representative example of a luminous intensity detector according to some embodiments.

FIGS. 4 and 5 are cross-sectional views illustrating an arrangement of a filter of an AR-providing device according to some embodiments of the disclosure. FIG. 6 is a cross-sectional view illustrating a structure of a right eye filter of an AR-providing device according to some embodiments of the disclosure.

Referring to FIGS. 4 and 5, the right eye filter 51 may be coupled to the second surface "b" of the right eye lens 110, and/or the right eye filter 51 may be also be coupled to the first surface "a" of the right eye lens 110. In addition, the right eye filter 51 may be coupled to the second surface "b" side internally between a first right eye lens 111 and a second right eye lens 112 of the right eye lens 110. The right eye filter 51 may be integrally included in the first surface "a" of the right eye lens 110, and may be substantially parallel to the first surface "a" of the right eye lens 110 or may overlap the first surface "a" of the right eye lens 110. The right eye filter 51 may be attached onto the right eye lens 110 in the form of a film. Although the arrangement of the right eye filter 51 on the right eye lens 110 is illustrated in FIGS. 4 to 5, the disclosure is not limited thereto.

Referring to FIG. 6, the right eye filter 51 includes a right eye lower electrode 512, an electrochromic layer 513, an electrolyte layer 514, a right eye upper electrode 515, and a right eye supply electrode 518.

The right eye lower electrode 512 may be located on the second surface "b" of the right eye filter 51. Also, or alternatively, the right eye lower electrode 512 may be located on the first surface "a" of the right eye filter 51. The right eye upper electrode 515 may face the right eye lower electrode 512 on the first surface "a" of the right eye filter 51. In addition, or alternatively, the right eye upper electrode 515 may face the right eye lower electrode 512 on the second surface "b" of the right eye filter 51.

The right eye lower electrode 512 and the right eye upper electrode 515 may each be formed of an indium tin oxide (ITO) layer (hereinafter, referred to as an ITO layer). The ITO layer may include an ITO film or ITO glass. In addition, the ITO layer may be implemented by replacing ITO with silver nanowires, copper meshes, silver meshes, silver salts, and silver nanoparticles.

The right eye filter 51 may include the electrochromic layer 513, which is located on, or adjacent to, the right eye lower electrode 512, and in which a light transmittance is changed in response to a supply voltage. The right eye filter 51 may also include an electrolyte layer 514 located on the electrochromic layer 513, the right eye upper electrode 515 located on the electrolyte layer 514, and the right eye supply electrode 518 connected to each of the right eye lower electrode 512 and the right eye upper electrode 515, the supply voltage being inputted to the right eye supply electrode 518.

The right eye supply electrode 518 may be implemented as a transparent electrode. The right eye supply electrode 518 may input the supply voltage to each of the right eye lower electrode 512 and the right eye upper electrode 515. It may be understood by those skilled in the art that each of the locations of the right eye supply electrodes 518 (e.g., the upper right end of the right eye lower electrode 512 and the upper left end of the right eye upper electrode 515) may be changed in response to the performance or structure of the AR-providing device 1.

Because the left eye filter 52 may be located in substantially the same way as the right eye filter 51 illustrated in FIG. 6, description of the left eye filter 52 will be omitted.

Figure 7:
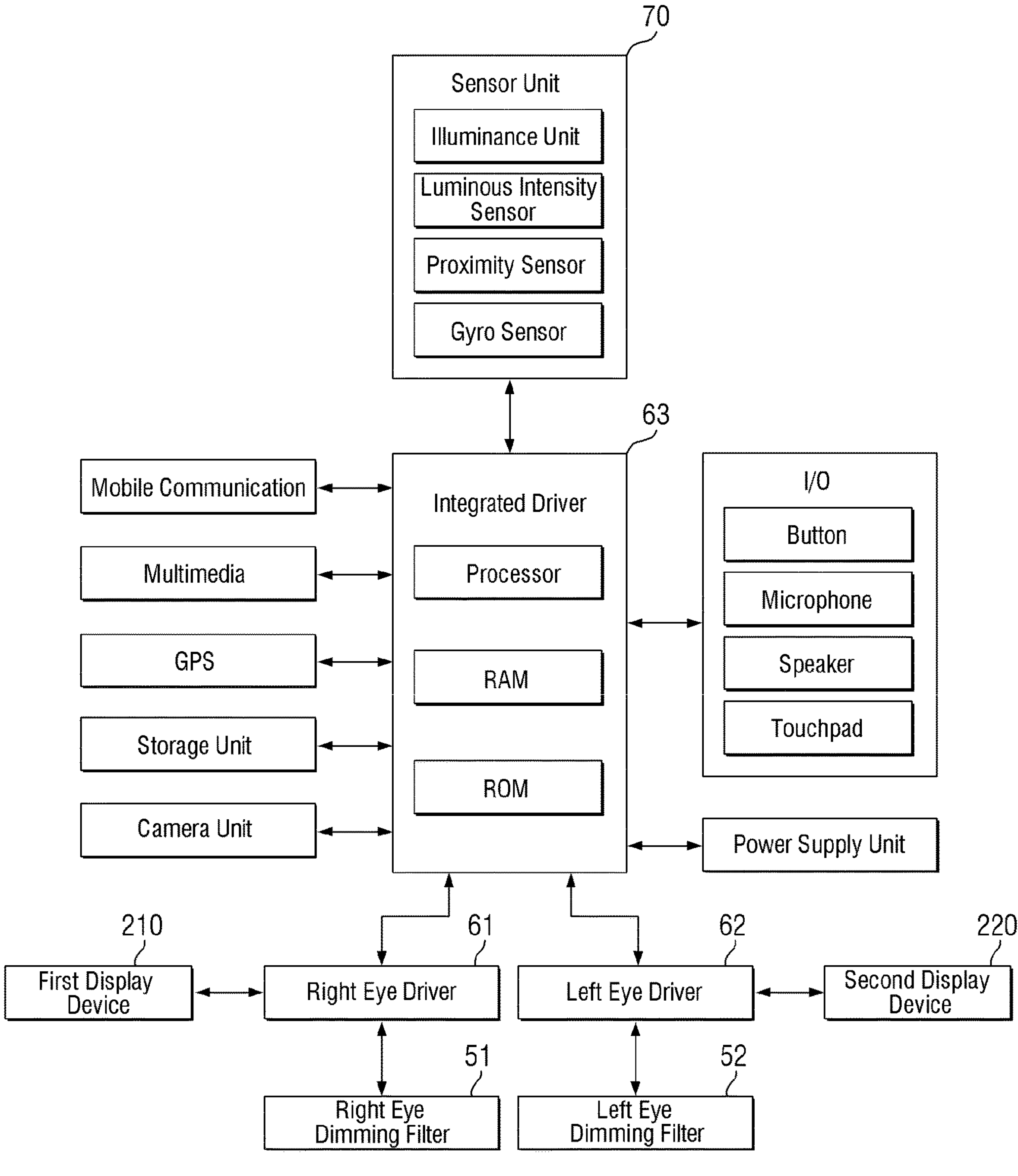
FIG. 7 is a schematic block diagram illustrating an AR-providing device according to some embodiments of the disclosure.
Figure 8:
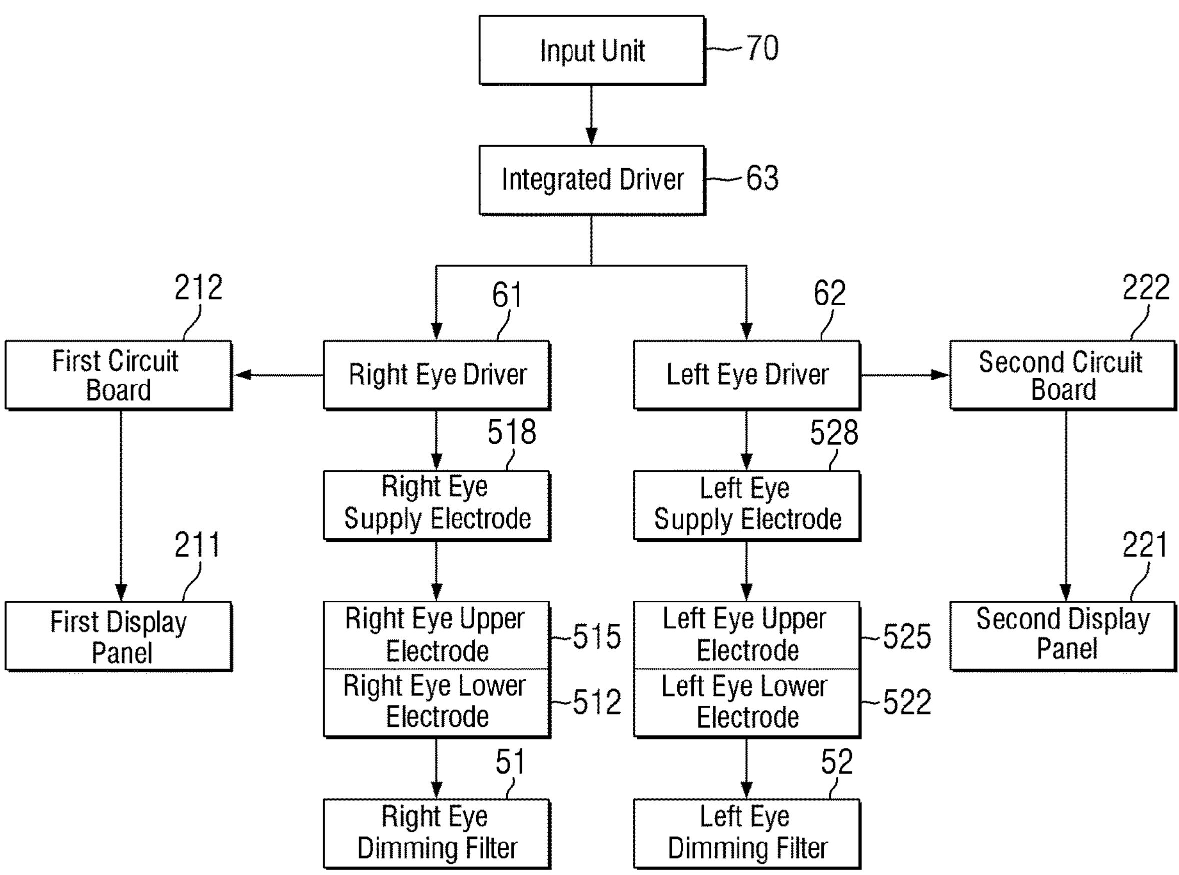
FIG. 8 is a flowchart illustrating a method of controlling transmittance of a filter unit and luminance of a display unit of an AR-providing device according to some embodiments.

FIG. 7 is a schematic block diagram illustrating an AR-providing device according to some embodiments of the disclosure. FIG. 8 is a flowchart illustrating a method of controlling transmittance of a filter unit and luminance of a display unit of an AR-providing device according to some embodiments.

Referring to FIGS. 7 and 8, the integrated driver 63 may adjust the right eye driver 61 to adjust the transmittance of the right eye filter 51, and the luminance of the first display panel 211 of the first display device 210, based on the luminous intensity of external light obtained by the sensor 70. In addition, the integrated driver 63 may adjust the left eye driver 62 to adjust the transmittance of the left eye filter 52, and the luminance of the second display panel 221, of the second display device 220. The integrated driver 63 may independently drive each of the right eye driver 61 and the left eye driver 62 in accordance to a usage environment.

The integrated driver 63 may include various functions other than the above-described functions. The integrated driver 63 may include a central processing unit (CPU), a read-only memory (ROM), a random access memory (RAM), a main memory, and the like.

The right eye driver 61 may be located on the first temple 31. The right eye driver 61 may supply (e.g., to the first circuit board 212) data voltages, a power voltage, and the like for driving the first display panel 211 through the first circuit board 212 of the first display device 210. For example, when a luminance value (e.g., a data value stored in a storage unit) of the first display device 210 according to the input of the sensor 70 is inputted from the integrated driver 63, the right eye driver 61 transmits data of a luminance value (e.g., a predetermined luminance value) of the first display device 210 to at least one first circuit board 212. Then, the luminance of at least one first display device 210 may be controlled so that the luminance value of the first display device 210 is displayed through at least one first display panel 211, the right eye reflector 41, and the right eye lens 110 in sequential order.

To control the transmittance of the right eye filter 51, the right eye driver 61 may adjust the driving voltage, and may supply it to the right eye supply electrode 518. For example, when a transmittance value (e.g., a data value stored in the storage unit) of the right eye filter 51 according to the input of the sensor 70 is inputted from the integrated driver 63, the right eye driver 61 transmits data of a transmittance value (e.g., a predetermined transmittance value) of the right eye filter 51 to at least one right eye supply electrode 518. Then, at least one right eye supply electrode 518 may provide a voltage to at least one right eye upper electrode 515 and at least one right eye lower electrode 512. The transmittance of the right eye filter 51 may be controlled based on the transmittance of the electrochromic layer 513, which may be adjusted by at least one right eye upper electrode 515 and the right eye lower electrode 512.

The left eye driver 62 may be located on the second temple 32. The left eye driver 62 may supply (e.g., to the second circuit board 222) data voltages, a power voltage, and the like for driving the second display panel 221 through the second circuit board 222 of the second display device 220. For example, when a luminance value (e.g., a data value stored in the storage unit) of the second display device 220, according to the input of the sensor 70, is inputted from the integrated driver 63, the left eye driver 62 may transmit data of a luminance value (e.g., a predetermined luminance value) of the second display device 220 to at least one second circuit board 222. Then, the luminance of at least one second display device 220 may be controlled so that the luminance value of the second display device 220 is displayed through at least one second display panel 221, the left eye reflector 42, and the left eye lens 120 in sequential order.

To control the transmittance of the left eye filter 52, the left eye driver 62 may adjust the driving voltage, and may supply it to a left eye supply electrode 528. For example, when a transmittance value (e.g., a data value stored in the storage unit) of the left eye filter 52, according to the input of the sensor 70, is inputted from the integrated driver 63, the left eye driver 62 transmits data of a transmittance value (e.g., a predetermined transmittance value) of the left eye filter 52 to at least one left eye supply electrode 528. Then, at least one left eye supply electrode 528 may provide a voltage to at least one left eye upper electrode 525 and at least one left eye lower electrode 522.

The transmittance of the left eye filter 52 may be controlled based on the transmittance of an electrochromic layer 523, which may be adjusted by at least one left eye upper electrode 525 and the left eye lower electrode 522.

FIGS. 9 to 13 are diagrams of a first display device according to some embodiments of a micro LED.

Figure 9:
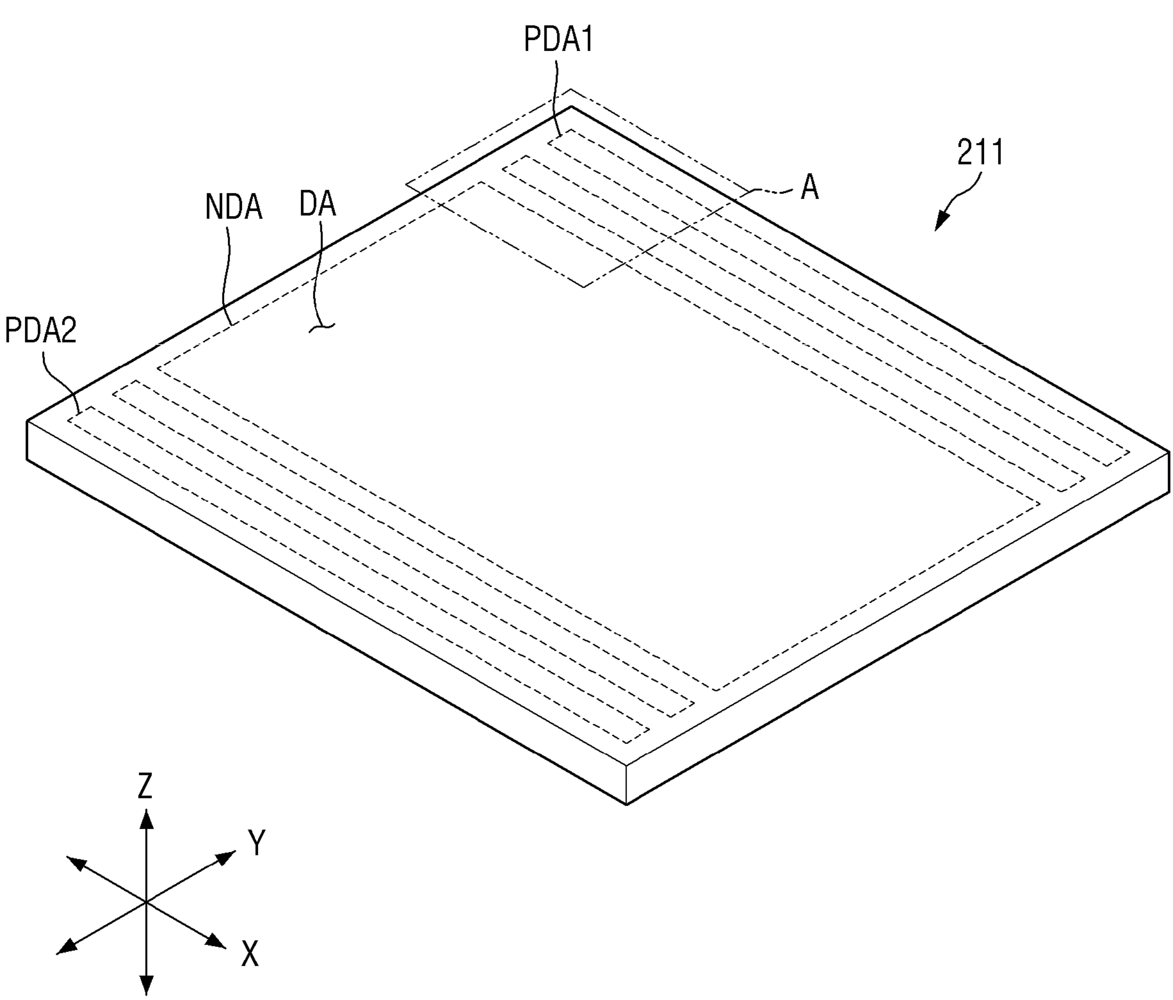
FIG. 9 is a perspective view illustrating a first display device according to some embodiments.
Figure 10:
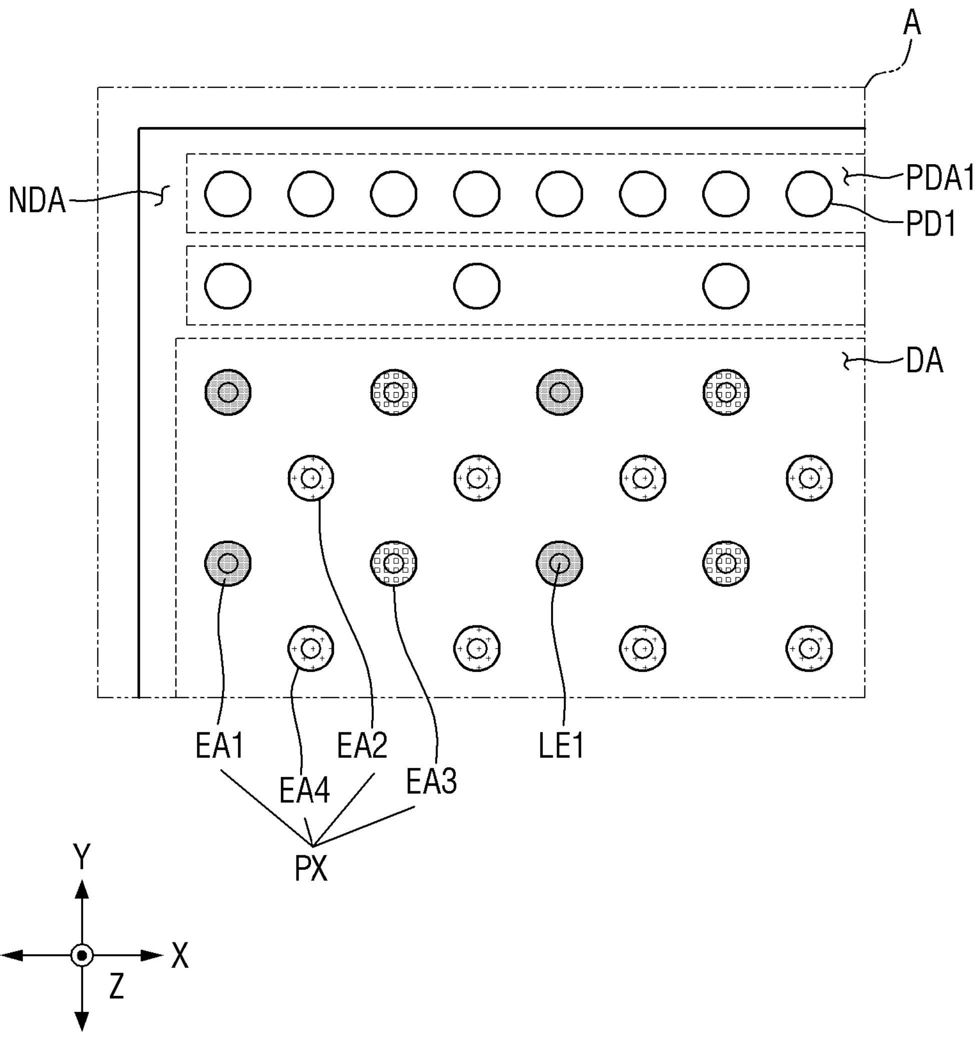
FIG. 10 is a layout diagram showing in detail an example of area A of FIG. 1.
Figure 11:
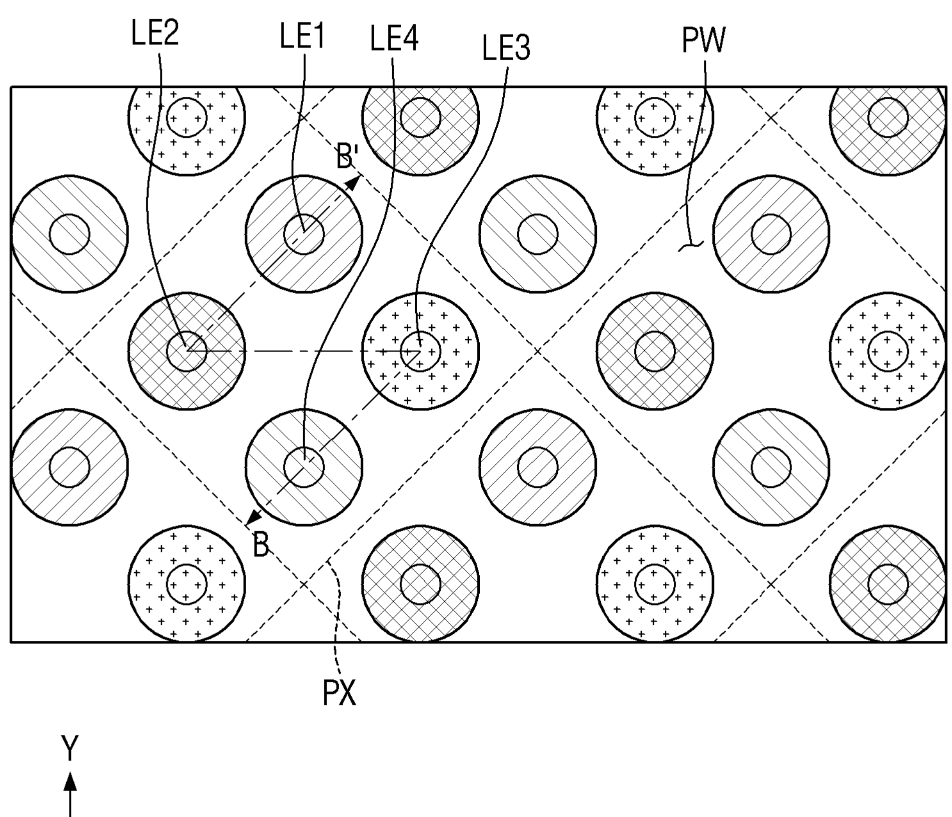
FIG. 11 is a layout diagram illustrating a display area of a first display panel according to some embodiments.
Figure 12:
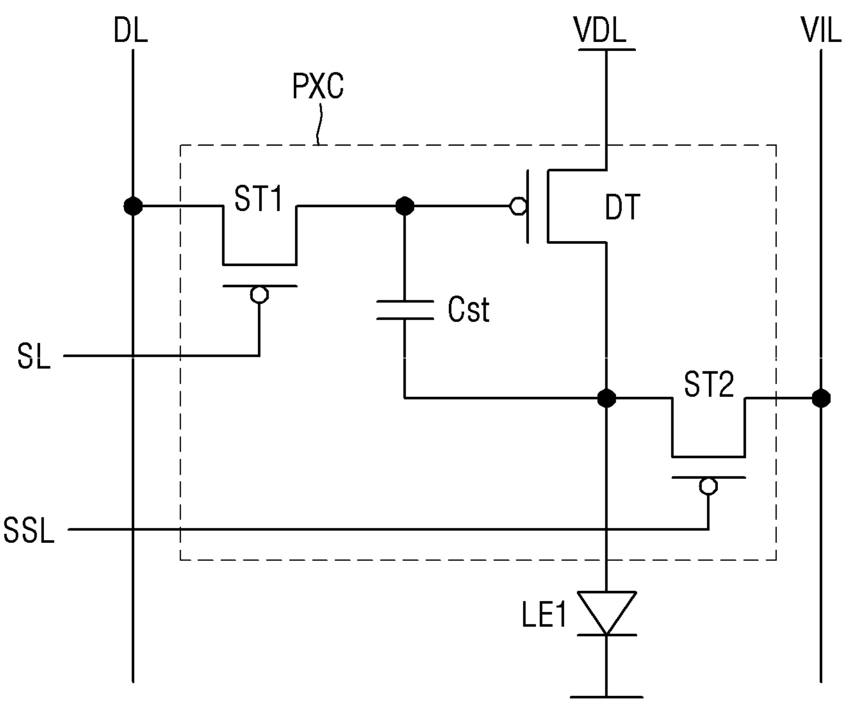
FIG. 12 is a circuit diagram illustrating one example of a pixel circuit unit and a light-emitting element of FIG. 11.
Figure 13:
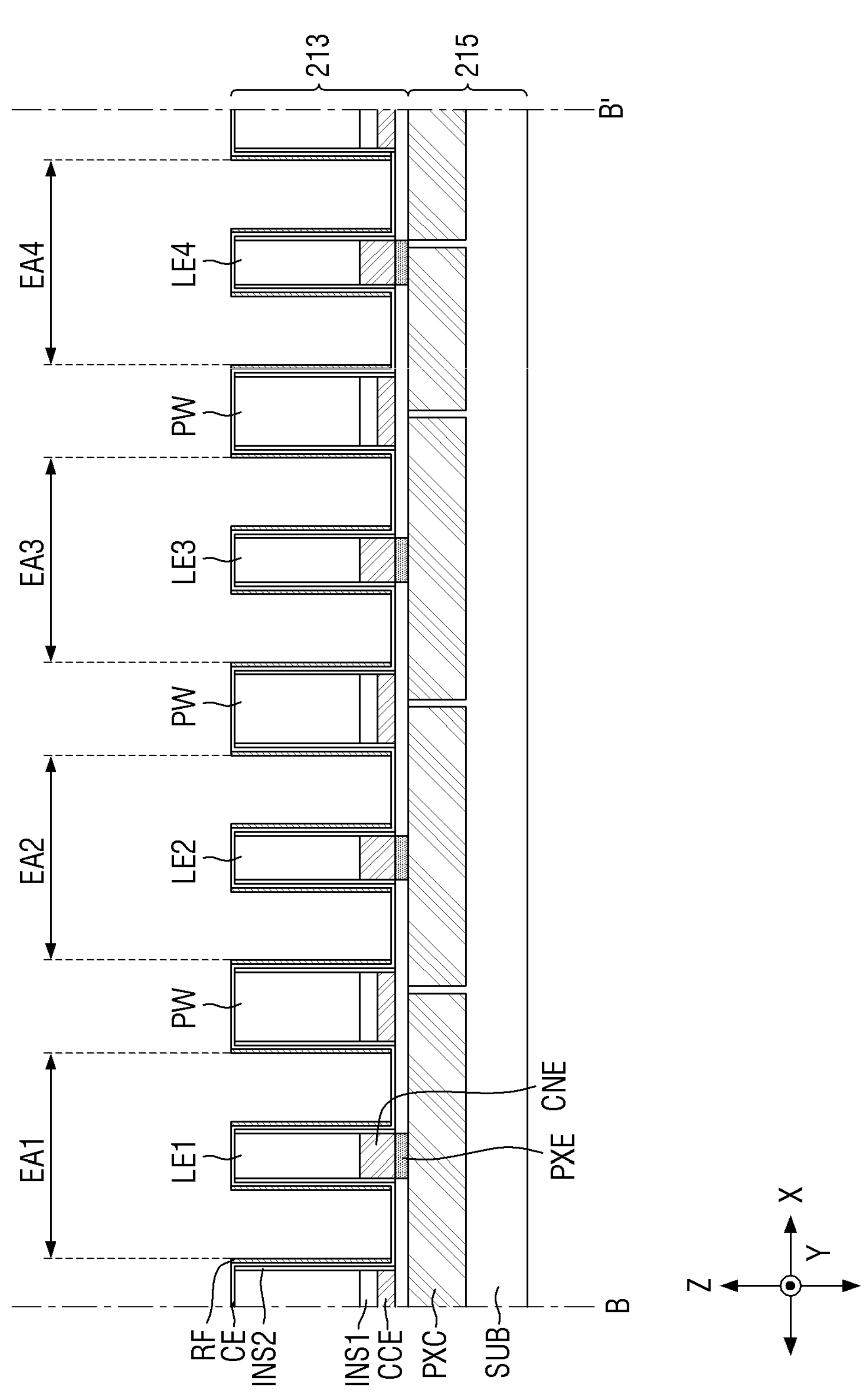
FIG. 13 is a cross-sectional view illustrating an example of a first display panel taken along the line B-B" of FIG. 11.

FIG. 9 is a perspective view illustrating a first display device according to some embodiments. FIG. 10 is a layout diagram showing in detail an example of area A of FIG. 1. FIG. 11 is a layout diagram illustrating a display area of a first display panel according to some embodiments. FIG. 12 is a circuit diagram illustrating one example of a pixel circuit unit and a light-emitting element of FIG. 11. FIG. 13 is a cross-sectional view illustrating an example of a first display panel taken along the line B-B" of FIG. 11.

The first display device 210 in some embodiments corresponding to FIGS. 9 to 13 has a light-emitting diode on silicon (LEDoS) structure in which light-emitting diodes are located on a semiconductor circuit board located in a semiconductor process. However, the embodiments of the specification are not limited thereto.

The first display device 210 may be a micro light-emitting diode display module (micro or nano light-emitting diode display module) including a micro light-emitting diode (micro or nano light-emitting diode) as a light-emitting element. The size of the micro LED display device may be about several μm, and the size and shape of the display panel may be variously implemented. In addition, the micro LED display device may be low-power, miniaturized, and lightweight, and may make a virtual reality device or an augmented reality device light and clear in terms of luminance, contrast, energy efficiency, and the like.

Referring to FIGS. 9 to 13, the first display device 210 includes a first display panel 211 including a display area DA and a non-display area NDA.

The first display panel 211 may have a quadrilateral shape, in plan view, having long sides in the first direction x and short sides in the second direction y. However, the planar shape of the first display panel 211 is not limited thereto, and the first display panel 211 may have a shape of a polygonal shape other than a quadrilateral shape, a circular shape, an elliptical shape or an atypical shape in plan view.

The display area DA may be an area where an image is displayed, and the non-display area NDA may be an area where an image is not displayed. The planar shape of the display area DA may follow the planar shape of the first display panel 211. FIG. 9 illustrates that the display area DA has a quadrilateral shape. The display area DA may be in a central area of the first display panel 211. The non-display area NDA may be located around the display area DA. The non-display area NDA may surround the display area DA.

The display area DA of the first display panel 211 may include a plurality of pixels PX. Each of the pixels PX may be defined as a minimum light-emitting unit capable of displaying white light in each defined pixel area.

The pixel PX arranged as a minimum unit capable of displaying white light in each pixel area may include a plurality of emission areas EA1, EA2, EA3, and EA4. Although it is illustrated that each of the pixels PX includes four emission areas EA1, EA2, EA3, and EA4 arranged in a PENTILE™ matrix structure (e.g., an RGBG matrix structure, a PENTILE™ structure, or an RGBG structure, PENTILE™ being a registered trademark of Samsung Display Co., Ltd., Republic of Korea), the disclosure is not limited thereto.

The plurality of emission areas EA1, EA2, EA3, and EA4 for each pixel area may be partitioned by a partition wall PW. The partition wall PW may surround first to fourth light-emitting elements LE1 to LE4 arranged on the emission areas EA1, EA2, EA3, and EA4, respectively. The partition wall PW may be located apart from each of the first to fourth light-emitting elements LE1 to LE4. The partition wall PW may have a mesh shape, a net shape, or a grid shape in plan view.

FIGS. 10 and 11 illustrate that the plurality of emission areas EA1, EA2, EA3, and EA4 defined by the partition wall PW have a rhombus planar shape or arrangement to form a PENTILE™ matrix structure. However, the embodiments of this specification are not limited thereto. For example, the plurality of emission areas EA1, EA2, EA3, and EA4 defined by the partition wall PW may have a polygonal shape, such as a quadrilateral shape other than a rhombus or a triangle, a circular shape, an elliptical shape, or an atypical shape.

A first pad member PDA1 may be located in the display area NDA. The first pad member PDA1 may be located on the upper side of the first display panel 211. The first pad member PDA1 may include first pads PD1 connected to an external circuit board. The first pad member PDA1 may include the first pads PD1 connected to the first circuit board 212.

Meanwhile, a second pad member PDA2 may be located in the non-display area NDA. The second pad member PDA2 may be located on the lower side of the first display panel 211. The second pad member PDA2 may include the second pads connected to the external circuit board. The second pad member PDA2 may include the second pads connected to the second circuit board 222. The second pad member PDA2 may be omitted in other embodiments.

Referring to FIG. 11, among the plurality of emission areas EA1, EA2, EA3, and EA4, the first emission area EA1 may include a first light-emitting element LE1 for emitting a first light, the second emission area EA2 may include a second light-emitting element LE2 for emitting a second light, the third emission area EA3 may include a third light-emitting element LE3 for emitting a third light, and the fourth emission area EA4 may include a fourth light-emitting element LE4 for emitting a fourth light. The first light may be light of a wavelength band representing any one of red, green, and blue colors. In addition, the second light may be light of a wavelength band representing any one of red, green, and blue colors, but which is also different from that of the first light. Further, the third light may be light of a wavelength band representing any one of red, green, and blue colors, but which is also different from those of the first light and the second light. In addition, the fourth light may be light of the same wavelength band as any one of the first to third lights.

Each of the first emission areas EA1 indicates an area in which the first light is emitted. Each of the first emission areas EA1 outputs the first light emitted from the first light-emitting element LE1. As described above, the first light may be light of a wavelength band representing any one of red, green, and blue colors. For example, the first light may be light of a red wavelength band. The red wavelength band may be in a range of about 600 nm to about 750 nm, but embodiments of the specification are not limited thereto.

Each of the second emission areas EA2 indicates an area in which the second light is emitted. Each of the second emission areas EA2 outputs the second light emitted from the second light-emitting element LE2. The second light may be light of a wavelength band representing any one of red, blue, and green colors, which is different from that of the first light. For example, the second light may be light of a blue wavelength band. The blue wavelength band may be in a range of about 370 nm to about 460 nm, but embodiments of the specification are not limited thereto.

Each of the third emission areas EA3 indicates an area in which the third light is emitted. Each of the third emission areas EA3 outputs the third light emitted from the third light-emitting element LE3. The third light may be light of a wavelength band representing any one of red, blue, and green colors, which is different from those of the first and second lights. For example, the third light may be light of a green wavelength band. The green wavelength band may be in a range of about 480 nm to about 560 nm, but embodiments of the specification are not limited thereto.

Each of the fourth emission areas EA4 indicates an area in which the fourth light is emitted. Each of the fourth emission areas EA4 outputs the fourth light emitted from the fourth light-emitting element LE4. Here, the fourth light may be light of a wavelength band representing the same color as any one of the first to third lights. For example, the fourth light may be light of the same blue wavelength band as the second light, or light of the same green wavelength band as the third light. However, the embodiments of this specification are not limited thereto.

The second emission areas EA2 of the respective pixels PX may be alternately located with the fourth emission areas EA4 of other adjacent pixels PX along the first direction x. In addition, the first emission areas EA1 and the third emission areas EA3 of the respective pixels PX may be alternatively located along the first direction x. On the other hand, the fourth emission areas EA4 of the respective pixels PX may be alternately located with the second emission areas EA2 of other adjacent pixels PX along the first direction x.

The first emission area EA1 and the fourth emission area EA4 are alternately located in a diagonal direction between the first direction x and the second direction y, and the second emission area EA2 and the third emission area EA3 are also alternately located in the diagonal direction between the first direction x and the second direction y. That is, as a whole, the pixels PX may also be located and arranged in a PENTILE™ matrix structure.

The first to fourth emission areas EA1 to EA4 of each pixel PX may be the same or different in size or planar area. Similarly, the first to fourth light-emitting elements LE1 to LE4 located in the first to fourth emission areas EA1 to EA4 respectively may be the same or different in size or planar area.

The area of the first emission area EA1, the area of the second emission area EA2, the area of the third emission area EA3, and the area of the fourth emission area EA4 may be substantially the same. However, the embodiments of this specification are not limited thereto.

A distance between the first and second emission areas EA1 and EA2, a distance between the second and third emission areas EA2 and EA3, a distance between the third and fourth emission areas EA3 and EA4 and a distance between the first and fourth emission areas EA1 and EA4, which are adjacent to each other in a horizontal or diagonal direction, may be the same, but may also be different according to different areas. However, the embodiments of this specification are not limited thereto.

The example in which the first emission area EA1 emits the first light, the second emission area EA2 emits the second light, the third emission area EA3 emits the third light, and the fourth emission area EA4 emits the same light as any one of the first to third lights is not limited thereto. At least one emission area among the first to fourth emission areas EA1 to EA4 may emit a fifth light. Here, the fifth light may be light of a yellow wavelength band. That is, the main peak wavelength of the fifth light may be located in a range of about 550 nm to about 600 nm, but the present disclosure is not limited thereto.

FIG. 13 is a cross-sectional view illustrating an example of a first display panel taken along the line B-B" of FIG. 11. In addition, FIG. 12 is a circuit diagram illustrating one example of a pixel circuit unit and a light-emitting element of FIG. 11.

FIG. 12 illustrates an example of a pixel circuit diagram of one pixel PX of FIG. 2.

Referring to FIG. 12, a light emitting element LE1 emits light according to a driving current Ids. The amount of light emitted from the light emitting element LE1 may be proportional to the driving current Ids. The light emitting element LE1 may be an inorganic light emitting element including an anode, a cathode, and an inorganic semiconductor located between the anode and the cathode.

The light emitting element LE1 may have the anode connected to a source electrode of a driving transistor DT and the cathode connected to a second power line to which a low potential voltage that is lower than a high potential voltage is supplied.

The driving transistor DT adjusts a current flowing from a first power line VDL, to which a first power supply voltage is supplied, to the light emitting element LE1 according to a voltage difference between a gate electrode and a source electrode. The driving transistor DT may have the gate electrode connected to a first electrode of a first transistor ST1, the source electrode connected to the anode of the light emitting element ED, and a drain electrode connected to the first power line VDL to which a high potential voltage is applied.

The first transistor ST1 is turned on by a first scan signal of a first scan line SL to connect a data line DL to the gate electrode of the driving transistor DT. The first transistor ST1 may have a gate electrode connected to the first scan line SL, the first electrode connected to the gate electrode of the driving transistor DT, and a second electrode connected to the data line DL.

A second transistor ST2 is turned on by a second scan signal of a second scan line SSL to connect an initialization voltage line VIL to the source electrode of the driving transistor DT. The second transistor ST2 may have a gate electrode connected to the second scan line SSL, a first electrode connected to the initialization voltage line VIL, and a second electrode connected to the source electrode of the driving transistor DT.

The first electrode of each of the first and second transistors ST1 and ST2 may be a source electrode, and the second electrode thereof may be a drain electrode. However, the present disclosure is not limited thereto. That is, in some embodiments, the first electrode of each of the first and second transistors ST1 and ST2 may be a drain electrode, and the second electrode thereof may also be a source electrode.

A capacitor Cst is formed between the gate electrode and the source electrode of the driving transistor DT. The capacitor Cst stores a difference voltage between a gate voltage and a source voltage.

Although each of the driving transistor DT and the first and second transistors ST1 and ST2 is mainly described as an N-type metal oxide semiconductor field effect transistor (MOSFET) in FIG. 12, it should be noted that the present disclosure is not limited thereto. In some embodiments, each of the driving transistor DT and the first and second transistors ST1 and ST2 may be formed as a P-type MOSFET.

Referring to FIG. 13, the first display panel 211 includes a semiconductor circuit board 215. The semiconductor circuit board 215 includes a substrate SUB, a plurality of pixel circuit units PXC and a plurality of pixel electrodes PXE.

The semiconductor circuit board 215 may be a silicon wafer substrate located by using a semiconductor process. The plurality of pixel circuit units PXC of the semiconductor circuit board 215 may be located by using a semiconductor process.

The plurality of pixel circuit units PXC may be located in the display area ("DA" of FIG. 9). Each of the plurality of pixel circuit units PXC may be connected to the corresponding pixel electrode PXE. That is, the plurality of pixel circuit units PXC and the plurality of pixel electrodes PXE may be connected in a one-to-one correspondence. Each of the plurality of pixel circuit units PXC may overlap any one of the corresponding light-emitting elements LE1 to LE4 in the third direction z.

Each of the pixel circuit units PXC may have a 3T1C structure (e.g., three transistors and 1 capacitor), as shown in FIG. 12, or may have various other modified circuit structures such as a 7T1C, 2T1C, or 6T1C structure.

Each of the pixel electrodes PXE may be located on a corresponding pixel circuit unit PXC. Each of the pixel electrodes PXE may be an exposed electrode exposed from the pixel circuit unit PXC. That is, each of the pixel electrodes PXE may protrude from the top surface of the pixel circuit unit PXC. Each of the pixel electrodes PXE may be integrally formed with the pixel circuit unit PXC. Each of the pixel electrodes PXE may receive a pixel voltage or an anode voltage from the pixel circuit unit PXC. The pixel electrodes PXE may be formed of aluminum (Al).

Each of the connection electrodes CNE may be located on the corresponding pixel electrode PXE. Each of the connection electrodes CNE may be located on the pixel electrode PXE. Each of the connection electrodes CNE may include a metal material for bonding the pixel electrode PXE and each of the light-emitting elements LE1 to LE4.

A common connection electrode CCE may be located apart from the pixel electrode PXE and the connection electrode CNE. The common connection electrode CCE may surround the pixel electrode PXE and the connection electrode CNE. The common connection electrode CCE may be connected to any one of the first pads PD1 of the first pad member PDA1 of the non-display area NDA to receive a common voltage. The common connection electrode CCE may include the same material as the connection electrodes CNE.

A first insulating layer INS1 may be located on the common connection electrode CCE. A width of the first insulating layer INS1 in the first direction x or the second direction y may be smaller than a width of the common connection electrode CCE. Accordingly, a part of the top surface of the common connection electrode CCE may be exposed without being covered by the first insulating layer INS1. The part of the top surface of the common connection electrode CCE that is exposed without being covered by the first insulating layer INS1 may be in contact with the common electrode CE. As a result, the common electrode CE may be connected to the common connection electrode CCE.

A light-emitting element layer 213 may include each of the light-emitting elements LE1, LE2, LE3 and LE4, the partition wall PW, a second insulating layer INS2, the common electrode CE, a reflective film RF, and in other embodiments, a light blocking member and optical patterns.

The light-emitting element layer 213 may include the first to fourth emission areas EA1 to EA4 partitioned by the partition wall PW. At least one component of each light-emitting element LE and the optical pattern may be located in each of the first to fourth emission areas EA1 to EA4.

Meanwhile, because the second display device 220 may be substantially the same as the first display device 210 described with reference to FIGS. 9 to 13, description of the second display device 220 will be omitted.

Hereinafter, a method of changing the light transmittance of the AR-providing device will be described with reference to FIGS. 14 to 20.

Figure 14:
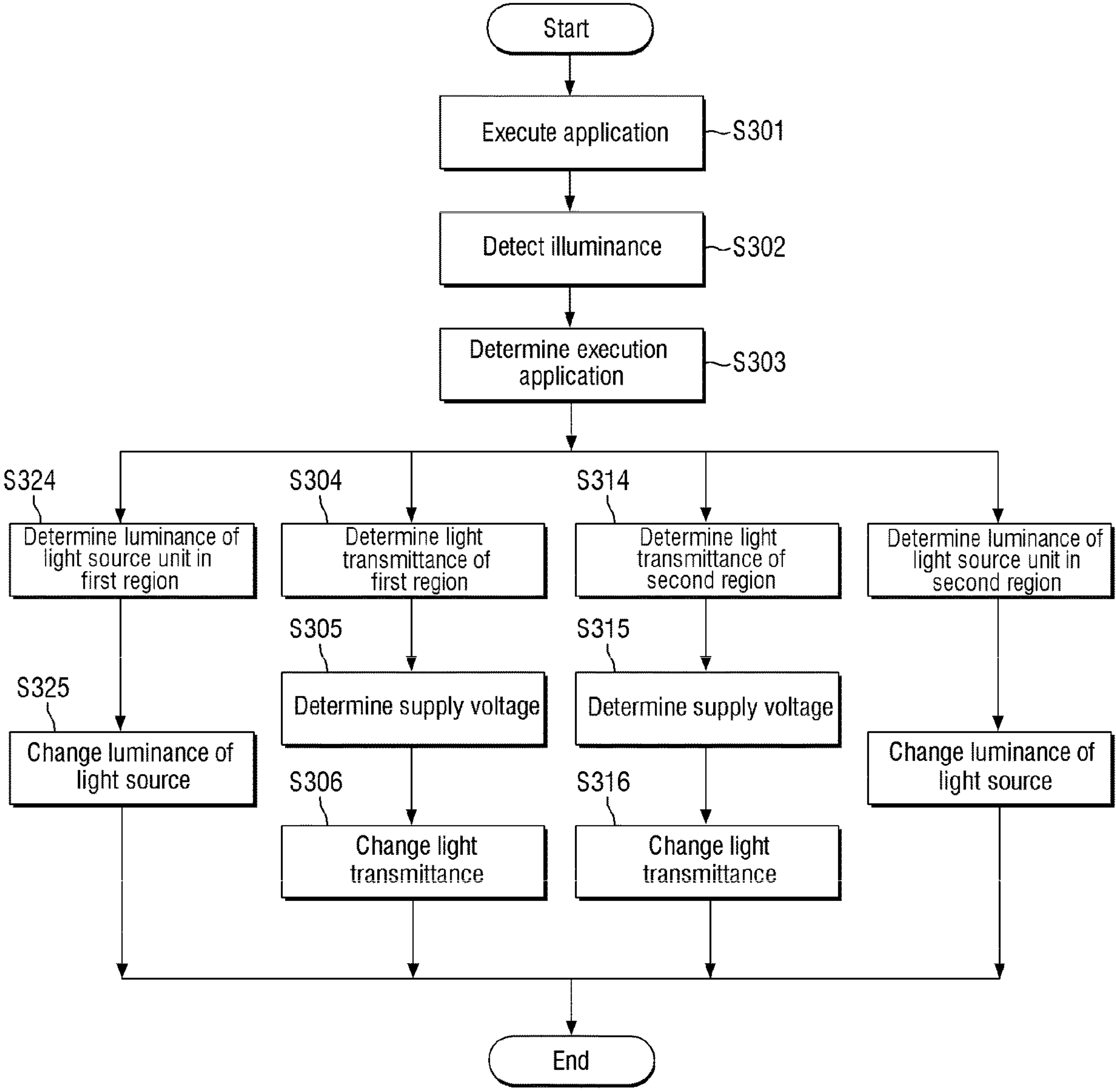
FIG. 14 is a schematic flowchart illustrating a method of changing a light transmittance of an AR-providing device according to some embodiments of the disclosure.
Figure 15:
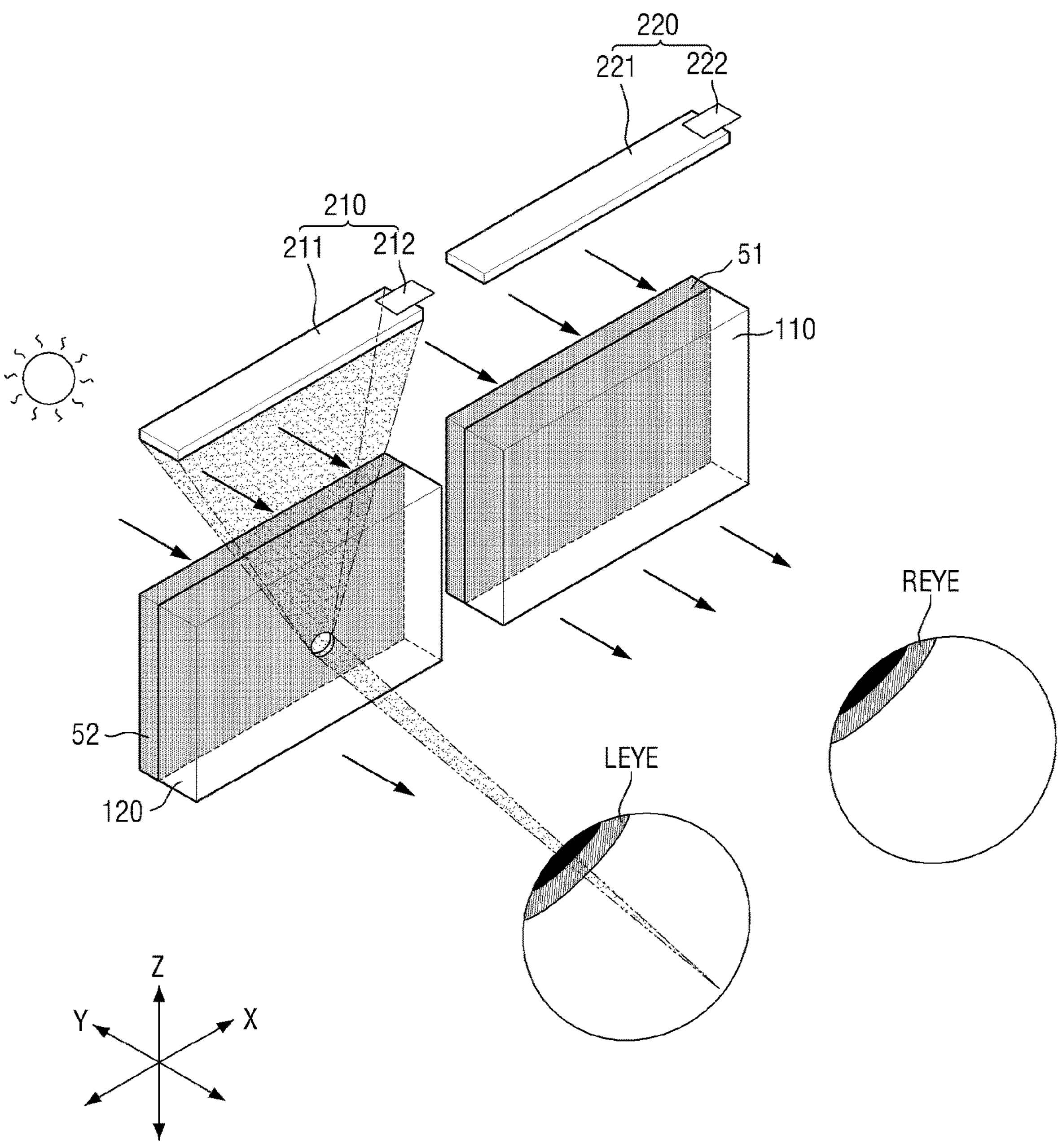
FIG. 15 is a perspective view of a method of changing a light transmittance of an AR-providing device according to some embodiments.
Figure 16:
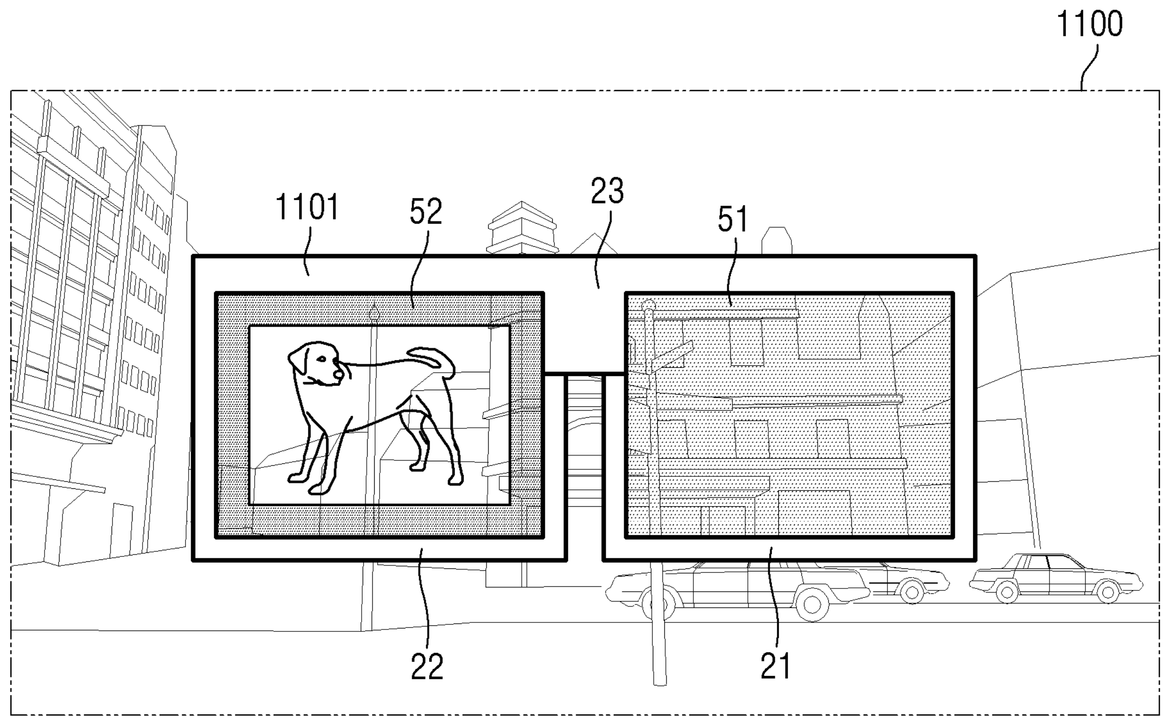
FIGS. 16 and 17 are schematic diagrams of a method of changing a light transmittance of an AR-providing device according to some embodiments.
Figure 17:
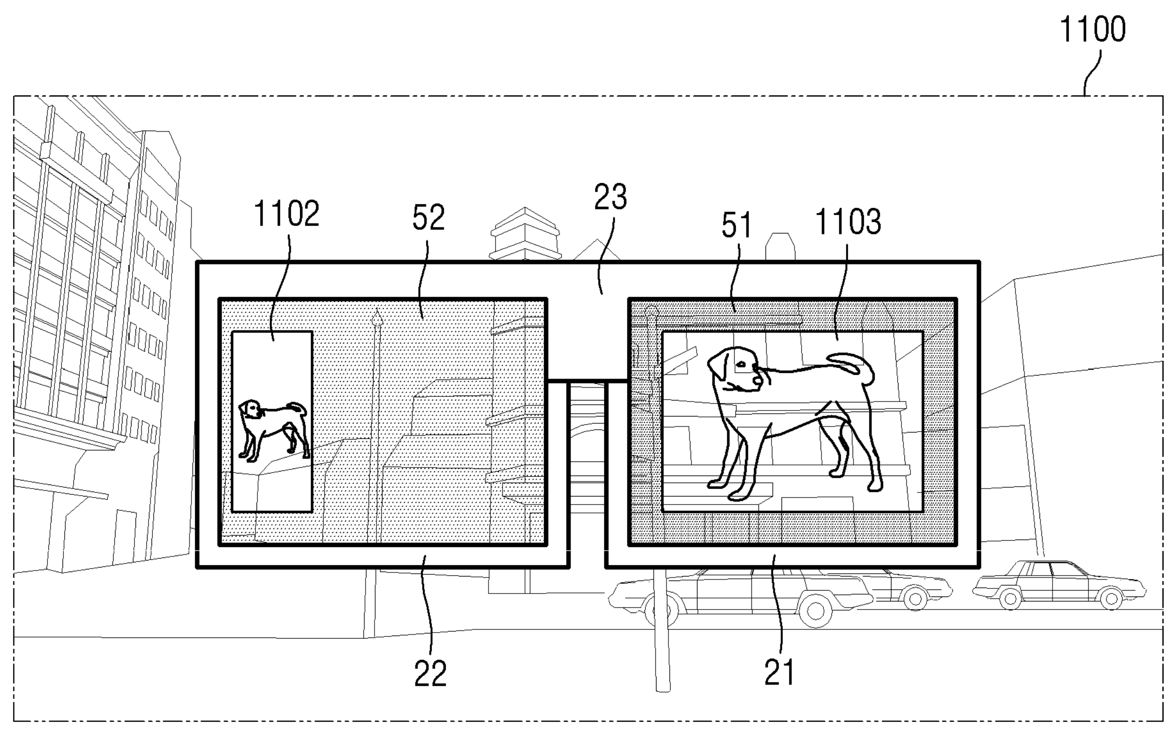
Figure 18:
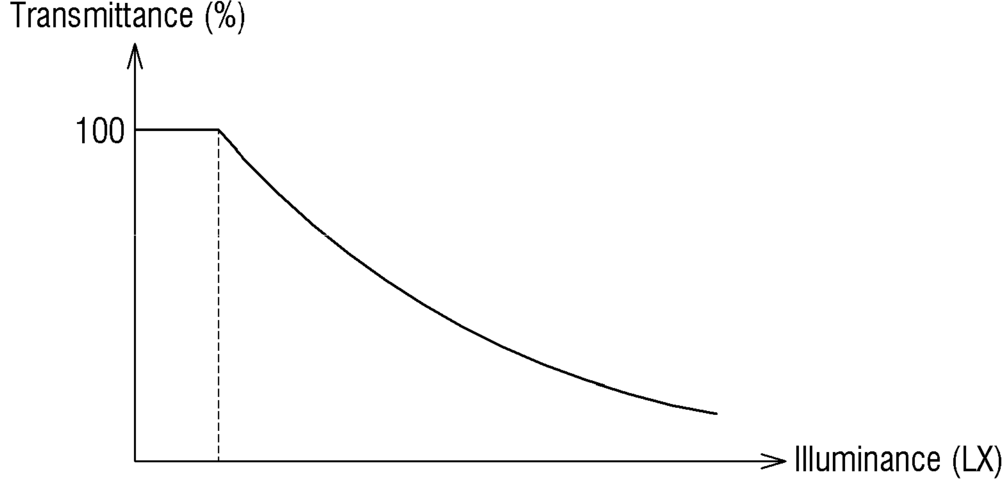
FIG. 18 is a graph illustrating a relationship between intensity of external light and transmittance of the filter.
Figure 19:
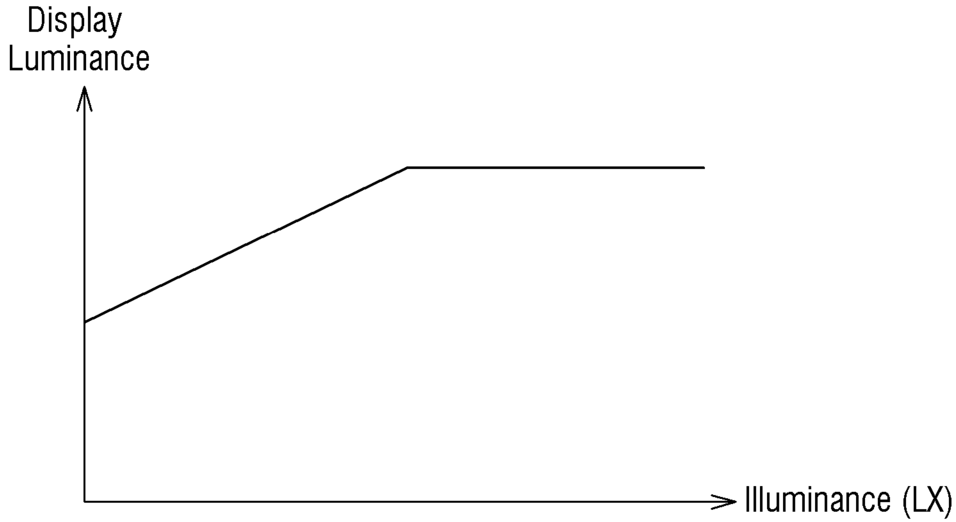
FIG. 19 is a graph illustrating a relationship between intensity of external light and luminance of a display device.
Figure 20:
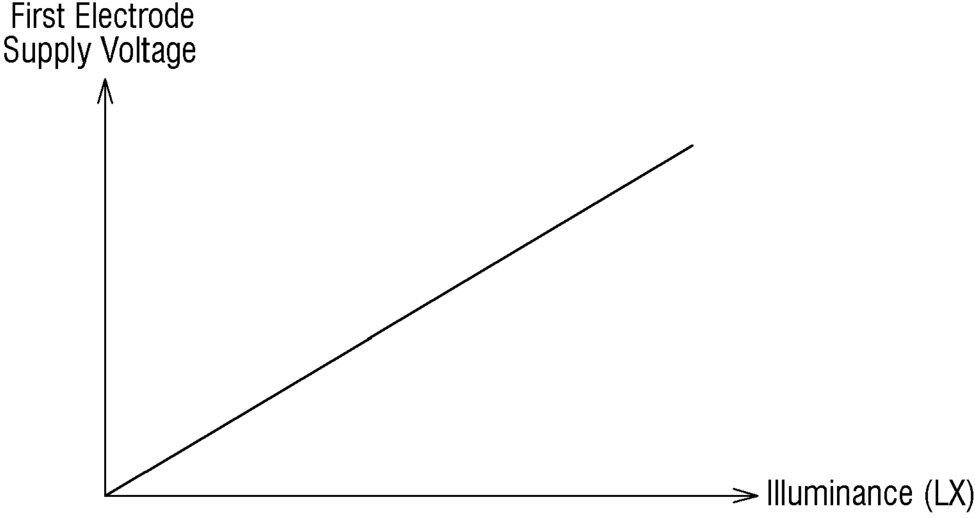
FIG. 20 is a graph illustrating a relationship between transmittance of the filter and voltage provided to a first supply electrode.

FIG. 14 is a schematic flowchart illustrating a method of changing a light transmittance of an AR-providing device according to some embodiments of the disclosure. FIG. 15 is a perspective view of a method of changing a light transmittance of an AR-providing device according to some embodiments. FIGS. 16 and 17 are schematic diagrams of a method of changing a light transmittance of an AR-providing device according to some embodiments. FIG. 18 is a graph illustrating a relationship between intensity of external light and transmittance of the filter. FIG. 19 is a graph illustrating a relationship between intensity of external light and luminance of a display device. FIG. 20 is a graph illustrating a relationship between transmittance of the filter and voltage provided to a first supply electrode.

Referring to FIG. 14, an application is first executed (operation S301).

Referring to FIG. 17, the user may view the external world through the AR-providing device 1. The external world is viewed through the right eye lens 110, the left eye lens 120, and the filter unit 50. In this operation, the display unit 200 does not operate because power is not supplied under the control of the integrated driver 63. Also, the filter unit 50 does not operate because power is not supplied under the control of the integrated driver 63.

Next, an illuminance is detected (operation S302).

When the application is executed, the integrated driver 63 detects the ambient illuminance of the AR-providing device 1 using the sensor 70. The sensor 70 may output an illuminance signal (e.g., an analog signal by an analog illuminance sensor, or a digital signal by a digital illuminance sensor) corresponding to the detected illuminance to the integrated driver 63. The integrated driver may calculate the illuminance by using the received illuminance signal.

Next, the execution application is determined (operation S303).

The execution application may be determined based on the illuminance signal and/or the user input. The subject that finally determines the execution application may be the integrated driver 63, but is not limited thereto.

Next, the light transmittance is determined (operation S304).

The right eye driver 61 determines the light transmittance of the first region based on the input received from the integrated driver 63. Referring to FIG. 18, the transmittance of the filter may be determined according to the intensity of external light.

The right eye filter 51 may change the light transmittance under the control of the right eye driver 61.

Next, the supply voltage is determined (operation S305).

Referring to FIG. 20, the right eye driver 61 may determine a supply voltage supplied from the power supply unit to the right eye filter 51 by using the value of FIG. 20 stored in the storage unit in response to the determined light transmittance. For example, the right eye driver 61 transmits data of the determined transmittance of the right eye filter 51 to at least one right eye supply electrode 518. Then, at least one right eye supply electrode 518 may provide a voltage to at least one right eye upper electrode 515 and at least one right eye lower electrode 512. Moreover, the transmittance of at least one right eye filter 51 is controlled so that the transmittance of the right eye filter 51 is controlled through the electrochromic layer 513 in addition to the right eye upper electrode 515 and the right eye lower electrode 512.

Next, the light transmittance of a light transmitting unit is changed (operation S306).

The right eye driver 61 changes the light transmittance of the right eye filter 51. The right eye driver 61 may be controlled so that the modified supply voltage corresponding to the determined light transmittance is supplied to the right eye filter 51. In an external world view 1100, the intensity of external light decreases in response to the changed light transmittance (e.g., 50%) of the filter unit 50. The intensity of external light of the left eye lens 120 may be adjusted by adjusting the transmittance of the left eye filter 52, and the intensity of external light of the right eye lens 110 may be adjusted by adjusting the transmittance of the right eye filter 51. The user may view both the external world view 1100 and an image 1101 displayed in the display unit 200. The user may be provided with improved visibility of the image 1101 displayed in the display unit 200 through the external world view 1100. Also, the user may be provided with improved conspicuity and visibility of the external world view 1100 at the same time.

In addition, the luminance of the display device is determined in the first region (operation S324).

Referring to FIG. 19, the right eye driver 61 may determine a supply voltage supplied from the power supply unit to the first circuit board 212 of the first display device 210 by using the value of FIG. 19 stored in the storage unit in response to the determined light transmittance.

Next, the luminance of the display device is changed (operation S325).

The right eye driver 61 may change the luminance of the image 1101 displayed in the display unit 200. In addition, images 1102 and 1103 displayed in the display unit 200 may be provided in various sizes on the right eye lens 110 and the left eye lens 120, respectively.

Finally, when the transmittance and the luminance of the display device are changed, the method of changing the light transmittance of the AR-providing device is terminated (operation S306).

Accordingly, the transmittance of each of the right eye filter 51 of the right eye lens 110 and the left eye filter 52 of the left eye lens 120 may be adjusted according to the intensity of external light acquired through the sensor 70. Accordingly, the user may adjust the intensity of external light entering each of the right eye REYE and the left eye LEYE. For example, when the transmittance (e.g., 100%) of the right eye filter 51 and the transmittance (e.g., 50%) of the left eye filter 52 are different, it may be advantageous in identifying the information of the external would view through the left eye LEYE. Accordingly, it is possible to clearly recognize an object and improve visibility of the real information.

In addition, the luminance of each of the first display panel 211 of the first display device 210 and the second display panel 221 of the second display device 220 may be adjusted. For example, according to the transmittance of each of the right eye filter 51 and the left eye filter 52 and/or the intensity of external light obtained through the sensor 70, the luminance of each of the first display panel 211 and the second display panel 221 may be adjusted. Accordingly, the user's visibility of image information may be improved.

Furthermore, because external light adjusted by the right eye filter 51 and the image displayed on the first display panel 211 are both displayed on the right eye REYE, and the external light adjusted by the left eye filter 52 and the image displayed on the second display panel 221 are both displayed on the left eye LEYE, the visibility of the user's image information of each of the right eye REYE and the left eye LEYE may be adjusted. Accordingly, the display luminance may be maintained at a low level to have the same level of visibility of image information. Thus, it is possible to reduce the luminance loss of the image.

Operation S314 to operation S316 of FIG. 14 may be performed in substantially the same manner as operation S304 to operation S306 of FIG. 14, and thus, description of operations S314 to S316 will be omitted.

FIGS. 21 to 31 illustrate a method of changing a light transmittance of an AR-providing device according to other embodiments.

Figure 21:
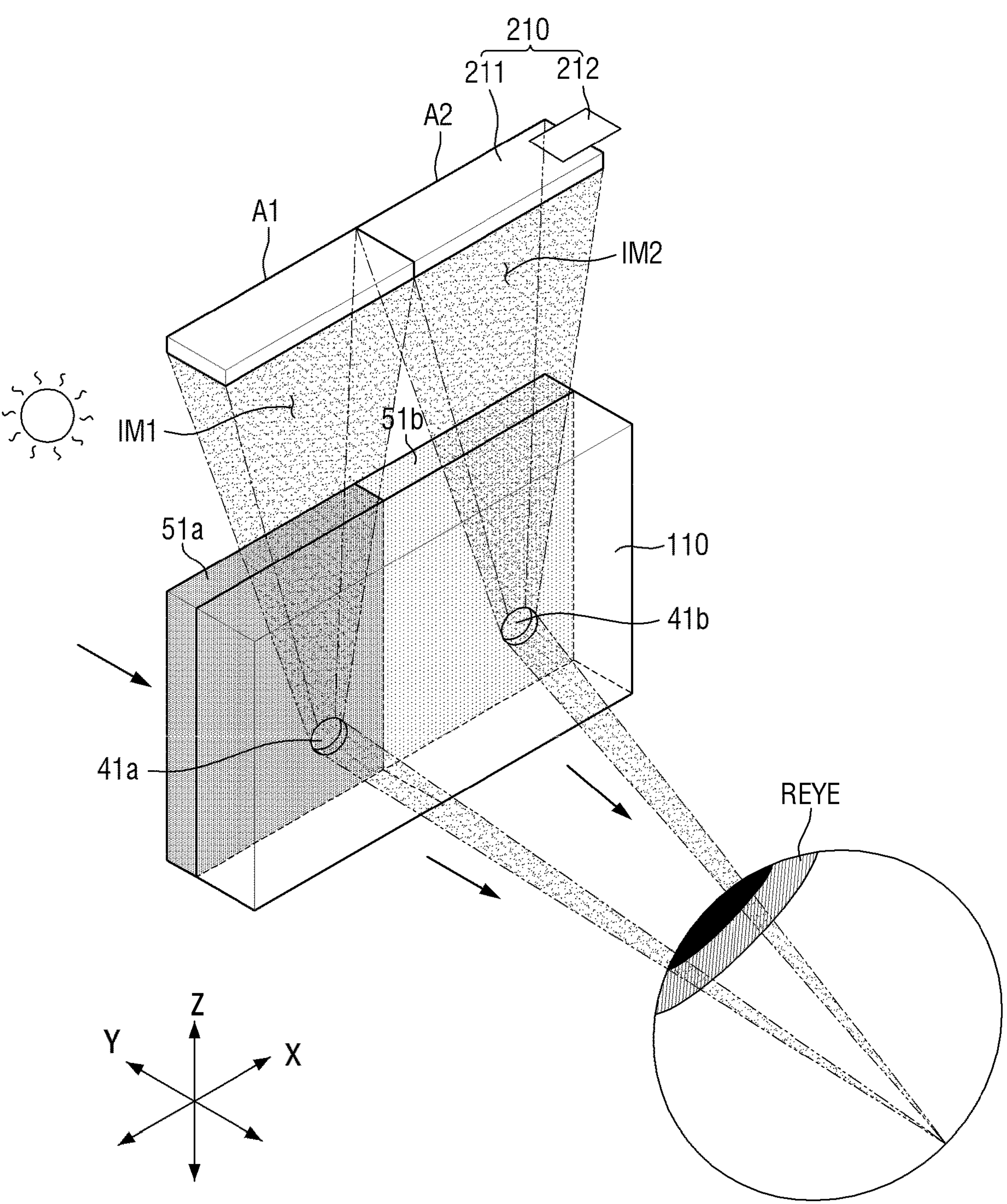
FIG. 21 is a perspective view illustrating a right eye lens, a first display device, and a filter unit.
Figure 22:
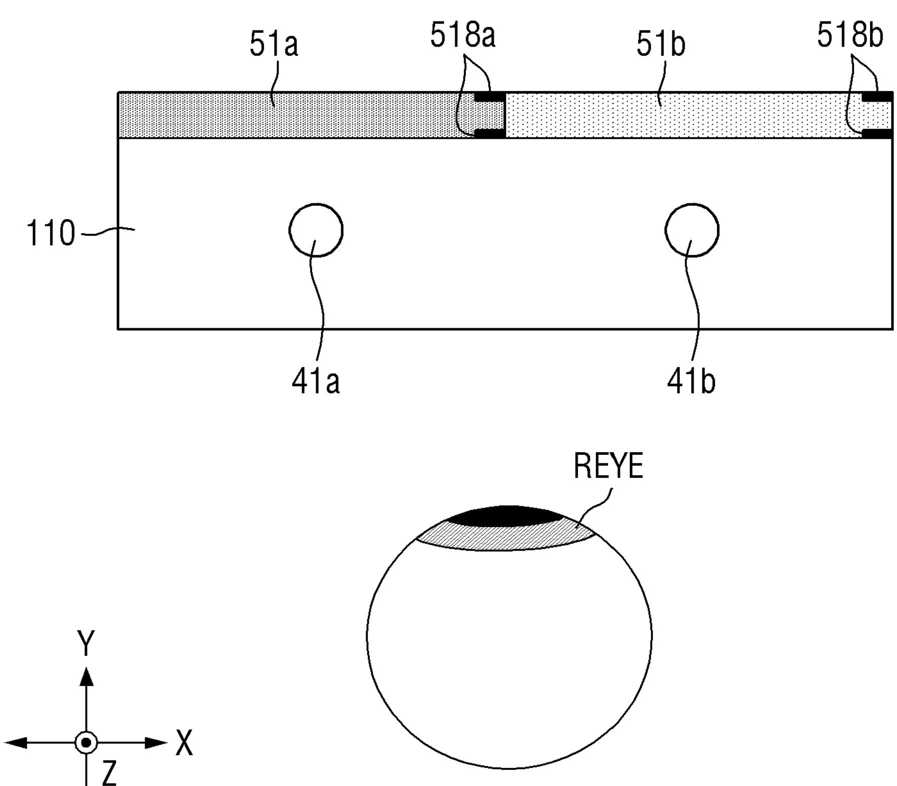
FIGS. 22 and 23 are schematic cross-sectional views illustrating an arrangement of the right eye filter 51 on the lens of FIG. 21.
Figure 23:
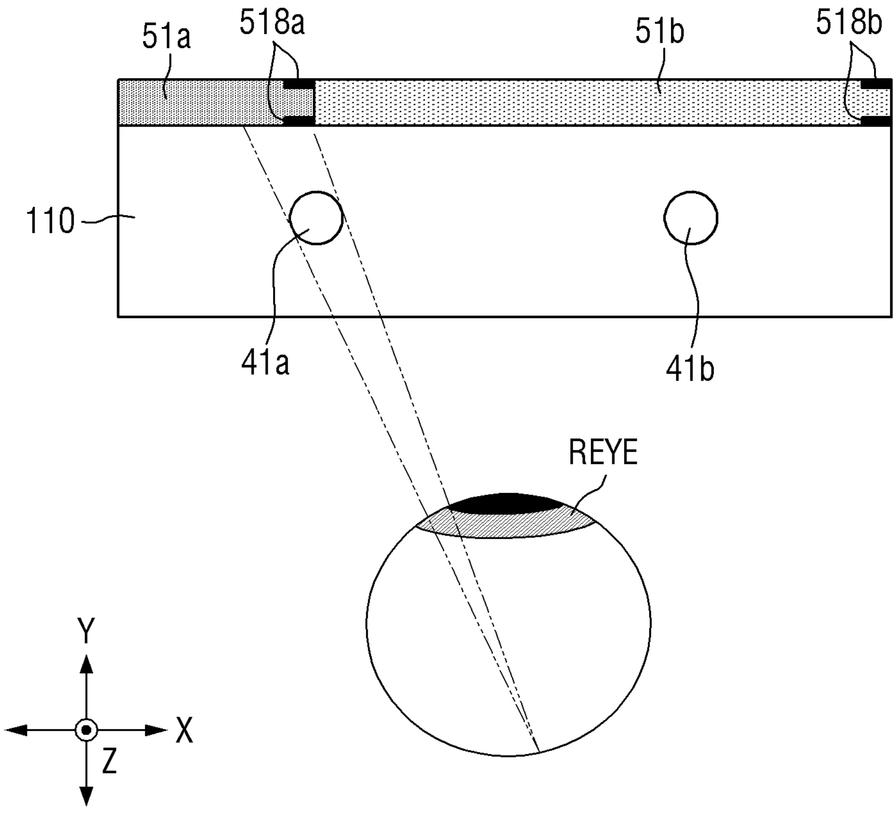
Figure 26:
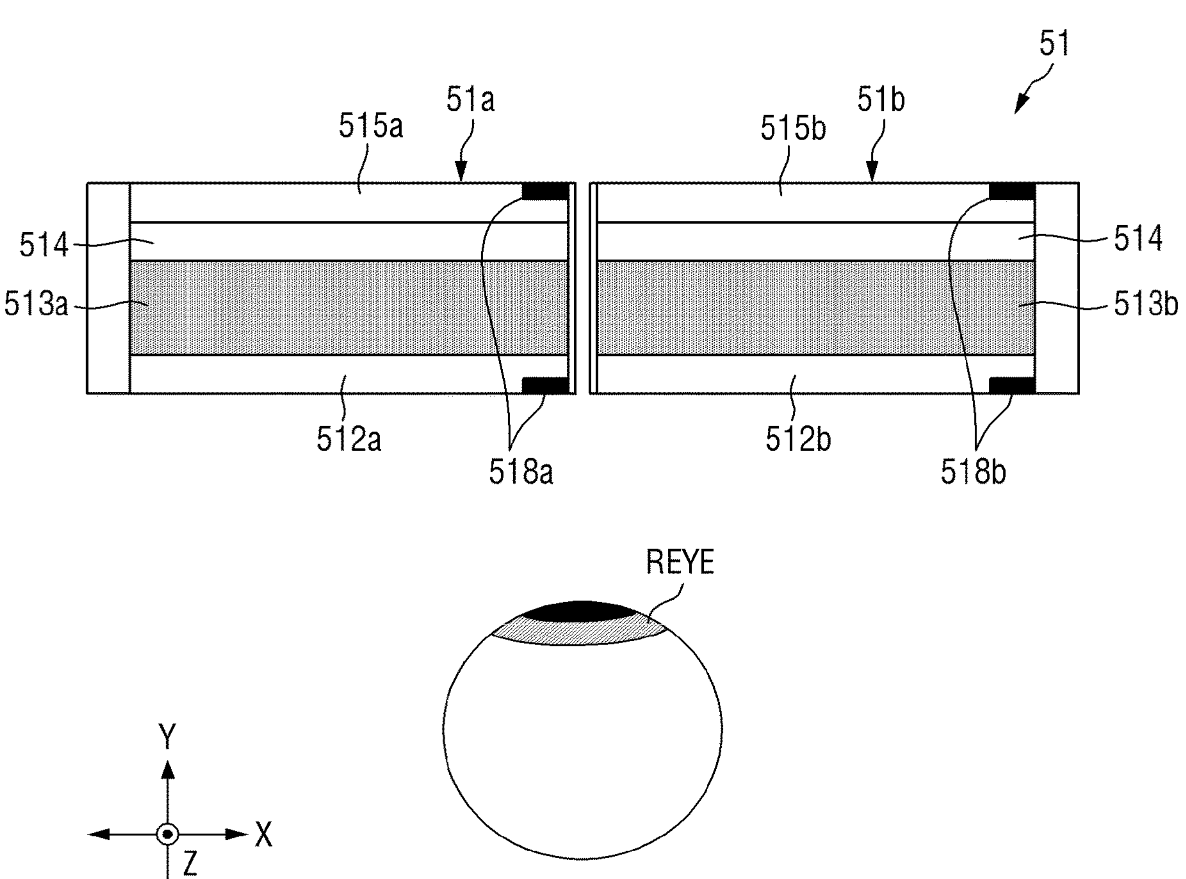
Figure 27:
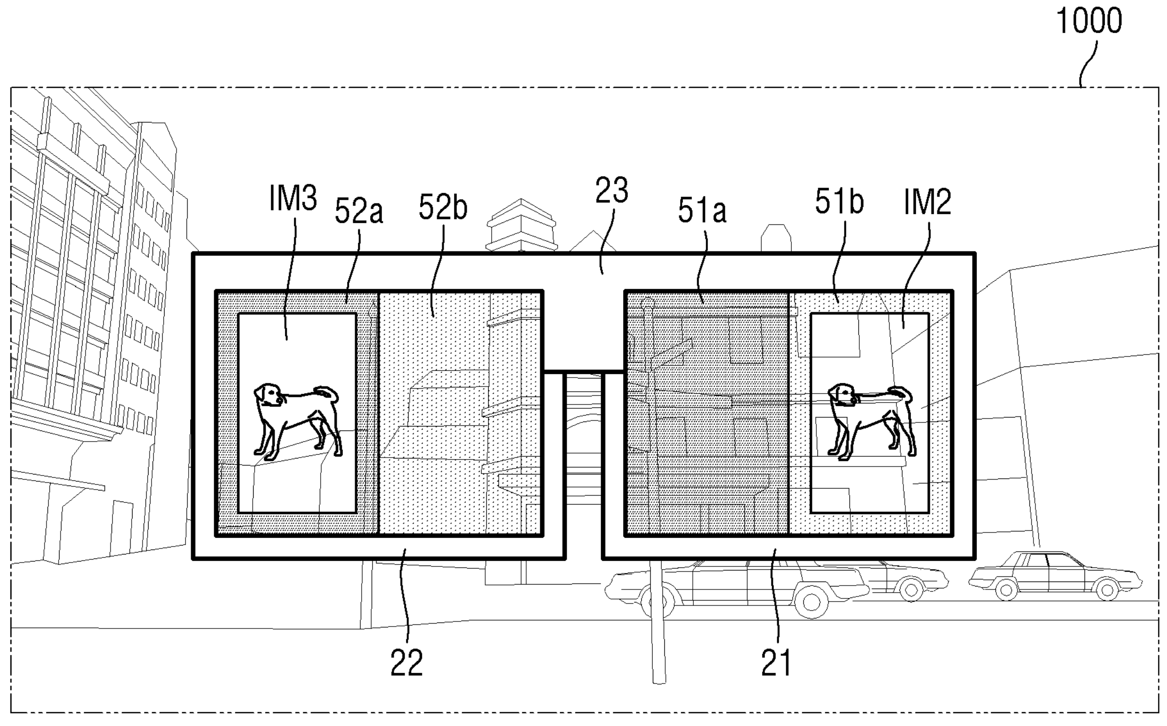
FIGS. 27 and 28 are schematic views illustrating a method of changing the light transmittance of the AR-providing device.
Figure 28:
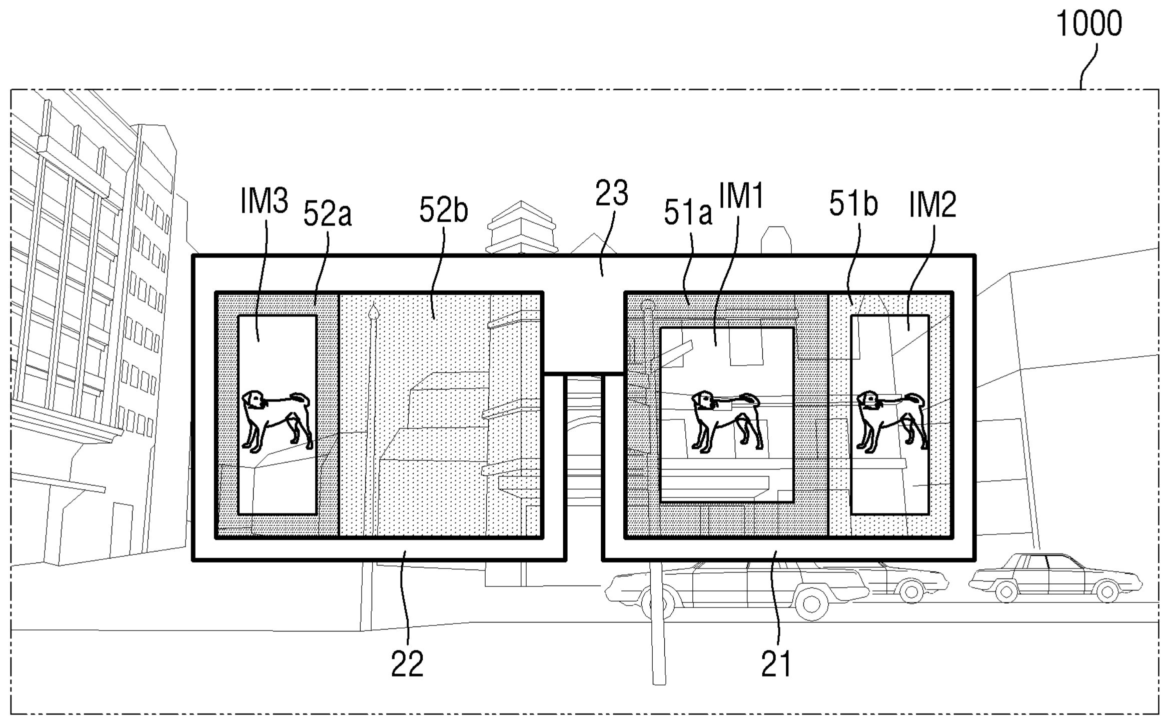
Figure 29:
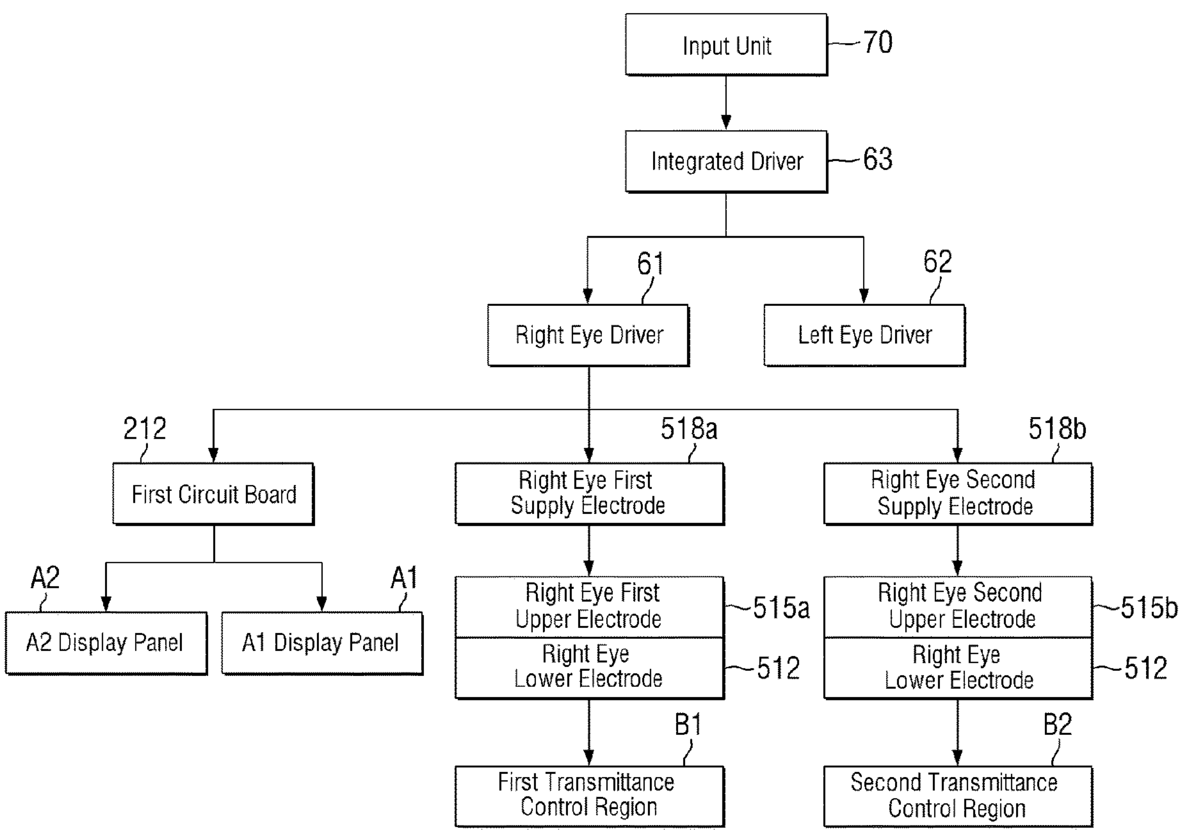
FIGS. 29 to 31 are flowcharts illustrating a driving method of an integrated driver of FIG. 21.
Figure 30:
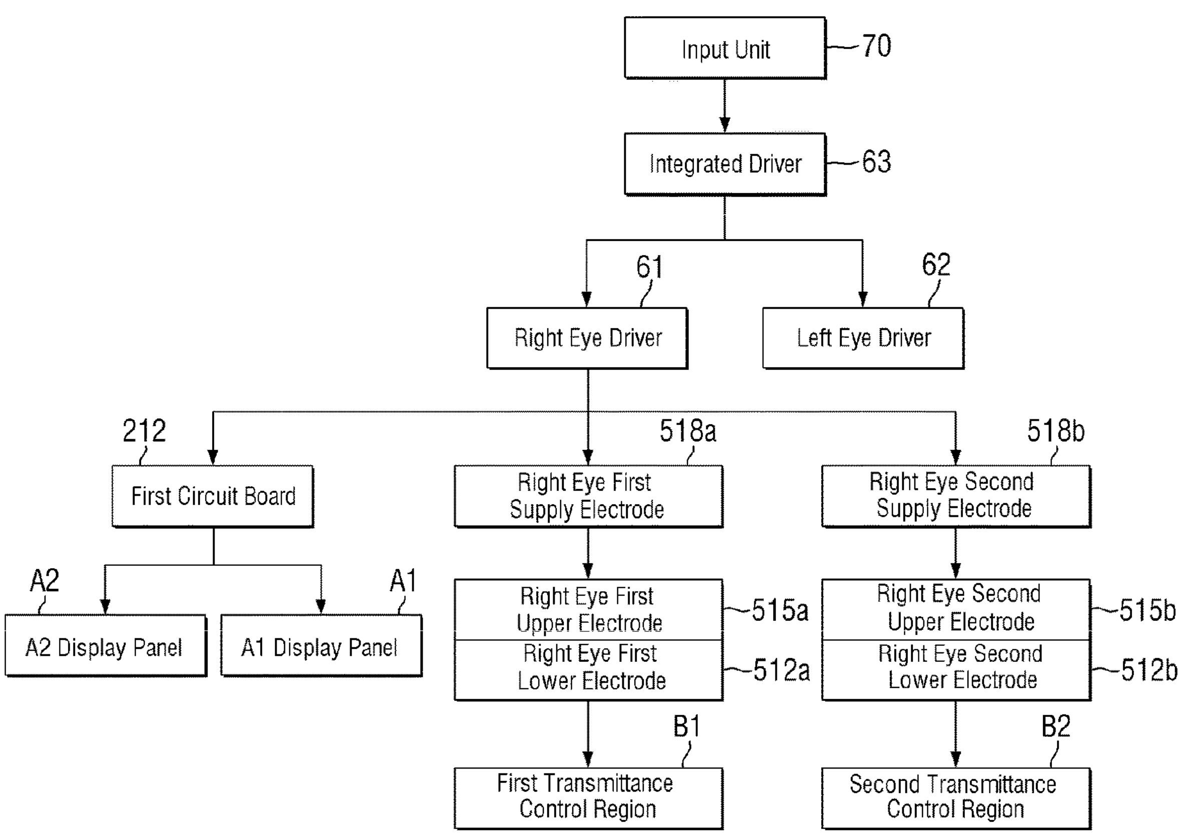
Figure 31:
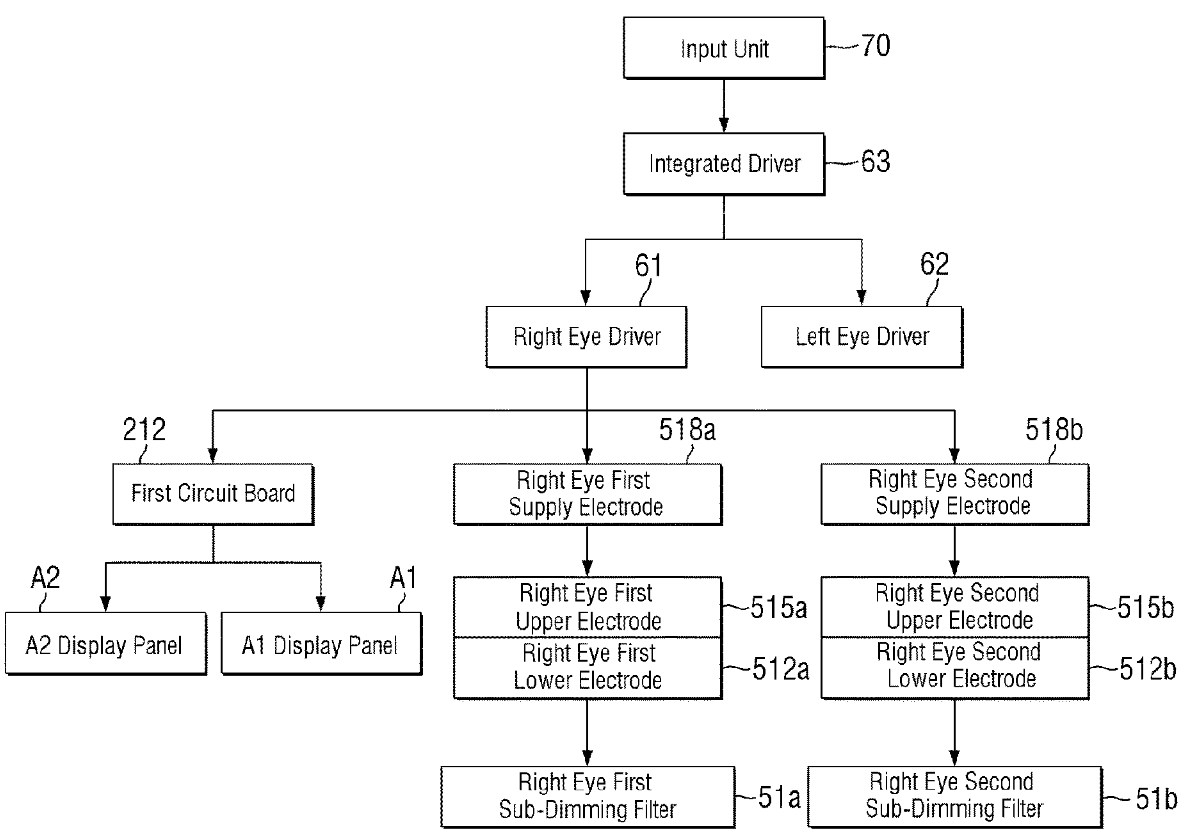

FIG. 21 is a perspective view illustrating a right eye lens, a first display device, and a filter unit, and FIGS. 22 and 23 are schematic cross-sectional views illustrating an arrangement of the right eye filter 51 on the lens of FIG. 21. FIGS. 24 to 26 are cross-sectional views illustrating the structure of the right eye filter of FIG. 21. FIGS. 27 and 28 are schematic views illustrating a method of changing the light transmittance of the AR-providing device. FIGS. 29 to 31 are flowcharts illustrating a driving method of an integrated driver of FIG. 21.

The embodiments corresponding to FIGS. 21 to 31 are different from the embodiments corresponding to FIGS. 14 to 20 in that the first display device 210 of FIGS. 14 to 20 includes a first region A1 displaying a first image IM1 and a second region A2 displaying a second image IM2, instead of only the first region A1 displaying the first image IM1.

In addition, the embodiments corresponding to FIGS. 21 to 31 are also different from the embodiments corresponding to FIGS. 14 to 20 in that the first display device 210 includes a right eye first sub-filter 51*a* for adjusting the transmittance of the first region A1 of the right eye filter 51, and a right eye second sub-filter 51*b* for adjusting the transmittance of the second region A2 instead of the right eye filter 51.

For example, referring to FIGS. 21 to 31, the first display panel 211 may include the first region A1 for displaying the first image IM1 and the second region A2 for displaying the second image IM2.

The first region A1 and the second region A2 of the first display panel 211 may be arranged in the first direction x. Among the regions of the first display panel 211, regions adjacent to each other in the first direction x may be in contact with each other. Alternatively, among the regions of the first display panel 211, a space in which an image is not displayed may be located between regions adjacent to each other in the first direction x.

A first right eye reflector 41*a* and a second right eye reflector 41*b* may be arranged in the first direction x.

A plurality of images IM1 to IM2 displayed in the plurality of regions A1 to A2 of the first display panel 211 may be focused on the right eye reflectors 41*a* to 41*b*, respectively. Accordingly, the plurality of images IM1 to IM2 displayed in the plurality of regions A1 to A2 of the first display panel 211 may be reflected by the right eye reflectors 41*a* to 41*b*, respectively, and then may proceed to the user's right eye REYE.

The right eye filter 51 may include the right eye first sub-filter 51*a* for displaying a first transmittance control region B1, and the right eye second sub-filter 51*b* for displaying a second transmittance control region B2.

The first transmittance control region B1 and the second transmittance control region B2 of the right eye filter 51 may be arranged in the first direction x. Among the regions of the right eye filter 51, regions adjacent to each other in the first direction x may be in contact with each other. Alternatively, among the regions of the right eye filter 51, a space in which the filter does not exist may be located between regions adjacent to each other in the first direction x.

Referring to FIGS. 22 and 23, the first transmittance control region B1 and the second transmittance control region B2 of the right eye filter 51 may be arranged in the first direction x. Among the regions of the right eye filter 51, regions adjacent to each other in the first direction x may be in contact with each other. Alternatively, among the regions of the right eye filter 51, a space in which the filter does not exist may be located between regions adjacent to each other in the first direction x.

Referring to FIGS. 24 and 25, to control the transmittance of at least one right eye filter 51, the right eye lower electrode 512 may include a right eye first lower electrode 512*a*, which supplies power for adjusting the electrochromic layer 513 of the first transmittance control region B1, and a right eye second lower electrode 512*b*, which supplies power for adjusting the electrochromic layer 513 of the second transmittance control region B2. However, the right eye first lower electrode 512*a* and the right eye second lower electrode 512*b* may be integrally formed to adjust the electrochromic layers 513 of the right eye first sub-filter 51*a* and the right eye second sub-filter 51*b*.

To control the transmittance of at least one right eye filter 51, the right eye upper electrode 515 may include a right eye first upper electrode 515*a*, which supplies power for adjusting the electrochromic layer 513 of the first transmittance control region B1, and a right eye second upper electrode 515*b*, which supplies power for adjusting the electrochromic layer 513 of the second transmittance control region B2.

The right eye supply electrode 518 may include a right eye first supply electrode 518*a*, which supplies power for driving the right eye first sub-filter 51*a*, and a right eye second supply electrode 518*b*, which supplies power for driving the right eye second sub-filter 51*b*.

Referring to FIG. 26, the right eye first sub-filter 51*a* and the right eye second sub-filter 51*b* of the right eye filter 51 may be arranged in the first direction x. Among the regions of the right eye filter 51, regions adjacent to each other in the first direction x may be in contact with each other. Alternatively, among the regions of the right eye filter 51, a space in which the filter does not exist may be located between regions adjacent to each other in the first direction x.

To control the transmittance of at least one right eye filter 51, the right eye lower electrode 512 may include the right eye first lower electrode 512*a*, which supplies power for adjusting the electrochromic layer 513 of the right eye first sub-filter 51*a*, and the right eye second lower electrode 512*b*, which supplies power for adjusting the electrochromic layer 513 of the right eye second sub-filter 51*b*. However, the right eye first lower electrode 512*a* and the right eye second lower electrode 512*b* may be integrally formed to adjust the electrochromic layers 513 of the right eye first sub-filter 51*a* and the right eye second sub-filter 51*b*.

To control the transmittance of at least one right eye filter 51, the right eye upper electrode 515 may include the right eye first upper electrode 515*a*, which supplies power for adjusting the electrochromic layer 513 of the right eye first sub-filter 51*a*, and the right eye second upper electrode 515*b*, which supplies power for adjusting the electrochromic layer 513 of the right eye second sub-filter 51*b*.

The right eye supply electrode 518 may include a right eye first supply electrode 518*a*, which supplies power for driving the right eye first sub-filter 51*a*, and a right eye second supply electrode 518*b*, which supplies power for driving the right eye second sub-filter 51*b*.

FIGS. 29 to 31 are flowcharts illustrating a driving method of the integrated driver of FIG. 21.

Referring to FIGS. 29 to 31, flowcharts illustrating a method of controlling the transmittance of the filter unit 50 and the luminance of the display unit 200 of an AR-providing device, according to still other embodiments, are shown.

In FIGS. 29 to 31, based on the luminous intensity of external light obtained by the sensor 70, the integrated driver 63 may adjust the transmittance of the right eye first sub-filter 51*a* and the transmittance of the right eye second sub-filter 51*b*, and may adjust the right eye driver 61 to adjust the luminance of the plurality of regions A1 to A2 of the first display panel 211 of the first display device 210. In addition, the integrated driver 63 may adjust the transmittance of a left eye first sub-filter 52*a* and the transmittance of a left eye second sub-filter 52*b*, and may adjust the left eye driver 62 to adjust the luminance of the plurality of regions A1 to A2 of the second display panel 221 of the second display device 220.

The integrated driver 63 may include various functions other than the above-described functions. The integrated driver 63 may include a central processing unit (CPU), a read-only memory (ROM), a random access memory (RAM), a main memory, and the like.

The right eye driver 61 may be formed as an integrated circuit (IC) to be located on the first temple 31. The right eye driver 61 may supply data voltages, a power voltage, and the like for driving the plurality of regions A1 to A2 of the first display panel 211 to the first circuit board 212 through the first circuit board 212 of the first display device 210. The right eye driver 61 may adjust a driving voltage to drive the right eye first sub-filter 51*a* and the right eye second sub-filter 51*b*, and may supply the voltage to each of the right eye first supply electrode 518*a* and the right eye second supply electrode 518*b*.

Then, the right eye first supply electrode 518*a* and the right eye second supply electrode 518*b* may provide the voltage to at least one right eye upper electrode 515 and to at least one right eye lower electrode 512. Further, the transmittances of the first transmittance control region B1 and the second transmittance control region B2 may be controlled so that the transmittance of the right eye filter 51 is controlled through the electrochromic layer 513 in addition to at least one right eye upper electrode 515 and the right eye lower electrode 512.

In addition, the transmittances of the right eye first sub-filter 51*a* and the right eye second sub-filter 51*b* may be controlled so that the transmittance of the right eye filter 51 is controlled through the electrochromic layer 513 in addition to at least one right eye upper electrode 515 and the right eye lower electrode 512.

The left eye driver 62 may be formed as an integrated circuit (IC) and may be located on the second temple 32. The left eye driver 62 may supply data voltages, a power voltage, and the like for driving the plurality of regions A1 to A2 of the second display panel 221 to the second circuit board 222 through the second circuit board 222 of the second display device 220. The left eye driver 62 may adjust a driving voltage to drive the left eye first sub-filter 52*a* and the left eye second sub-filter 52*b* and may supply the voltage to each of a left eye first supply electrode 528*a* and the left eye second supply electrode 528*b*.

Meanwhile, because the left eye filter 52 may be implemented in substantially the same manner as described with reference to FIGS. 29 to 31, description of the left eye filter 52 will be omitted.

Also in some embodiments, because external light adjusted by the right eye filter 51 and the image displayed on the first display panel 211 are both displayed to the right eye REYE, and the external light adjusted by the left eye filter 52 and the image displayed on the second display panel 221 are both displayed to the left eye LEYE, the visibility of the user's image information of each of the right eye REYE and the left eye LEYE may be adjusted. Accordingly, the display luminance may be maintained at a low level to have the same level of visibility of image information. Thus, it is possible to reduce the luminance loss of the image.

In addition, the transmittance of each filter of the filter unit 50 may be adjusted according to the intensity of external light obtained through the sensor 70. Accordingly, the user may adjust the intensity of external light entering each of the right eye REYE and the left eye LEYE, which may be advantageous in identifying information of the view of the external world. Accordingly, it is possible to clearly recognize an object and improve visibility of the real information.

Further, the luminance of each of the first display panel 211 of the first display device 210 and the second display panel 221 of the second display device 220 may be adjusted. For example, the luminance of each of the first display panel 211 and the second display panel 221 may be adjusted respectively according to the transmittance of each of the right eye filter 51 and the left eye filter 52 and/or the intensity of external light obtained through the sensor 70. Accordingly, the user's visibility of image information may be improved.

Also, in some embodiments, the plurality of images IM1 to IM2 may be displayed in the plurality of regions A1 to A2 of the first display panel 211, respectively. Furthermore, each of the right eye first sub-filter 51*a* displaying the first transmittance control region B1 of the right eye filter 51, and the right eye second sub-filter 51*b* displaying the second transmittance control region B2 of the right eye filter 51, may adjust the transmittance according to the intensity of external light obtained through the sensor 70 corresponding to each of the regions.

Accordingly, in some embodiments, visibility of the user's image information in each of the right eye REYE and the left eye LEYE may be improved for each of the plurality of regions A1 to A2, and visibility of real information and/or conspicuity of clearly recognizing an object in each of the right eye REYE and the left eye LEYE may be improved for each of the plurality of regions B1 to B2.

Figure 32:
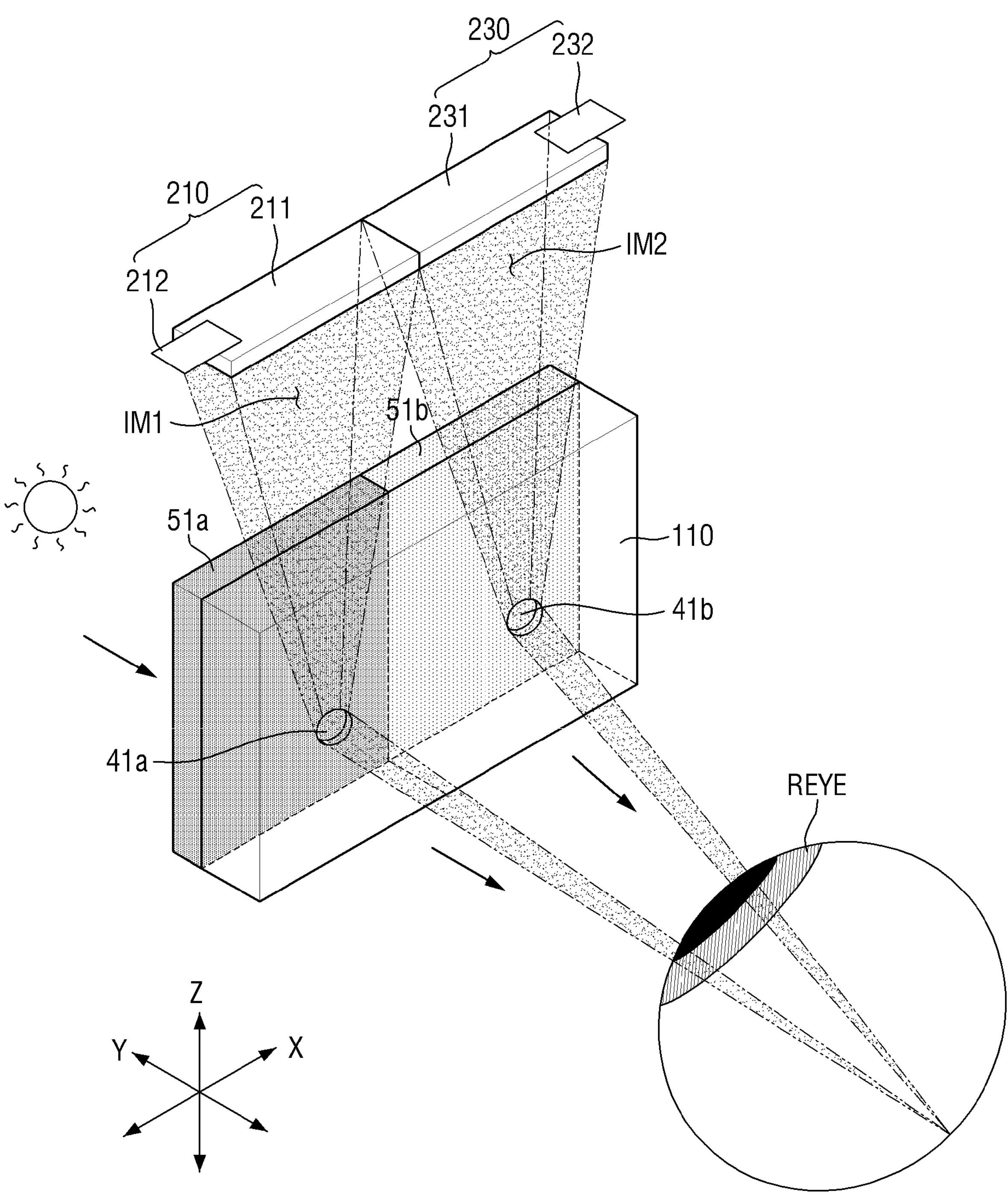

FIGS. 32 to 33 are perspective views of a method of changing a light transmittance of an AR-providing device according to still other embodiments.

The first display device 210 may further include a third display panel 231 and a third circuit board 232 in the first display device 210 of FIGS. 21 to 31, and may further include a right eye second driver 61*b* for driving the third display panel 231 and the third circuit board 232. Thus, in the description of FIGS. 32 and 33, redundant description of the parts already described in some embodiments corresponding to FIGS. 21 to 31 will be omitted.

Referring to FIG. 32, the first display device 210 and a third display device 230 may be located on the first side surface "c" of the right eye lens 110. The first display device 210 and the third display device 230 may be arranged in the first direction x. The first display device 210 and the third display device 230 may have substantially the same size, but the disclosure is not limited thereto.

Each of the first display device 210 and the third display device 230 displays a virtual image for realizing an augmented reality. The first display device 210 may include a first display panel 211 and a first circuit board 212. The third display device 230 may include the third display panel 231 and the third circuit board 232.

The first circuit board 212 may be attached to one end of the first display panel 211. The first display panel 211 may receive a digital video data from the outside through the first circuit board 212, and may receive power from an external power supply unit. The third circuit board 232 may be attached to one end of the third display panel 231. The third display panel 231 may receive digital video data from the outside through the third circuit board 232, and may receive power from the external power supply unit.

FIG. 33 is a flowchart illustrating a driving method of an integrated driver of according to still other embodiments.

Referring to FIG. 33, it is a flowchart illustrating a method of controlling the transmittance of the right eye filter 51 and the luminance of the display devices 210 and 230 of an AR-providing device according to still other embodiments on the right eye lens 110.

Referring to a right eye first driver 61*a* and the right eye second driver 61*b* on the right eye lens 110 in FIG. 33, the integrated driver 63 adjusts the right eye first driver 61*a* to adjust the transmittance of the right eye first sub-filter 51*a* and the luminance of the first display panel 211 of the first display device 210 based on the luminous intensity of the external light obtained by the sensor 70. In addition, the integrated driver 63 adjusts the right eye second driver 61*b* to adjust the transmittance of the right eye second sub-filter 51*b* and the luminance of the third display panel 231 of the third display device 230.

Referring to a left eye first driver 62*a* and the left eye second driver 62*b* on the left eye lens 120 in FIG. 33, the integrated driver 63 adjusts the left eye first driver 62*a* to adjust the transmittance of the left eye first sub-filter 52*a* and the luminance of the second display panel 221 of the second display device 220 based on the luminous intensity of the external light obtained by the sensor 70. In addition, the integrated driver 63 adjusts the left eye second driver 62*b* to adjust the transmittance of the left eye second sub-filter 52*b* and the luminance of a fourth display panel 241 of a fourth display device 240.

The integrated driver 63 may include various functions other than the above-described functions. The integrated driver 63 may include a central processing unit (CPU), a read-only memory (ROM), a random access memory (RAM), a main memory, and the like.

The right eye first driver 61*a* may be formed as an integrated circuit (IC) and may be located on the first temple 31. The right eye first driver 61*a* may supply data voltages, a power voltage, and the like for driving the first display panel 211 through the first circuit board 212 of the first display device 210 to the first circuit board 212. To drive the right eye first sub-filter 51*a*, the right eye first driver 61*a* may adjust the driving voltage and may supply it to the right eye first supply electrode 518*a*. Subsequently, the right eye first supply electrode 518*a* may provide a voltage to the right eye first upper electrode 515*a* and the right eye first lower electrode 512*a*. Additionally, the transmittance of the right eye first sub-filter 51*a* may be controlled through a first electrochromic layer 513*a* in addition to the right eye first upper electrode 515*a* and the right eye first lower electrode 512*a*.

The right eye second driver 61*b* may be formed as an integrated circuit (IC) and may be located on the first temple 31. The right eye second driver 61*b* may supply data voltages, a power voltage and the like for driving the third display panel 231 to the third circuit board 232 through the third circuit board 232 of the third display device 230. To drive the right eye second sub-filter 51*b*, the right eye second driver 61*b* may adjust the driving voltage and may supply it to the right eye second supply electrode 518*b*. Subsequently, the right eye second supply electrode 518*b* may provide a voltage to the right eye second upper electrode 515*b* and the right eye second lower electrode 512*b*. Additionally, the transmittance of the right eye second sub-filter 51*b* may be controlled through a first electrochromic layer 513*b* in addition to the right eye second upper electrode 515*b* and the right eye second lower electrode 512*b*.

Meanwhile, the augmented reality providing method using the left eye first driver 62*a*, the left eye second driver 62*b*, the second display device 220, the fourth display device 240, the left eye first sub-filter 52*a*, and the left eye second sub-filter 52*b* is substantially the same as described with reference to FIGS. 32 to 33, and thus, description thereof will be omitted.

Also in some embodiments, because external light adjusted by the right eye first sub-filter 51*a* and the right eye second sub-filter 51*b* and the image displayed on the first display panel 211 are both displayed toward the right eye REYE, and the external light adjusted by the left eye filter 52 and the image displayed on the second display panel 221 are both displayed toward the left eye LEYE, the visibility of the user's image information of each of the right eye REYE and the left eye LEYE may be adjusted. Accordingly, the display luminance may be maintained at a low level to have the same level of visibility of image information. Thus, it is possible to reduce the luminance loss of the image.

In addition, the transmittance of each filter of the filter unit 50 may be adjusted according to the intensity of external light obtained through the sensor 70. Accordingly, the user may adjust the intensity of external light entering each of the right eye REYE and the left eye LEYE, which may be advantageous in identifying information of the view of the external world. Accordingly, it is possible to clearly recognize an object and improve visibility of the real information.

Further, the luminance of each of the first display panel 211 of the first display device 210 and the second display panel 221 of the second display device 220 may be adjusted. For example, the luminance of each of the first display panel 211 and the second display panel 221 may be adjusted respectively according to the transmittance of each of the right eye filter 51 and the left eye filter 52 and/or the intensity of external light obtained through the sensor 70. Accordingly, the user's visibility of image information may be improved.

In addition, the plurality of images IM1 to IM2 may be respectively displayed in the plurality of regions A1 to A2 of the first display panel 211. Furthermore, each of the right eye first sub-filter 51*a* displaying the first transmittance control region B1 of the right eye filter 51 and the right eye second sub-filter 51*b* displaying the second transmittance control region B2 thereof may adjust the transmittance according to the intensity of external light obtained through the sensor 70 corresponding to each of the regions.

Accordingly, the visibility of the user's image information in each of the right eye REYE and the left eye LEYE may be improved for each of the plurality of regions A1 to A2, and visibility of real information and/or conspicuity of clearly recognizing an object in each of the right eye REYE and the left eye LEYE may be improved for each of the plurality of regions A1 to A2.

FIGS. 34 to 43 are schematic views illustrating a method of changing a light transmittance of an AR-providing device according to still other embodiments.

FIG. 34 is a perspective view illustrating a right eye lens, a first display device, and a filter unit according to still other embodiments. FIG. 35 is a cross-sectional view illustrating a method of changing a light transmittance of FIG. 34, and FIG. 36 is a side view illustrating a method of changing a light transmittance of FIG. 34. FIGS. 37 to 39 are cross-sectional views illustrating a structure of the filter of FIG. 34, and FIG. 40 is a schematic diagram illustrating a method of changing a light transmittance of an AR-providing device. FIGS. 41 to 43 are flowcharts illustrating a driving method of an integrated driver.

The embodiments corresponding to FIGS. 34 to 43 is different from the embodiments corresponding to FIGS. 21 to 31 in that the first display device 210 includes a first region A1 for displaying a first image IM1, a second region A2 for displaying a second image IM2, and a third region A3 displaying a third image IM3, instead of only the first region A1 displaying the first image IM1 and the second region A2 displaying the second image IM2.

In addition, the embodiments corresponding to FIGS. 34 to 43 is different from the embodiments corresponding to FIGS. 21 to 31 in that the right eye first sub-filter 51*a* for adjusting the transmittance of the first transmittance control region B1 of the right eye filter 51, the right eye second sub-filter 51*b* for adjusting the transmittance of the second transmittance control region B2, and a right eye third sub-filter 51*c* for adjusting the transmittance of a third transmittance control region B3 are included instead of only the right eye first sub-filter 51*a* adjusting the transmittance of the first transmittance control region B1 of the right eye filter 51 and the right eye second sub-filter 51*b* adjusting the transmittance of the second transmittance control region B2.

Referring to FIGS. 34 to 43, the first display panel 211 may include the first region A1 for displaying the first image IM1, the second region A2 for displaying the second image IM2, and the third region A3 for displaying the third image IM3.

The first region A1, the second region A2, and the third region A3 of the first display panel 211 may be arranged in the first direction x. Among the regions of the first display panel 211, regions adjacent to each other in the first direction x may be in contact with each other. Alternatively, among the regions of the first display panel 211, a space in which an image is not displayed may be located between regions adjacent to each other in the first direction x.

The first right eye reflector 41*a*, the second right eye reflector 41*b*, and a third right eye reflector 41*c* may be arranged in the first direction x.

The plurality of images IM1 to IM3 displayed in the plurality of regions A1 to A3 of the first display panel 211 may be focused on the right eye reflectors 41*a* to 41*c*, respectively. Accordingly, the plurality of images IM1 to IM3 displayed in the plurality of regions A1 to A3 of the first display panel 211 may be reflected by the right eye reflectors 41*a* to 41*c*, respectively, and then may proceed to the user's right eye REYE.

Referring to FIGS. 37 and 38, the right eye filter 51 may include the first transmittance control region B1, the second transmittance control region B2, and the third transmittance control region B3. The first transmittance control region B1, the second transmittance control region B2, and the third transmittance control region B3 of the right eye filter 51 may be arranged in the first direction x. Among the regions of the right eye filter 51, regions adjacent to each other in the first direction x may be in contact with each other. Alternatively, among the regions of the right eye filter 51, a space in which the filter does not exist may be located between regions adjacent to each other in the first direction x.

To control the transmittance of at least one right eye filter 51, the right eye lower electrode 512 may include a right eye first lower electrode 512*a*, which supplies power for adjusting the electrochromic layer 513 of the first transmittance control region B1, a right eye second lower electrode 512*b*, which supplies power for adjusting the electrochromic layer 513 of the second transmittance control region B2, and a right eye third lower electrode 512*c*, which supplies power for adjusting the electrochromic layer 513 of the third transmittance control region B3. However, the right eye first lower electrode 512*a*, the right eye second lower electrode 512*b*, and the right eye third lower electrode 512*c* may be integrally formed so as to adjust the electrochromic layer 513 of the right eye filter 51.

To control the transmittance of at least one right eye filter 51, the right eye upper electrode 515 may include a right eye first upper electrode 515*a*, which supplies power for adjusting the electrochromic layer 513 of the first transmittance control region B1, a right eye second upper electrode 515*b*, which supplies power for adjusting the electrochromic layer 513 of the second transmittance control region B2, and a right eye third upper electrode 515*c*, which supplies power for adjusting the electrochromic layer 513 of the third transmittance control region B3.

The right eye supply electrode 518 may include the right eye first supply electrode 518*a*, which supplies power for driving the right eye first sub-filter 51*a*, the right eye second supply electrode 518*b*, which supplies power for driving the right eye second sub-filter 51*b*, and a right eye third supply electrode 518*c*, which supplies power for driving the right eye third sub-filter 51*c*.

Referring to FIG. 39, the right eye first sub-filter 51*a*, the right eye second sub-filter 51*b*, and the right eye third sub-filter 51*c* of the right eye filter 51 may be arranged in the first direction x. Among the regions of the right eye filter 51, regions adjacent to each other in the first direction x may be in contact with each other. Alternatively, among the regions of the right eye filter 51, a space in which the filter does not exist may be located between regions adjacent to each other in the first direction x.

To control the transmittance of at least one right eye filter 51, the right eye lower electrode 512 may include a right eye first lower electrode 512*a*, which supplies power for adjusting the electrochromic layer 513 of the right eye first sub-filter 51*a*, the right eye second lower electrode 512*b*, which supplies power for adjusting the electrochromic layer 513 of the right eye second sub-filter 51*b*, and the right eye third lower electrode 512*c*, which supplies power for adjusting the electrochromic layer 513 of the right eye third sub-filter 51*c*. However, the right eye first lower electrode 512*a*, the right eye second lower electrode 512*b*, and the right eye third lower electrode 512*c* may be integrally formed so as to adjust the electrochromic layers 513 of the right eye first sub-filter 51*a*, the right eye second sub-filter 51*b*, and the right eye third sub-filter 51*c*.

To control the transmittance of at least one right eye filter 51, the right eye upper electrode 515 may include the right eye first upper electrode 515*a*, which supplies power for adjusting the electrochromic layer 513 of the right eye first sub-filter 51*a*, the right eye second upper electrode 515*b*, which supplies power for adjusting the electrochromic layer 513 of the right eye second sub-filter 51*b*, and the right eye third upper electrode 515*c*, which supplies power for adjusting the electrochromic layer 513 of the right eye third sub-filter 51*c*. The right eye supply electrode 518 may include the right eye first supply electrode 518*a*, which supplies power for driving the right eye first sub-filter 51*a*, the right eye second supply electrode 518*b*, which supplies power for driving the right eye second sub-filter 51*b*, and a right eye third supply electrode 518*c*, which supplies power for driving the right eye third sub-filter 51*c*.

FIGS. 41 to 43 are flowcharts illustrating a driving method of an integrated driver according to still other embodiments.

In FIGS. 41 to 43, the integrated driver 63 may adjust the transmittance of the right eye first sub-filter 51*a*, the transmittance of the right eye second sub-filter 51*b*, and the transmittance of the right eye third sub-filter 51*c* of a plurality of regions B1 to B3 based on the luminous intensity of the external light obtained by the sensor 70, and adjust the right eye driver 61 to adjust the luminance of the plurality of regions A1 to A3 of the first display panel 211 of the first display device 210. In addition, the transmittance of the left eye first sub-filter 52*a*, the transmittance of the left eye second sub-filter 52*b*, and the transmittance of the left eye third sub-filter 52*c* may be adjusted, and the left eye driver 62 is adjusted to adjust the luminance of the plurality of regions A1 to A2 of the second display panel 221 of the second display device 220.

The integrated driver 63 may include various functions other than the above-described functions. The integrated driver 63 may include a central processing unit (CPU), a read-only memory (ROM), a random access memory (RAM), a main memory, and the like.

The right eye driver 61 may be formed as an integrated circuit (IC) to be located on the first temple 31. The right eye driver 61 may supply data voltages, a power voltage and the like for driving the plurality of regions A1 to A3 of the first display panel 211 to the first circuit board 212 through the first circuit board 212 of the first display device 210. The right eye driver 61 may supply a driving voltage to each of the right eye first supply electrode 518*a*, the right eye second supply electrode 518*b*, and the right eye third supply electrode 518*c*, by adjusting the driving voltage to drive the right eye first sub-filter 51*a*, the right eye second sub-filter 51*b*, and the right eye third sub-filter 51*c*.

Subsequently, the right eye first supply electrode 518*a*, the right eye second supply electrode 518*b*, and the right eye third supply electrode 518*c* may provide the voltage to at least one right eye upper electrode 515 and at least one right eye lower electrode 512. In addition, the transmittances of the first transmittance control region B1, the second transmittance control region B2, and the third transmittance control region B3 may be adjusted so that the transmittance of the right eye filter 51 is adjusted through the electrochromic layer 513 in addition to at least one right eye upper electrode 515 and the right eye lower electrode 512.

In addition, the transmittances of the right eye first sub-filter 51*a*, the right eye second sub-filter 51*b*, and the right eye third sub-filter 51*c* may be adjusted so that the transmittance of the right eye filter 51 is adjusted through the electrochromic layer 513 in addition to at least one right eye upper electrode 515 and the right eye lower electrode 512.

The left eye driver 62 may be formed as an integrated circuit (IC) and may be located on the second temple 32. The left eye driver 62 may supply, to the second circuit board 222, data voltages, a power voltage, and the like for driving the plurality of regions B1 to B3 of the second display panel 221 through the second circuit board 222 of the second display device 220. The left eye driver 62 may adjust a driving voltage to drive the left eye first sub-filter 52*a* and the left eye second sub-filter 52*b*, and may supply the voltage to each of the left eye first supply electrode 528*a*, the left eye second supply electrode 528*b*, and a left eye third supply electrode 528*c*.

Meanwhile, because the left eye filter 52 may be implemented in substantially the same manner as described with reference to FIGS. 41 to 43, description of the left eye filter 52 will be omitted.

Also in some embodiments, because external light adjusted by the right eye filter 51 and the image displayed on the first display panel 211 are both displayed to the right eye REYE, and the external light adjusted by the left eye filter 52 and the image displayed on the second display panel 221 are both displayed to the left eye LEYE, the visibility of the user's image information of each of the right eye REYE and the left eye LEYE may be adjusted. Accordingly, the display luminance may be maintained at a low level to have the same level of visibility of image information. Thus, it is possible to reduce the luminance loss of the image.

In addition, the transmittance of each filter of the filter unit 50 may be adjusted according to the intensity of external light obtained through the sensor 70. Accordingly, the user may adjust the intensity of external light entering each of the right eye REYE and the left eye LEYE, which may be advantageous in identifying information of the view of the external world. Accordingly, it is possible to clearly recognize an object and improve visibility of the real information.

Further, the luminance of each of the first display panel 211 of the first display device 210 and the second display panel 221 of the second display device 220 may be adjusted. For example, the luminance of each of the first display panel 211 and the second display panel 221 may be adjusted respectively according to the transmittance of each of the right eye filter 51 and the left eye filter 52 and/or the intensity of external light obtained through the sensor 70. Accordingly, the user's visibility of image information may be improved.

In addition, the plurality of images IM1 to IM3 may be respectively displayed in the plurality of regions A1 to A3 of the first display panel 211. Moreover, each of the right eye first sub-filter 51*a* displaying the first transmittance control region B1 of the right eye filter 51, the right eye second sub-filter 51*b* displaying the second transmittance control region B2 of the right eye filter 51, and the right eye third sub-filter 51*c* displaying the third transmittance control region B3 of the right eye filter 51 may adjust the transmittance according to the intensity of external light obtained by the sensor 70 corresponding to each of the regions.

Accordingly, the visibility of the user's image information in each of the right eye REYE and the left eye LEYE may be improved for each of the plurality of regions A1 to A3, and the visibility of the real information and/or the conspicuity of clearly recognizing an object in each of the right eye REYE and the left eye LEYE may be improved for each of the plurality of regions B1 to B3.

FIG. 44 is a flowchart illustrating a virtual mode change of an AR-providing device according to still other embodiments. FIGS. 45 and 46 illustrate a method of changing a virtual mode of an AR-providing device according to still other embodiments.

In operation S401 of FIG. 44, an application is executed.

Referring to FIG. 11, the user may view the external world through the AR-providing device 1. The external world is viewed through the right eye lens 110, the left eye lens 120 and the filter unit 50. In this operation, the display unit 200 does not operate because power is not supplied under the control of the integrated driver 63. Also, the filter unit 50 does not operate because power is not supplied under the control of the integrated driver 63.

In operation S402 of FIG. 44, in the case of changing a mode (Y in S402), that is, when a change from an original augmented mode to a virtual mode is selected, the transmittance of the filter unit 50 may be set to 0% to provide the virtual mode (S404).

In operation S404 of FIG. 44, the right eye driver 61 and the left eye driver 62 determine the light transmittance of the first region based on the input received from the integrated driver 63. The transmittance of the filter may be determined according to the intensity of external light. The right eye filter 51 may change the light transmittance to 0% under the control of the right eye driver 61.

Next, the supply voltage for changing the light transmittance to 0% is determined. The right eye driver 61 and the left eye driver 62 may determine the supply voltage supplied from the power supply unit to each of the right eye filter 51 and the left eye filter 52 by using the value of FIG. 17 stored in the storage unit in response to the determined light transmittance, and may change the light transmittance of the light transmitting unit.

FIGS. 45 and 46 illustrate a method of changing a virtual mode of an AR-providing device according to still other embodiments.

Referring to FIGS. 45 and 46, the user may view the image 1102 displayed in the display unit 200 except the external world view 1100. However, when there is no mode change (N in S402), the original augmented mode may be maintained (S403).

Improved visibility of the image 1102 displayed in the display unit 200 may be provided to the user. In addition, the user may select the augmented mode and the virtual mode according to the change in mode.

Accordingly, the user may adjust the transmittance of the right eye filter 51 and the left eye filter 52 of the filter unit 50 to 0% and select the virtual mode providing the image of the display unit 200. Accordingly, because a virtual mode image 1103 of the display unit 200 may be viewed separately from the external world view 1100, virtual reality may be provided to the user. Also, the user may adjust the transmittances of the right eye filter 51 and the left eye filter 52 of the filter unit 50 to select the augmented mode providing an augmented mode image 1103 of the display unit 200 in cooperation with the filter unit 50. Accordingly, because the augmented mode image 1103 of the display unit 200 may be viewed in addition to the external world view 1100, the augmented reality may be provided to the user. In this case, because the user may change the mode between the virtual mode and the augmented mode, the virtual reality or the augmented reality may be provided to the user according to the user's selection.

In concluding the detailed description, those skilled in the art will appreciate that many variations and modifications can be made to the embodiments without substantially departing from the principles of the invention. Therefore, the disclosed embodiments of the present disclosure are used in a generic and descriptive sense only and not for purposes of limitation.

What is claimed is:

1. An augmented reality (AR)-providing device comprising:

a right eye lens having a first surface that is a top surface;

a left eye lens having a first surface that is a top surface;

a right eye filter overlapping the first surface of the right eye lens, and configured to change an illuminance of light passing through the right eye lens;

a left eye filter overlapping the first surface of the left eye lens, and configured to change an illuminance of light passing through the left eye lens;

a display unit comprising:

a first display panel on a first side surface of the right eye lens that is orthogonal to the first surface of the right eye lens, and configured to provide a first image to a right eye reflector at a center of the right eye lens; and a second display panel on a first side surface of the left eye lens that is orthogonal to the first surface of the left eye lens, and configured to provide a second image to a left eye reflector at a center of the left eye lens;

a right eye driver configured to control a transmittance of the right eye filter, and configured to control a transmittance of the first image;

a left eye driver configured to control a transmittance of the left eye filter, and configured to control a transmittance of the second image;

a right eye condenser that is between the first display panel and the first side surface of the right eye lens, and configured to condense the first image provided by the first display panel; and a left eye condenser that is between the second display panel and the first side surface of the left eye lens, and configured to condense the second image provided by the second display panel, wherein the right eye condenser and the left eye condenser respectively comprise at least two convex lenses, wherein a width of the right eye reflector and a width of the left eye reflector are respectively less than a width of a pupil of an eye of a user, wherein the right eye lens and the left eye lens comprise transmittance control regions comprising equally sized sub-filters, wherein the first display panel comprises a plurality of regions arranged in a first direction, wherein the right eye filter comprises a plurality of sub-filters arranged in the first direction, and wherein a length of one of the plurality of regions is substantially equal to a length of one of the plurality of sub-filters.

2. The AR-providing device of claim 1, further comprising:

a first temple adjacent to the right eye lens, and with the right eye driver thereon; and a second temple adjacent to the left eye lens, and with the left eye driver thereon.

3. The AR-providing device of claim 1, wherein the right eye driver is configured to be independently driven, and wherein the left eye driver is configured to be independently driven.

4. The AR-providing device of claim 1, wherein the right eye reflector is between the first surface of the right eye lens, and a second surface of the right eye lens that is opposite to the first surface of the right eye lens, and wherein the left eye reflector is between the first surface of the left eye lens, and a second surface of the left eye lens that is opposite to the first surface of the left eye lens.

5. The AR-providing device of claim 4, wherein the display unit is configured to provide the first image to the right eye reflector, and is configured to provide the second image to the left eye reflector.

6. The AR-providing device of claim 1, further comprising:

a support unit configured to support the right eye lens and the left eye lens; and an illuminance sensor on the support unit, and configured to detect an illuminance of external light.

7. The AR-providing device of claim 6, further comprising an integrated driver configured to control transmittances of the right eye filter and the left eye filter based on an illuminance value sensed by the illuminance sensor.

8. The AR-providing device of claim 1, wherein the right eye filter and the left eye filter comprise a plurality of regions configured to individually adjust transmittances.

9. The AR-providing device of claim 8, wherein the right eye filter and the left eye filter comprise at least one lower electrode, at least one upper electrode, and an electrochromic layer interposed therebetween, and wherein the regions respectively comprise one of the at least one lower electrode or one of the at least one upper electrode.

10. The AR-providing device of claim 1, wherein the right eye filter and the left eye filter are separated.

11. The AR-providing device of claim 1, wherein the right eye filter and the left eye filter comprise a film respectively attached to the first surface of the right eye lens and the first surface of the left eye lens.

12. The AR-providing device of claim 1, further comprising an integrated driver configured to adjust the right eye filter or the left eye filter to have a first transmittance so that an external world view is transmitted in an augmented mode, and configured to adjust the right eye filter or the left eye filter to have a second transmittance so that the external world view is blocked in a virtual mode.

13. An augmented reality (AR)-providing device comprising:

a right eye lens having a first surface that is a top surface;

a left eye lens having a first surface that is a top surface;

a display unit comprising:

a first display panel on a first side surface of the right eye lens that is orthogonal to the first surface of the right eye lens, and configured to provide a first image to a right eye reflector at a center of the right eye lens; and a second display panel on a first side surface of the left eye lens that is orthogonal to the first surface of the left eye lens, and configured to provide a second image to a left eye reflector at a center of the left eye lens;

a support unit configured to support the right eye lens, the left eye lens, and the display unit;

a right eye filter overlapping the first surface of the right eye lens, and configured to change an illuminance of light passing through the right eye lens;

a left eye filter overlapping the first surface of the left eye lens, and configured to change an illuminance of light passing through the left eye lens;

a first driver coupled to the support unit, and configured to adjust a transmittance of the right eye filter;

a second driver separated from the first driver, coupled to the support unit, and configured to adjust a transmittance of the left eye filter independently of the transmittance of the right eye filter;

a right eye condenser that is between the first display panel and the first side surface of the right eye lens, and configured to condense the first image provided by the first display panel; and a left eye condenser that is between the second display panel and the first side surface of the left eye lens, and configured to condense the second image provided by the second display panel, wherein the right eye condenser and the left eye condenser respectively comprise at least two convex lenses, wherein a width of the right eye reflector and a width of the left eye reflector are respectively less than a width of a pupil of an eye of a user, wherein the right eye lens and the left eye lens comprise transmittance control regions comprising equally sized sub-filters, wherein the first display panel comprises a plurality of regions arranged in a first direction, wherein the right eye filter comprises a plurality of sub-filters arranged in the first direction, and wherein a length of one of the plurality of regions is substantially equal to a length of one of the plurality of sub-filters.

14. The AR-providing device of claim 13, further comprising an integrated driver coupled to the support unit, and configured to control the first driver and the second driver.

15. The AR-providing device of claim 14, wherein the integrated driver is configured to adjust the right eye filter or the left eye filter to have a first transmittance so that an external world view is transmitted in an augmented mode, and is configured to adjust the right eye filter or the left eye filter to have a second transmittance so that the external world view is blocked in a virtual mode.

16. The AR-providing device of claim 14, further comprising an illuminance sensor on the support unit, and configured to detect an illuminance of external light.

17. The AR-providing device of claim 16, wherein the integrated driver is configured to control the transmittances of the right eye filter and the left eye filter based on an illuminance value sensed by the illuminance sensor.

18. The AR-providing device of claim 13, wherein the right eye filter and the left eye filter respectively comprise regions configured to individually adjust transmittances.

19. The AR-providing device of claim 14, wherein the integrated driver is configured to adjust the transmittance of the right eye filter and the transmittance of the left eye filter differently from each other.

* * * * *